(12) United States Patent
Kataoka

(10) Patent No.: US 12,556,112 B2
(45) Date of Patent: Feb. 17, 2026

(54) VIBRATION-TYPE DRIVE APPARATUS, AND DRIVE METHOD FOR VIBRATION-TYPE DRIVE APPARATUS

(71) Applicant: CANON KABUSHIKI KAISHA, Tokyo (JP)

(72) Inventor: Kenichi Kataoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 503 days.

(21) Appl. No.: 18/304,184

(22) Filed: Apr. 20, 2023

(65) Prior Publication Data

US 2023/0268848 A1 Aug. 24, 2023

Related U.S. Application Data

(63) Continuation of application No. PCT/JP2021/038594, filed on Oct. 19, 2021.

(30) Foreign Application Priority Data

Oct. 22, 2020 (JP) ................. 2020-177103
Oct. 22, 2020 (JP) ................. 2020-177104
Oct. 26, 2020 (JP) ................. 2020-178549

(51) Int. Cl.
*H02N 2/00* (2006.01)
*H02N 2/10* (2006.01)

(52) U.S. Cl.
CPC ............. *H02N 2/004* (2013.01); *H02N 2/008* (2013.01); *H02N 2/103* (2013.01)

(58) Field of Classification Search
CPC ........ H02N 2/004; H02N 2/008; H02N 2/103; H02N 2/142; G01R 31/54; G01R 31/58; B06B 1/0253
See application file for complete search history.

(56) References Cited

U.S. PATENT DOCUMENTS

| | | | |
|---|---|---|---|
| 8,217,597 B2* | 7/2012 | Sun ...................... | H02N 2/0075 318/116 |
| 11,728,750 B2* | 8/2023 | Kataoka ............. | H10N 30/2023 310/317 |
| 2006/0067024 A1 | 3/2006 | Chemisky | |
| 2017/0279029 A1 | 9/2017 | Miyamoto | |

FOREIGN PATENT DOCUMENTS

| | | |
|---|---|---|
| JP | S50158480 A | 12/1975 |
| JP | H09182467 A | 7/1997 |
| JP | H09294335 A | 11/1997 |
| JP | H09318688 A | 12/1997 |
| JP | PH11341841 A | 12/1999 |

(Continued)

*Primary Examiner* — Emily P Pham
(74) *Attorney, Agent, or Firm* — Canon U.S.A., Inc. IP Division

(57) ABSTRACT

A vibration-type drive apparatus provided to solve the task includes a control unit that outputs a command signal, a drive unit that outputs a drive signal in accordance with the command signal, a vibrator unit in which two or more vibrators that vibrate in accordance with the drive signal are connected, a drive signal analyzing unit that analyzes the drive signal and outputs an analysis result, and a determining unit that determines whether there is a break in wiring lines respectively coupled to the vibrators in accordance with the analysis result.

63 Claims, 73 Drawing Sheets

(56) References Cited

FOREIGN PATENT DOCUMENTS

| | | | |
|---|---|---|---|
| JP | 2003340371 | A | 12/2003 |
| JP | 2005102431 | A | 4/2005 |
| JP | 2014016356 | A | 1/2014 |
| JP | 5716624 | B2 | 5/2015 |
| JP | 2017005794 | A | 1/2017 |
| JP | 2017060357 | A | 3/2017 |
| JP | 2017175696 | A | 9/2017 |
| JP | 2017184316 | A | 10/2017 |
| JP | 2018078769 | A | 5/2018 |
| JP | 2019198199 | A | 11/2019 |
| JP | 2020162260 | A | 10/2020 |

* cited by examiner

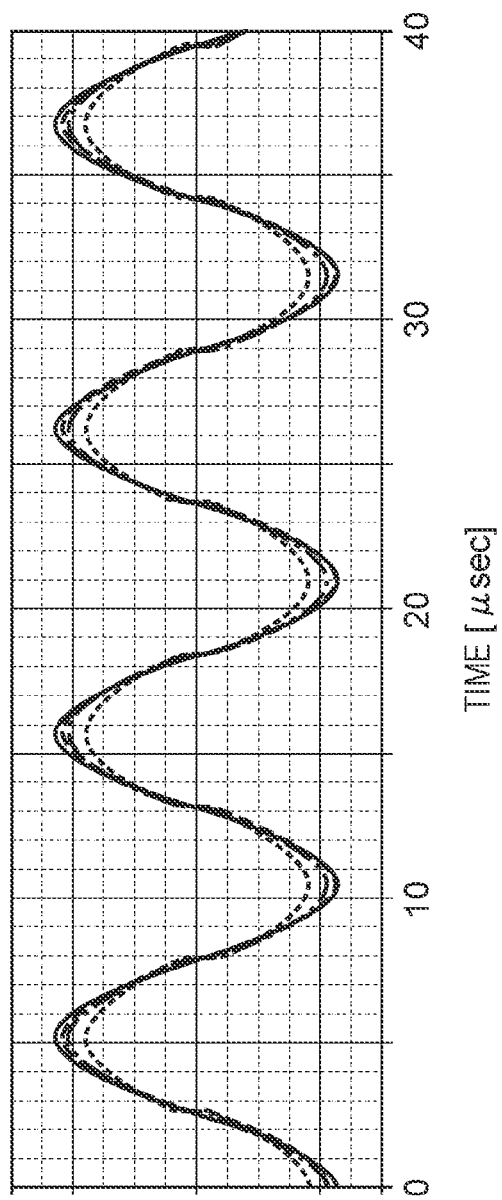

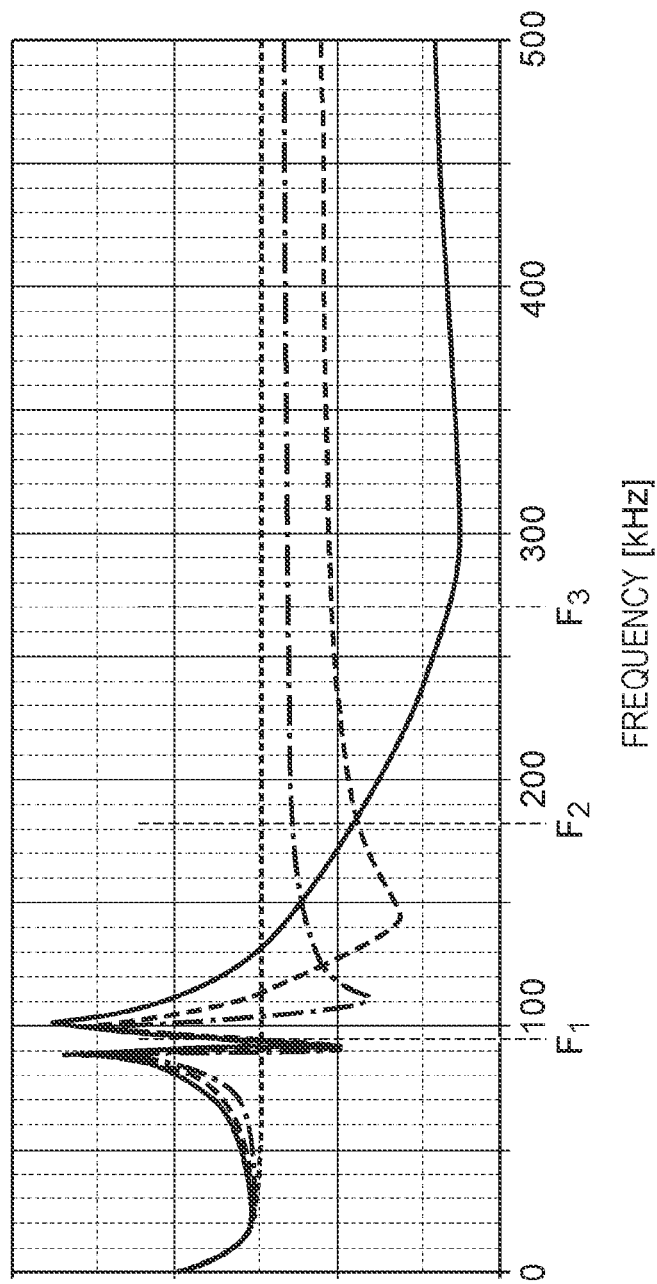

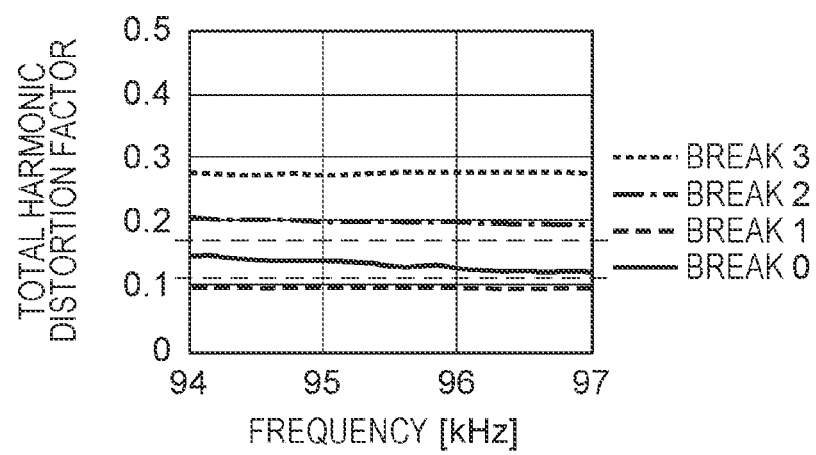
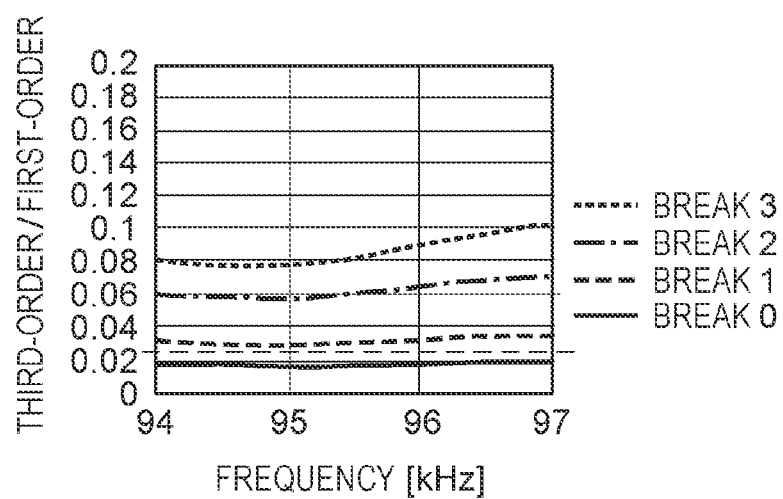

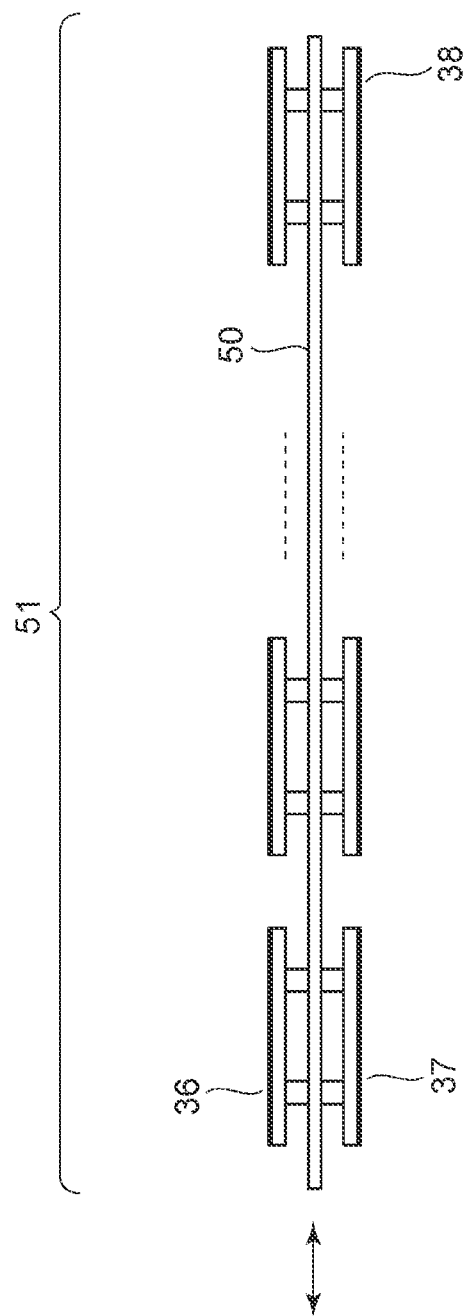

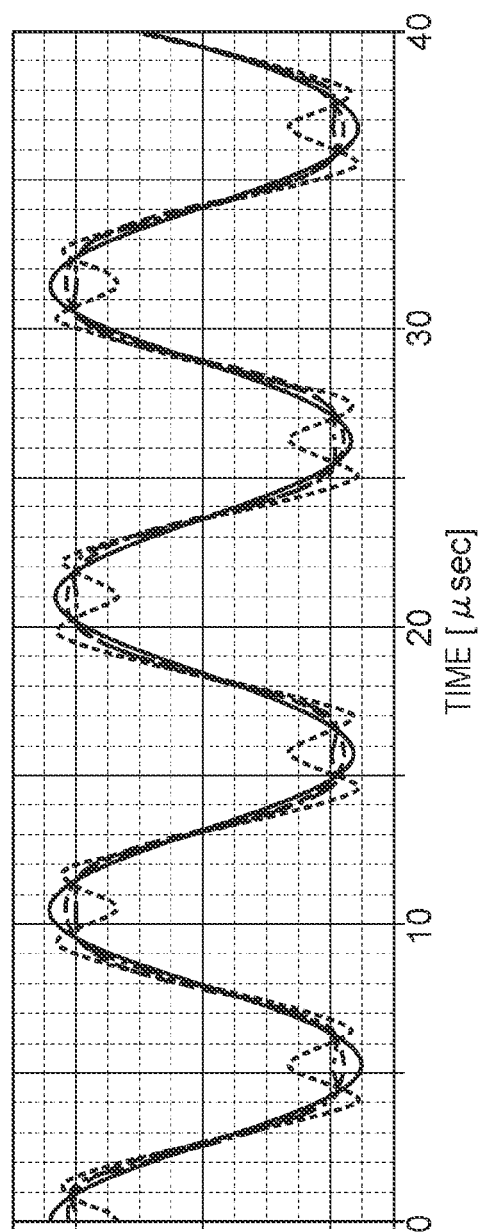

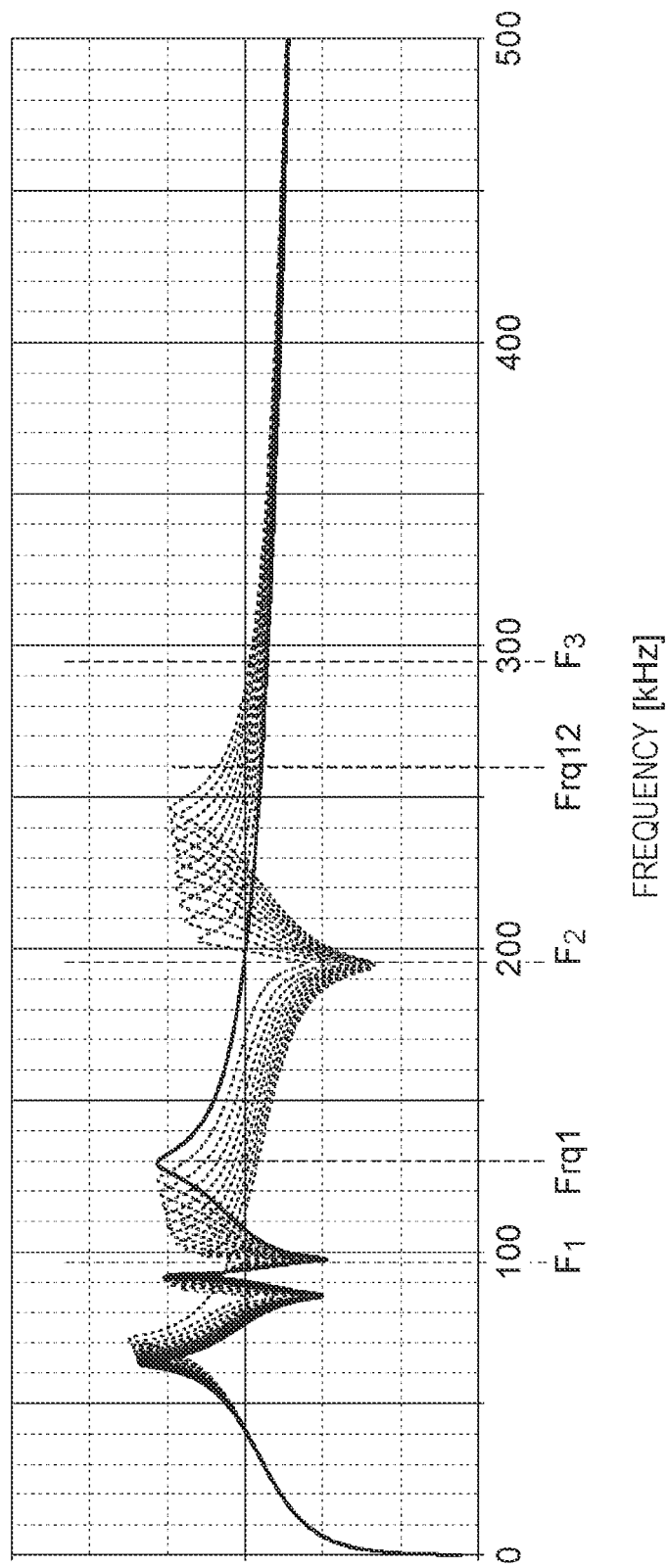

VIBRATION-TYPE DRIVE APPARATUS, AND DRIVE METHOD FOR VIBRATION-TYPE DRIVE APPARATUS

CROSS-REFERENCE TO RELATED APPLICATIONS

This application is a Continuation of International Patent Application No. PCT/JP2021/038594, filed Oct. 19, 2021, which claims the benefit of Japanese Patent Application No. 2020-177103, filed Oct. 22, 2020, Japanese Patent Application No. 2020-177104, filed Oct. 22, 2020, and Japanese Patent Application No. 2020-178549, filed Oct. 26, 2020, all of which are hereby incorporated by reference herein in their entirety.

TECHNICAL FIELD

This relates to a drive apparatus for an actuator using supersonic vibration.

BACKGROUND ART

In a vibration-type actuator using a vibrator that is vibrated by an electromechanical energy conversion element (a piezoelectric element, an electrostriction element, or the like), a method of detecting a malfunction, such as a break of a vibrator, by measuring an applied voltage is known. For example, PTL 1 describes an example in which a break is detected by detecting the occurrence of a high frequency component of an alternating-current voltage applied to a vibrator via an inductor. PTL 2 describes an example in which a break is detected by detecting a change in the quality factor or peak frequency of a peak characteristic in the frequency characteristics of an applied voltage that changes depending on the characteristics of a step-up transformer.

In the case of a stand-alone vibrator as described in PTL 1, a change in the applied voltage due to a break is large, so the occurrence of a break can be detected from the occurrence of a high frequency component. However, there is the following inconvenience in a configuration in which a plurality of vibrator units in each of which an inductor element and a vibrator are connected in parallel is connected in series and a serially-connected vibrator device in which vibrators, respectively, are connected in parallel with secondary sides of a plurality of transformers and primary sides of the transformers are connected in series.

In other words, even when one vibrator breaks, a change in the waveform of the applied voltage between both ends of the series connection is small, and a high frequency component that appears in a frequency range higher than a drive frequency increases or reduces according to a frequency. For this reason, it is not possible to simply determine whether there is a break although a high frequency component has occurred.

When a method of detecting a peak frequency or a quality factor is used by focusing on a peak characteristic in the frequency characteristics of an applied voltage using the frequency characteristics of a secondary side of a transformer as in the case of PTL 2 is used, a malfunction in each individual vibrator can be detected. However, in a serially-connected vibrator device as described above, an alternating-current voltage applied to each of the vibrators needs to be detected, so there is a drawback that a circuit size increases although a malfunction location can be detected. There is an inconvenience that, when a peak frequency and a quality factor are detected using frequency sweep or pseudo-random number in a high-frequency range are detected by independently superposing another high frequency voltage while a normal drive voltage is being applied, it may cause speed fluctuations and noise. A vibration-type unit in which a plurality of vibrators is connected has such properties that the vibration-type unit can continue to be driven even with a break because, if a break of one vibrator of the plurality of vibrators occurs, an applied voltage is supplied to the other vibrators and the vibration-type unit can be driven to some extent. However, a load on the other vibrators increases in a broken state, so there is an inconvenience that the degradation of performance advances at an accelerated rate.

CITATION LIST

Patent Literature

PTL 1 Japanese Patent No. 5716624
PTL 2 Japanese Patent Laid-Open No. 2018-078769

It is an object of the present invention to, in consideration of the above task, detect a break of a vibrator in driving in a vibrator unit made up of a plurality of vibrators.

SUMMARY OF INVENTION

A vibration-type drive apparatus to solve the task includes a control unit that outputs a command signal, a drive unit that outputs a drive signal in accordance with the command signal, a vibrator unit in which two or more vibrators that vibrate in accordance with the drive signal are connected, a drive signal analyzing unit that analyzes the drive signal and outputs an analysis result, and a determining unit that determines whether there is a break in wiring lines respectively coupled to the vibrators in accordance with the analysis result.

Further features of the present invention will become apparent from the following description of exemplary embodiments with reference to the attached drawings.

BRIEF DESCRIPTION OF DRAWINGS

FIG. 5A is a graph that shows a change in the drive voltage waveform in the event of a break according to the first embodiment.

FIG. 11 is a graph that shows a second example of a change in the frequency characteristics of a drive voltage amplitude in the event of a break according to the first embodiment.

FIG. 16C is a graph that shows a second example of an analysis result when driven with a pulse signal with a duty cycle of 38% according to the first embodiment.

FIG. 16D is a graph that shows a second example of an analysis result when driven with a pulse signal with a duty cycle of 38% according to the first embodiment.

FIG. 24 is a view that shows a configuration example of the vibration-type actuator according to the third embodiment.

FIG. 27 is a graph that shows a change in drive voltage waveform in the event of a break according to the third embodiment.

FIG. 49 is a graph that shows a second example of a change in the frequency characteristics of an inflow current amplitude in the event of a break according to the seventh embodiment.

DESCRIPTION OF EMBODIMENTS

An example of an embodiment of the present invention includes a vibration-type drive apparatus. The vibration-type drive apparatus includes a control unit that outputs a command signal, a drive unit that outputs a drive signal in accordance with the command signal, and a vibrator unit in which two or more vibrators that vibrate in accordance with the drive signal are connected. The vibration-type drive apparatus further includes a drive signal analyzing unit that analyzes the drive signal and outputs an analysis result, and a determining unit that determines whether there is a break in wiring lines respectively coupled to the vibrators in accordance with the analysis result.

Another example of an embodiment of the present invention is a control method as follows. The control method for a vibration-type drive apparatus includes outputting, by a control unit, a command signal to a drive unit to cause a vibrator unit made up of two or more vibrators to vibrate by using a drive signal output from the drive unit in accordance with the command signal. The control method for a vibration-type drive apparatus further includes analyzing the drive signal and outputting an analysis result to determine whether there is a break in wiring lines respectively coupled to the vibrators in accordance with the analysis result.

With this configuration, it is possible to detect a break in the vibrators in normal driving in a vibration-type actuator in which a plurality of vibrators is connected. Hereinafter, the description will be made in detail with reference to the accompanying drawings.

First Embodiment

Figure 1:
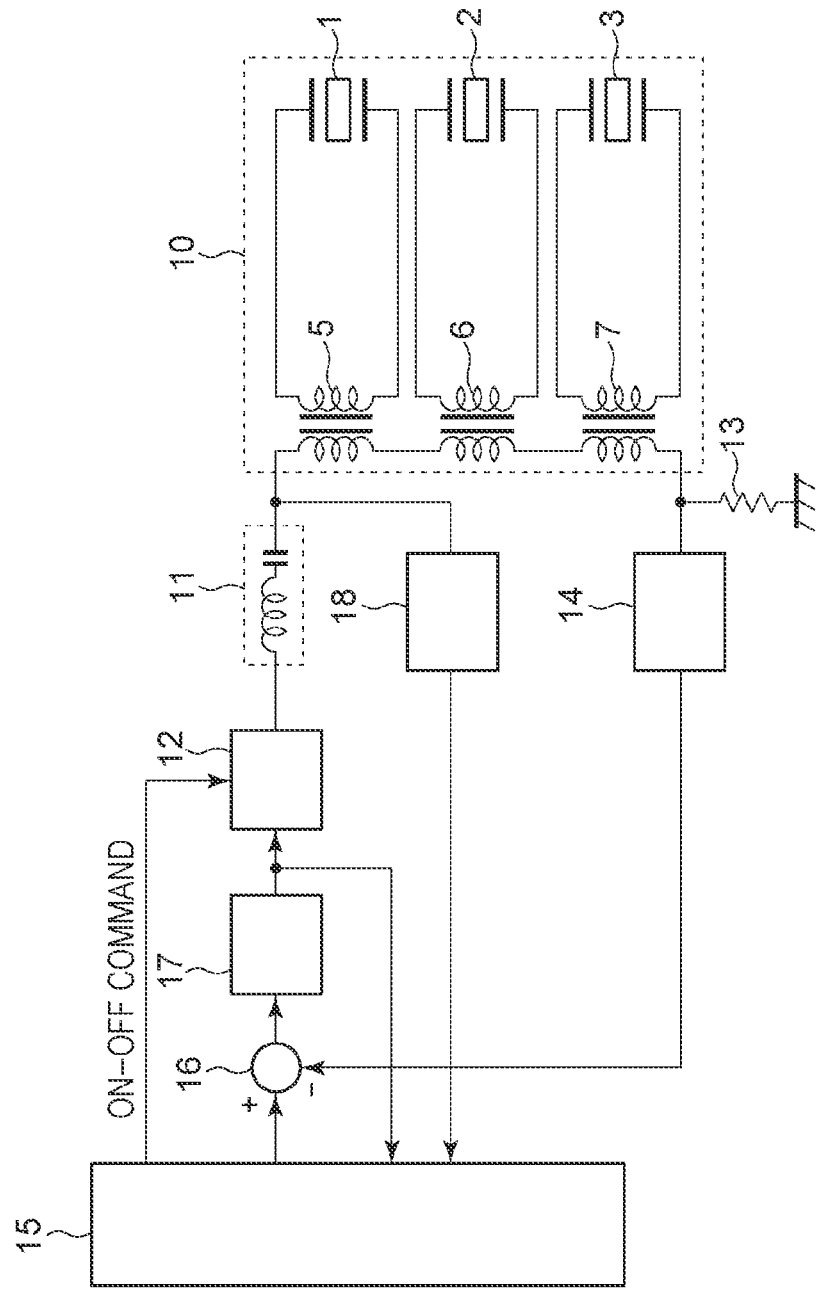
FIG. 1 is a diagram that shows a first example of a drive circuit of a vibration-type actuator according to a first embodiment.

FIG. 1 is a diagram that shows a drive circuit of a vibration-type actuator according to a first embodiment. Reference numerals 1, 2, and 3 indicate vibrators. Reference numerals 5, 6, and 7 indicate transformers of which primary-side inductors are connected in series. A portion surrounded by the dashed line and in which the vibrators 1, 2, 3, respectively, are connected in parallel with secondary sides of the transformers 5, 6, 7 represents an internal circuit of a vibration-type actuator 10 serving as a vibrator unit. An inductance value of each of secondary-side coils of the transformers respectively connected in parallel with the vibrators is matched with a predetermined frequency close to the resonant frequency of the vibration-type actuator 10.

In other words, where a matching frequency is $F_0$, a damping capacity value is $C_0$, and the inductance value of each of the secondary-side coils of the transformers is $L_0$, the relationship among these values is expressed by the expression 1.

$$2\pi \cdot F_0 = \frac{1}{\sqrt{L_0 \cdot C_0}} \quad (1)$$

Reference numeral 12 indicates a rectangular voltage generating unit that outputs a pulse signal according to a frequency command. The rectangular voltage generating unit 12 outputs a drive voltage to the vibration-type actuator 10 via a waveform shaping unit 11 made up of a series circuit of an inductor and a capacitor. Reference numeral 13 indicates a resistor for measuring a current flowing through the vibration-type actuator 10. The resistor 13 outputs a voltage proportional to a vibration speed of each of the vibrators 1, 2, 3. Therefore, a value of voltage that represents the whole of the vibration-type actuator 10 is detected from the output of the resistor 13.

Accurately, the amplitude of each vibrator is proportional to a value obtained by integrating the vibration speed with respect to time, and the amplitude of vibration speed is substantially proportional to a vibration amplitude. Therefore, in the following embodiments, the vibration amplitude is controlled by controlling the amplitude of a vibration speed signal.

Reference numeral 14 indicates an amplitude detecting unit for detecting the amplitude of a vibration speed signal detected by the resistor 13. Reference numeral 15 indicates a known CPU that outputs a vibration amplitude command of the vibration-type actuator 10 according to a command from a command unit (not shown). Reference numeral 16 indicates an amplitude comparing unit that compares the vibration amplitude command with the output of the amplitude detecting unit 14. Reference numeral 17 indicates an amplitude control unit that outputs a frequency command to the rectangular voltage generating unit 12 according to the output of the amplitude comparing unit 16. Reference numeral 18 indicates a drive signal analyzing unit that analyzes the waveform of a drive voltage of the vibration-type actuator 10. The CPU 15 that is a control unit outputs a command signal, such as an ON-OFF command, according to a waveform analysis result of the drive signal analyzing unit 18. In accordance with the command signal, a drive unit outputs a drive signal to the vibrator unit in which two or more vibrators are connected.

The CPU 15 that is the control unit outputs a command signal, such as an ON-OFF command, to the rectangular voltage generating unit 12 that is the drive unit to control the operation, such as drive and stop, of the vibration-type actuator 10.

The vibrator unit illustrated in FIG. 1 is configured such that the vibrators, respectively, are connected in parallel with the secondary sides of the plurality of transformers of which the primary sides are connected in series, and the primary sides of the plurality of transformers are configured to be applied with the drive signal. In addition, the waveform shaping unit inserted between the rectangular voltage generating unit and the vibrator unit is provided.

In this way, the vibration-type actuator 10 serving as the vibrator unit is made up of two or more vibrators connected, and the vibrators are configured to be respectively driven by a common command signal that the CPU 15 serving as the control unit issues.

Figure 2:
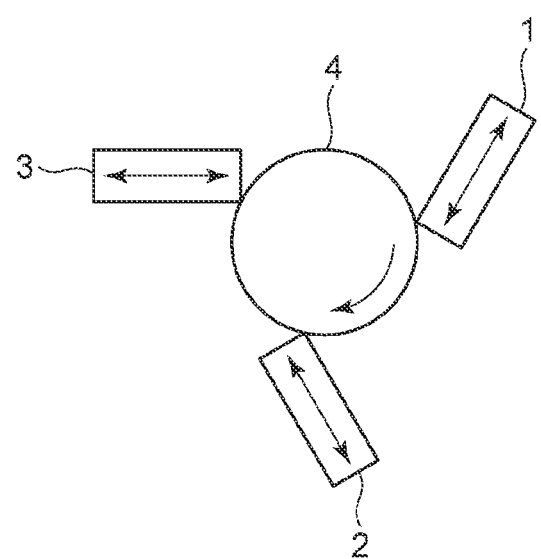
FIG. 2 is a view that shows a first example of the structure of the vibration-type actuator.

Here, a first example of the vibration-type actuator according to the present embodiment will be described. FIG. 2 is a view that shows the structure of the vibration-type actuator in which the three vibrators are brought into contact with the outer periphery of a cylindrical shaft to rotate the cylindrical shaft. Reference numerals 1, 2, and 3 indicate the vibrators that vibrate in a longitudinal direction (arrow direction), and reference numeral 4 indicates the cylindrical shaft. In the present embodiment, the vibrators 1, 2, 3 are disposed at substantially equal intervals of 120° on the circumference of the cylindrical shaft 4. When the vibrators 1, 2, 3 are vibrated to excite longitudinal vibrations, the cylindrical shaft 4 rotates in a clockwise direction. The cylindrical shaft corresponds to a common contact body that contacts with the vibrator unit in which two or more vibrators are connected. The cylindrical shaft moves relatively to the vibrators in a direction of a resultant force generated by driving the vibrators 1, 2, 3.

Figure 3:
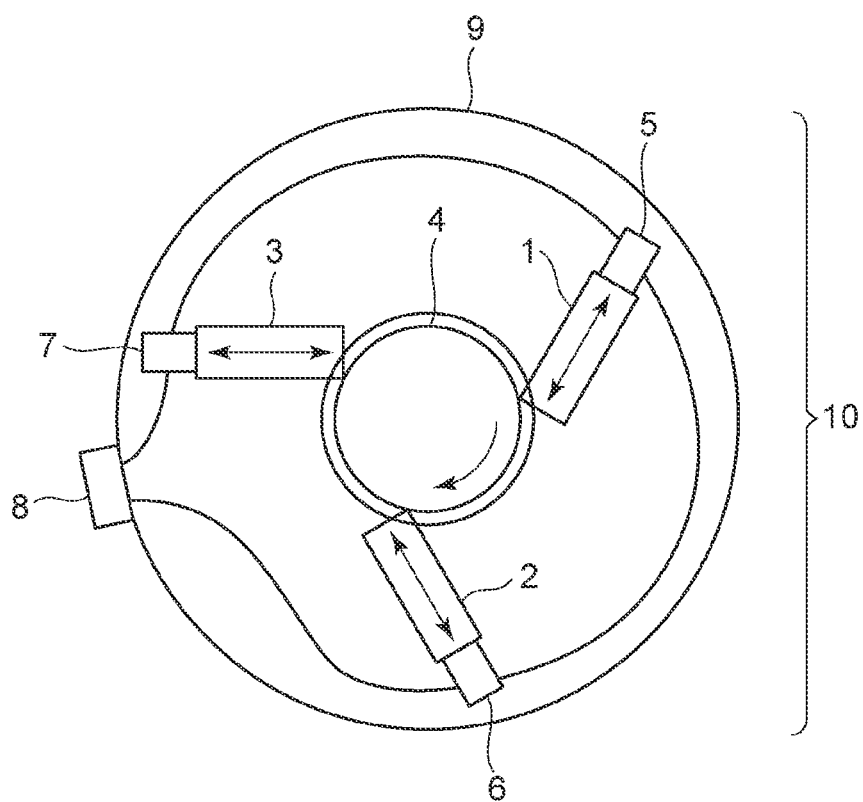
FIG. 3 is a view that shows electrical connection in the vibration-type actuator.

FIG. 3 is a view that shows electrical connection in the vibration-type actuator 10. Reference numerals 5, 6, and 7 indicate transformers. The secondary-side coils of the transformers 5, 6, 7, respectively, are connected in parallel with piezoelectric bodies respectively bonded to the vibrators 1, 2, 3. Reference numeral 8 indicates a connector for inputting an alternating-current voltage to the vibration-type actuator 10. Primary-side coils of the transformers 5, 6, 7 are connected in series, and both ends of the serially-connected primary-side coils are connected. Reference numeral 9 indicates a doughnut-shaped hollow case. The vibrators are accommodated in the hollow case, and these are integrated to make up the vibration-type actuator 10 in which the plurality of vibrators is connected.

The vibrators 1, 2, 3 respectively have protruding portions at a hollow cylindrical portion that passes through the cylindrical shaft 4 of the case 9. The protruding portions are brought into press-contact with the cylindrical shaft 4 at intervals of 120°. Each of the vibrators 1, 2, 3 is pressed against the cylindrical shaft 4 with a certain pressing force by a supporting member including a spring structure (not shown). Next, the operation of the CPU 15 will be described. The CPU 15 outputs a command signal related to a vibration amplitude in accordance with a vibration amplitude table corresponding to a speed command according to a speed command from the command unit (not shown). The CPU 15 periodically monitors an analysis result of the drive signal analyzing unit 18 in driving. When an analysis result falls outside a predetermined range, the CPU 15 determines that there is a break in any one of the vibrators 1, 2, 3 and sets a vibration amplitude command to zero to stop the vibration-type actuator. The CPU 15 may further operate so as to inform the occurrence of a break to the command unit (not shown) in addition to stopping operation.

Figure 4:
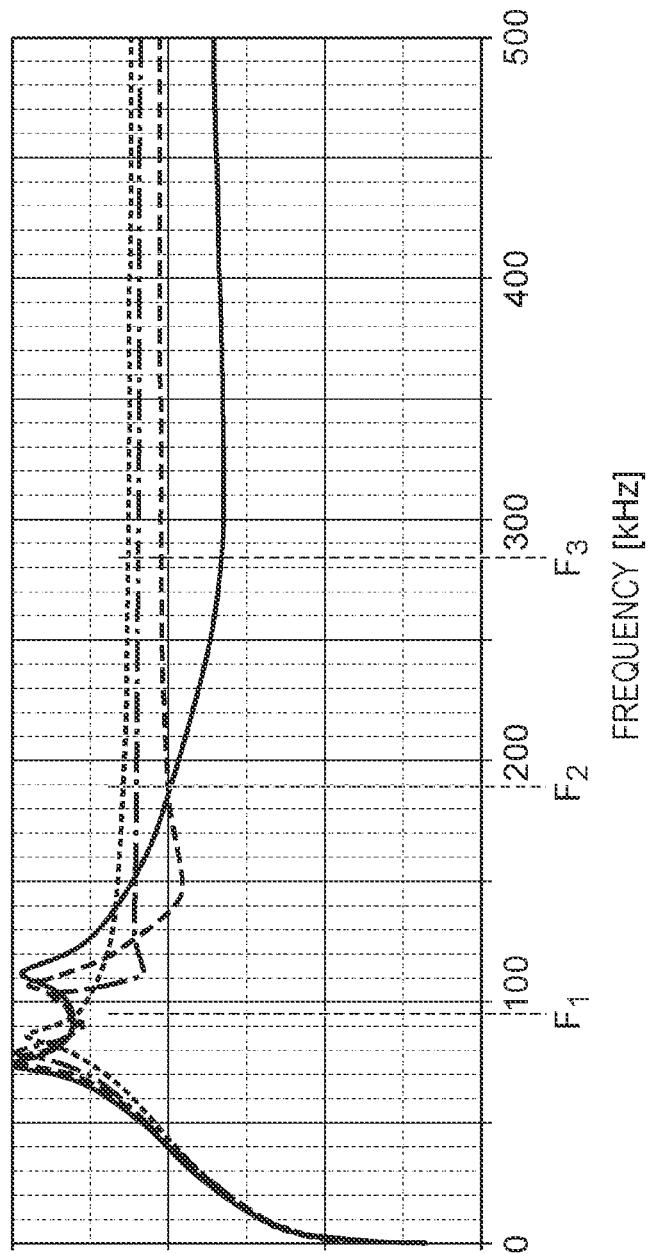
FIG. 4 is a graph that shows a first example of a change in the frequency characteristics of a drive voltage amplitude in the event of a break according to the first embodiment.

Next, the operation of the drive signal analyzing unit 18 will be described. FIG. 4 is a graph that shows a change in the frequency characteristics of a drive voltage amplitude in the event of a break in connection of the vibrators of the vibration-type actuator 10. This graph is the amplitude of a drive voltage measured by sweeping frequency on the assumption that the rectangular voltage generating unit 12 outputs a drive signal that is a sinusoidal voltage signal. The range of the drive frequency of the vibration-type actuator 10 according to the present embodiment is a range of about 93 kHz to about 98 kHz.

In FIG. 4, the solid line represents that there is no break, the dashed line represents that a wiring line coupled to one of the vibrators has a break, the alternate long and short dashed line represents that wiring lines respectively coupled to two of the vibrators each have a break, and the dotted line represents that wiring lines respectively coupled to all the vibrators each have a break. In FIG. 4, $F_1$ represents the frequency of a fundamental of a drive voltage waveform in a frequency range used for normal driving, and $F_2$ represents the frequency of a second-order harmonic of the drive voltage waveform, and $F_3$ represents the frequency of a third-order harmonic of the drive voltage waveform. When the respective-order voltage amplitudes of FIG. 4 are compared with one another, it appears that the ratio of amplitude among the orders varies depending on the number of breaks and the waveforms are changed. Since the frequency $F_3$ of the third-order harmonic of the drive voltage is near the frequency (around 310 kHz) of the lowest point of the valley of the frequency characteristics when there is no break, the amplitude of the third-order harmonic significantly changes in the event of a break to increase a change in waveform in the event of a break.

Figure 5B:
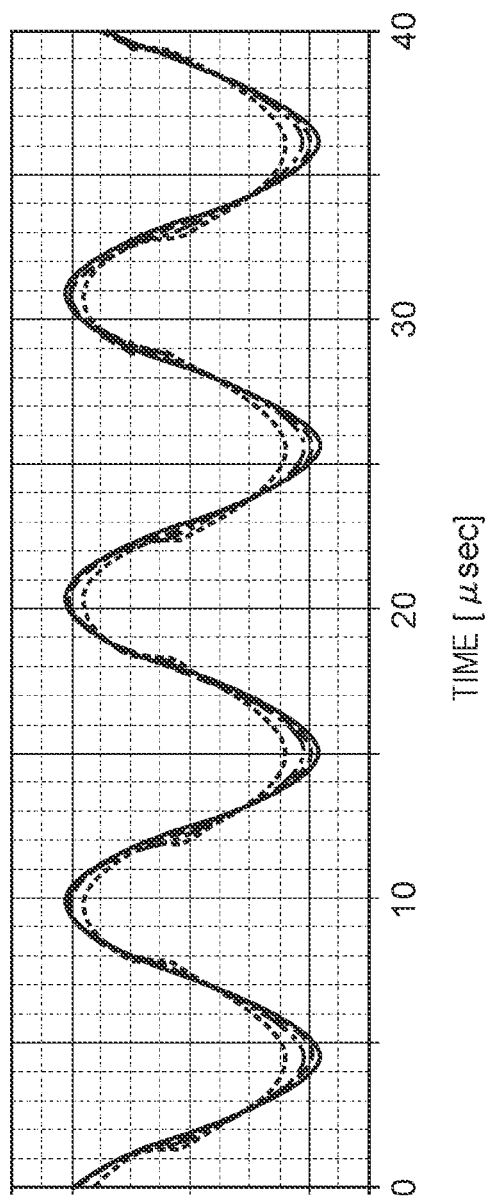
FIG. 5B is a graph that shows a change in the drive voltage waveform in the event of a break according to the first embodiment.

FIGS. 5A and 5B show a change in the waveform of a drive voltage. FIG. 5A is a graph when the rectangular voltage generating unit 12 outputs a pulse signal with a duty cycle of 50%. FIG. 5B is a graph when the rectangular voltage generating unit 12 outputs a pulse signal with a duty cycle of 38%. The solid line represents that there is no break, the dashed line represents that one of the vibrators has a break, the alternate long and short dashed line represents that two of the vibrators each have a break, and the dotted line represents that all the vibrators each have a break.

It really appears that, in each of FIGS. 5A and 5B, part of a smooth waveform steeply changes as a break occurs and a rectangular wave is superposed. It also appears that a steep waveform increases and, on the other hand, the amplitude reduces as the number of breaks increases and, therefore, the percentage of a rectangular wave component to be superposed increases.

Figure 6A:
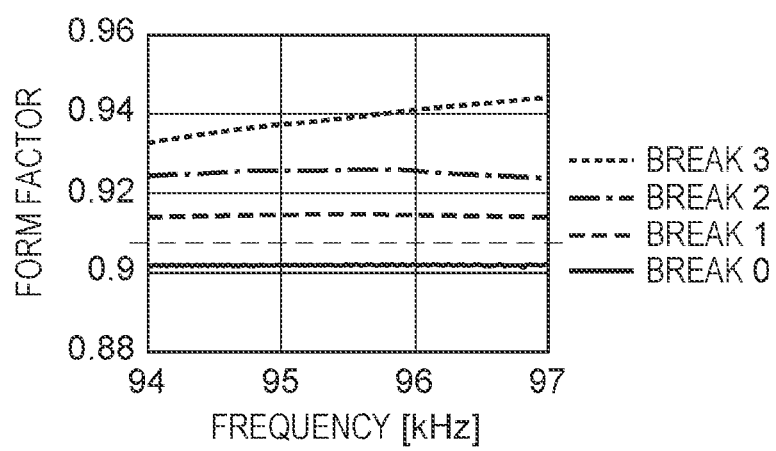
FIG. 6A is a graph that shows a first example of an analysis result when driven with a pulse signal with a duty cycle of 50% according to the first embodiment.
Figure 6B:
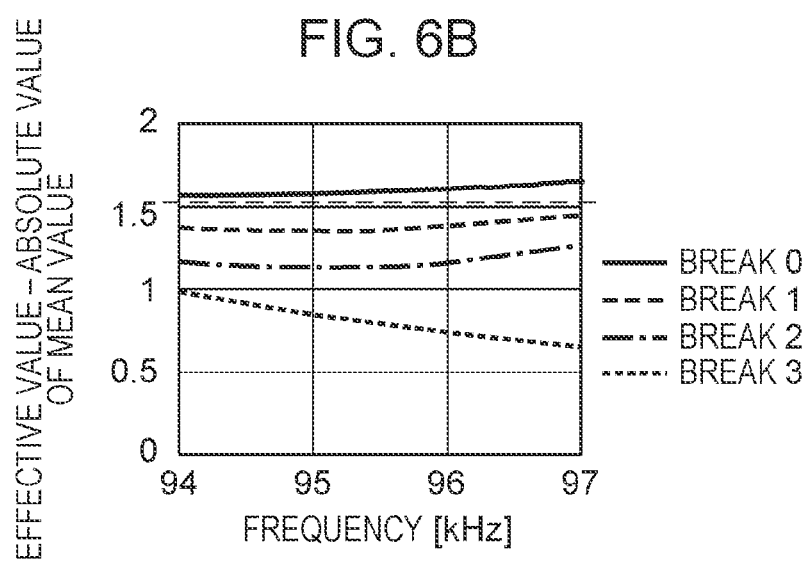
FIG. 6B is a graph that shows a first example of an analysis result when driven with a pulse signal with a duty cycle of 50% according to the first embodiment.

FIGS. 6A, 6B, 6C, and 6D show an example of waveform analysis results of the drive signal analyzing unit 18 when the rectangular voltage generating unit 12 outputs a pulse signal with a duty cycle of 50%. FIGS. 6A and 6B are graphs calculated in accordance with a mean value of the absolute value of a drive voltage and an effective value of the drive voltage while the frequency of the drive voltage is changed. FIG. 6A shows the results of a form factor ((a mean value of an absolute value)/an effective value). FIG. 6B shows the results obtained by subtracting (a mean value of an absolute value) from an effective value.

An effective value of an alternating-current signal approaches a mean value of the absolute value of the alternating-current signal as the effective value has a wave more similar to a rectangular wave. Therefore, when a rectangular component to be superposed as a result of an increase in the number of breaks increases, the form factor approaches one, and a value obtained by subtracting (a mean value of the absolute value) from an effective value reduces.

The waveform to be analyzed in this way may be a waveform of a mean value of the absolute value of a drive voltage for the frequency of the drive voltage or a waveform of an effective value of a drive voltage for the frequency of the drive voltage.

Figure 6C:
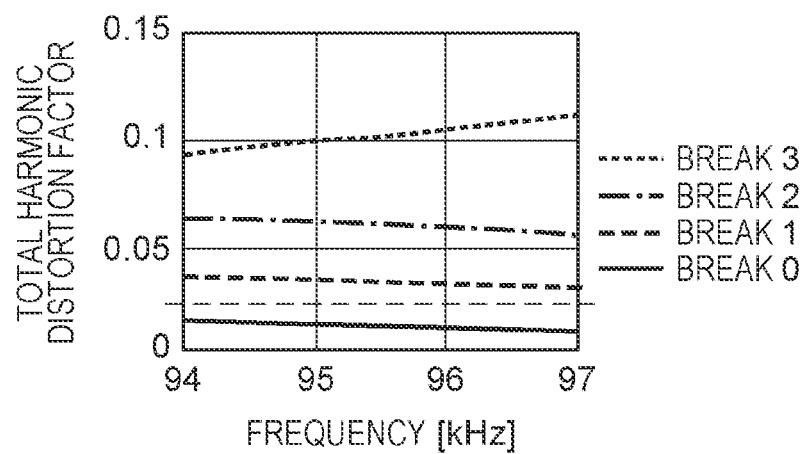
FIG. 6C is a graph that shows a first example of an analysis result when driven with a pulse signal with a duty cycle of 50% according to the first embodiment.
Figure 6D:
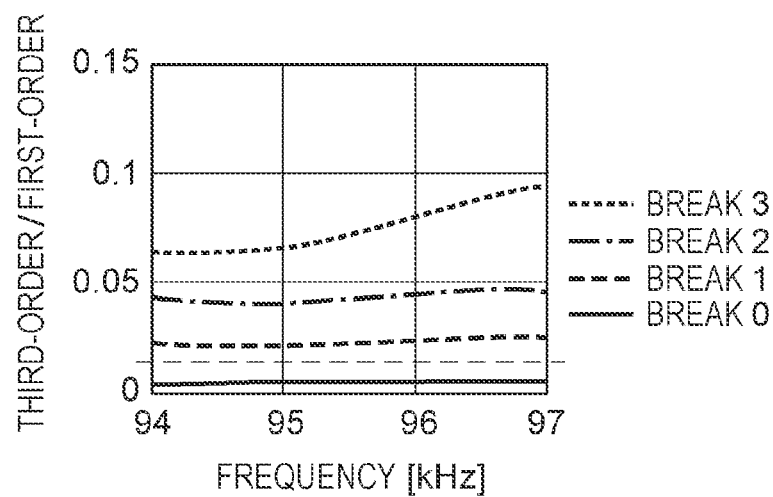
FIG. 6D is a graph that shows a first example of an analysis result when driven with a pulse signal with a duty cycle of 50% according to the first embodiment.

FIGS. 6C and 6D are graphs calculated from the amplitude of harmonics of a drive voltage. FIG. 6C is a graph that shows a total harmonic distortion factor (a value obtained by dividing the amplitude of a high frequency component (harmonic component) other than a fundamental) for evaluating a degree of the high frequency component. FIG. 6D is a graph that shows a value obtained by dividing the amplitude of a third-order harmonic by the amplitude of a fundamental. Other than a method using a known fast Fourier transform (FFT), the following method can be used as a method of measuring the amplitude of a fundamental and harmonics. In other words, there are a method of measuring the amplitudes of a fundamental and a high frequency component (harmonic component) by separating the fundamental and the high frequency component (harmonic component) with a low-pass filter, a method of measuring the amplitude by extracting a specific-order harmonic with a band-pass filter, and the like. In the present embodiment, a waveform is analyzed by using the drive signal analyzing unit 18. Alternatively, a time-series waveform of a drive voltage may be loaded onto the CPU 15 by using an A/D converter (not shown), and waveform analysis may be performed by using calculation, such as FFT. In this case, fifth-order and higher harmonics are attenuated with the low-pass filter and then input to the A/D converter. Thus, it is possible to decrease a sampling frequency of the A/D converter. Since third-order or lower harmonics significantly influence a change in waveform, it is desirable to perform sampling at a sufficient sampling frequency (for example, a frequency higher than or equal to 12 times the fundamental) to detect a third-order harmonic. In this way, analysis may be performed on the amplitude of a third-order harmonic and the amplitude of a fundamental for the frequency of a drive voltage.

Second-order and higher harmonic components of a rectangular wave are substantially increased due to a break from the frequency characteristics of the drive voltage amplitude of FIG. 4. Therefore, a harmonic distortion factor and a value obtained by dividing the amplitude of a third-order harmonic (a frequency near $F_3$) by the amplitude of a fundamental (a frequency near $F_1$) increases as the number of breaks increases.

A threshold for determining whether there is a break is shown by the long dashed line in each of the graphs of FIGS. 6A, 6B, 6C, and 6D. When the threshold is used, it is possible to determine whether there is a break even in driving at any frequency in the range from 94 kHz to 97 kHz from the result of each waveform analysis calculation.

Figure 7A:
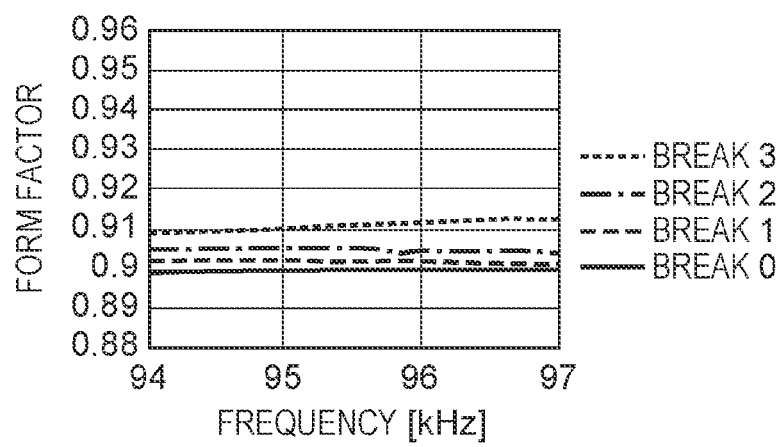
FIG. 7A is a graph that shows a first example of an analysis result when driven with a pulse signal with a duty cycle of 38% according to the first embodiment.
Figure 7B:
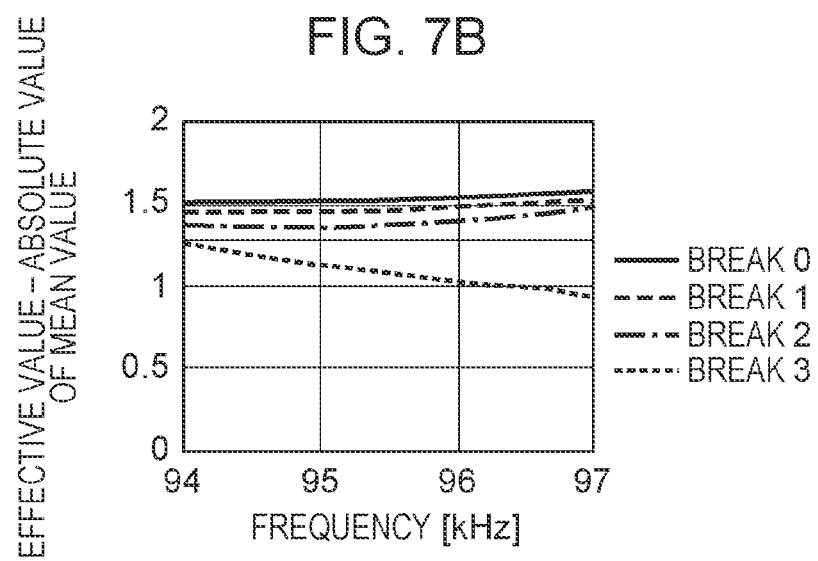
FIG. 7B is a graph that shows a first example of an analysis result when driven with a pulse signal with a duty cycle of 38% according to the first embodiment.
Figure 7C:
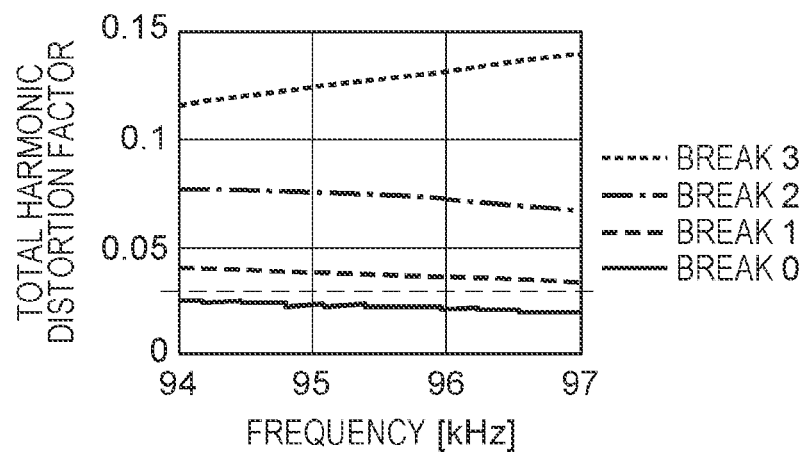
FIG. 7C is a graph that shows a first example of an analysis result when driven with a pulse signal with a duty cycle of 38% according to the first embodiment.
Figure 7D:
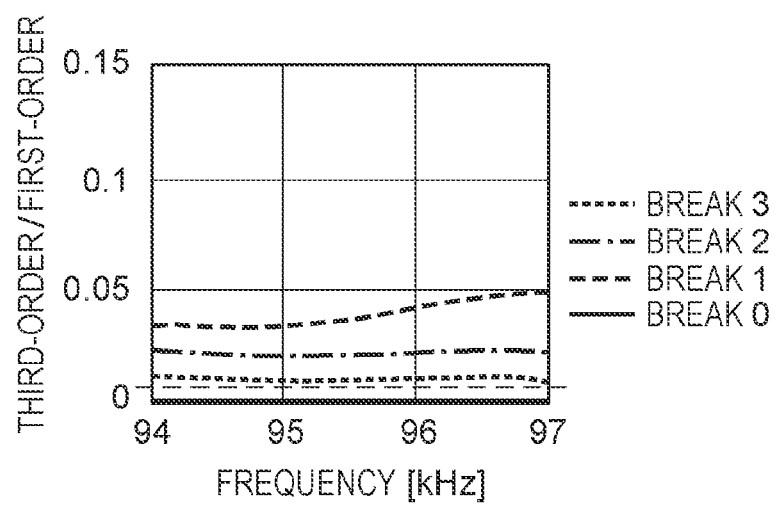
FIG. 7D is a graph that shows a first example of an analysis result when driven with a pulse signal with a duty cycle of 38% according to the first embodiment.

FIGS. 7A, 7B, 7C, and 7D show an example of waveform analysis results of the drive signal analyzing unit 18 when the rectangular voltage generating unit 12 outputs a pulse signal with a duty cycle of 38%. FIGS. 7A and 7B are graphs calculated in accordance with a mean value of the absolute value of a drive voltage and an effective value of the drive voltage while the frequency of the drive voltage is changed. FIG. 7A shows the results of a form factor ((a mean value of an absolute value)/an effective value). FIG. 7B shows the results obtained by subtracting (a mean value of an absolute value) from an effective value. FIGS. 7C and 7D are graphs calculated from the amplitude of harmonics of a drive voltage. FIG. 7C is a graph that shows a total harmonic distortion factor (a value obtained by dividing the amplitude of a high frequency component (harmonic component) other than a fundamental by the amplitude of the fundamental). FIG. 7D is a graph that shows a value obtained by dividing the amplitude of a third-order harmonic by the amplitude of a fundamental.

The analysis results of FIGS. 7A and 7B uniformly change in an increasing or reducing direction due to a break; however, the result of break 0 and the result of break 1 are close to each other, so the reliability of break determination is low even a threshold is provided between the results. The analysis results of FIGS. 7C and 7D are relatively easy to determine whether there is a break since there is a sufficient gap between break 0 and break 1.

Figure 8A:
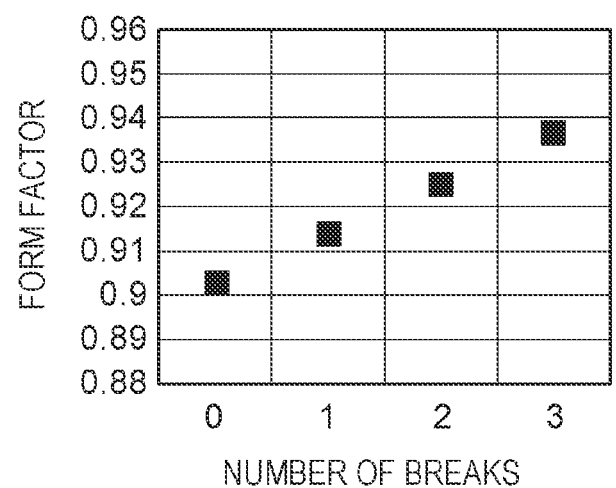
FIG. 8A is a graph that shows a first example of the relationship between the number of breaks and an analysis result when driven with a pulse signal with a duty cycle of 50% according to the first embodiment.
Figure 8B:
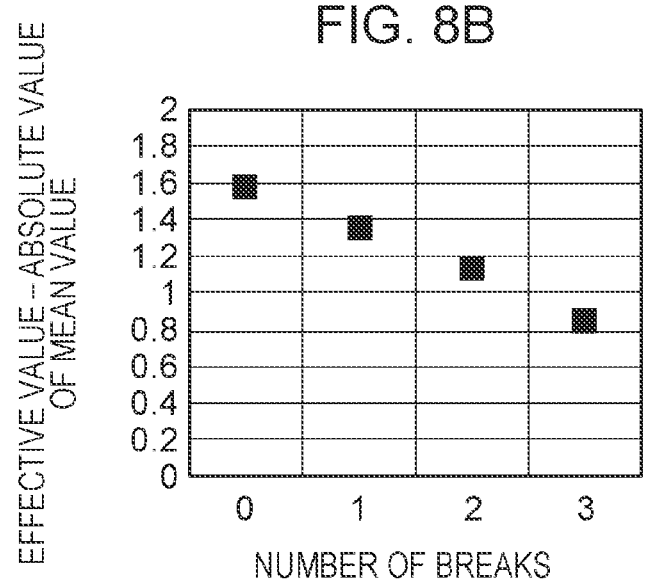
FIG. 8B is a graph that shows a first example of the relationship between the number of breaks and an analysis result when driven with a pulse signal with a duty cycle of 50% according to the first embodiment.
Figure 8C:
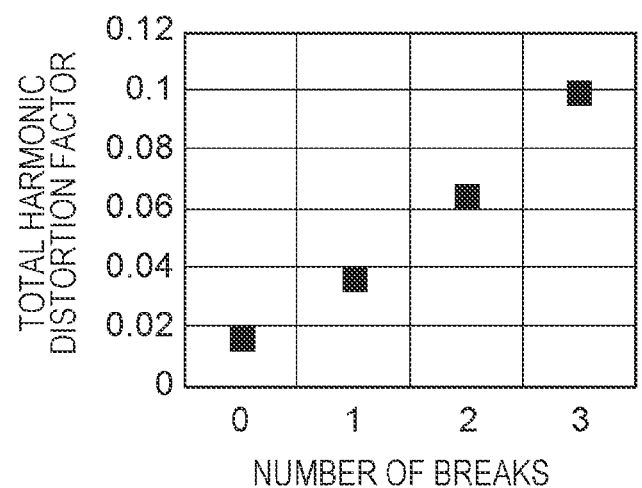
FIG. 8C is a graph that shows a first example of the relationship between the number of breaks and an analysis result when driven with a pulse signal with a duty cycle of 50% according to the first embodiment.
Figure 8D:
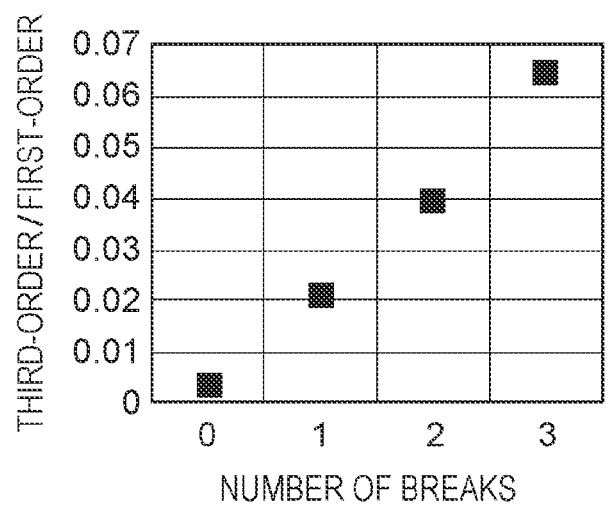
FIG. 8D is a graph that shows a first example of the relationship between the number of breaks and an analysis result when driven with a pulse signal with a duty cycle of 50% according to the first embodiment.

FIGS. 8A, 8B, 8C, and 8D are graphs that show a change in analysis result for the number of breaks when the frequency in a state where the rectangular voltage generating unit 12 outputs a pulse signal with a duty cycle of 50% is fixed at a predetermined frequency in accordance with FIGS. 6A, 6B, 6C, and 6D. FIG. 8A is a graph that shows a form factor. FIG. 8B is a graph that shows a value obtained by subtracting (a mean value of an absolute value) from an effective value. FIG. 8C is a graph that shows a total harmonic distortion factor. FIG. 8D is a graph that shows a value obtained by dividing the amplitude of a third-order harmonic by the amplitude of a fundamental. The values uniformly change according to the number of breaks as shown in FIGS. 8A, 8B, 8C, and 8D substantially in a frequency range from 94 kHz to 97 kHz, so it is possible to calculate the number of breaks.

Figure 9A:
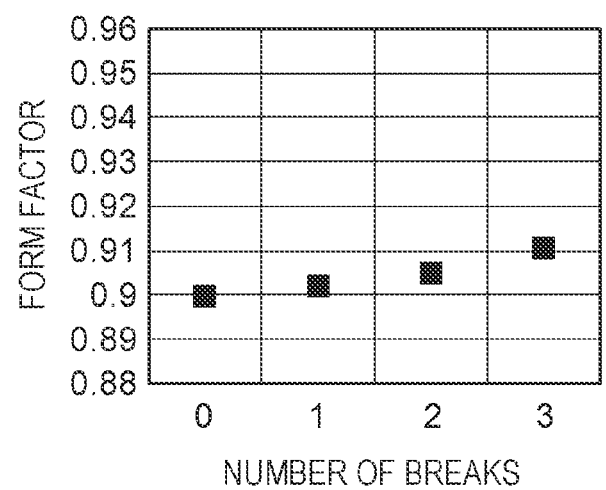
FIG. 9A is a graph that shows a first example of the relationship between the number of breaks and an analysis result when driven with a pulse signal with a duty cycle of 38% according to the first embodiment.
Figure 9B:
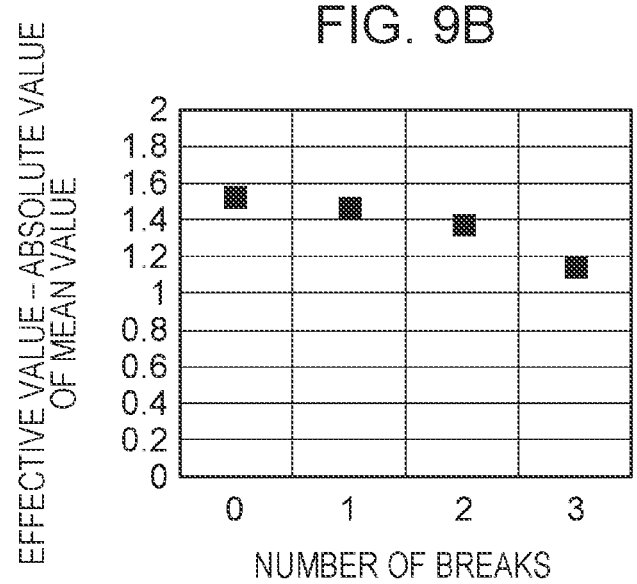
FIG. 9B is a graph that shows a first example of the relationship between the number of breaks and an analysis result when driven with a pulse signal with a duty cycle of 38% according to the first embodiment.
Figure 9C:
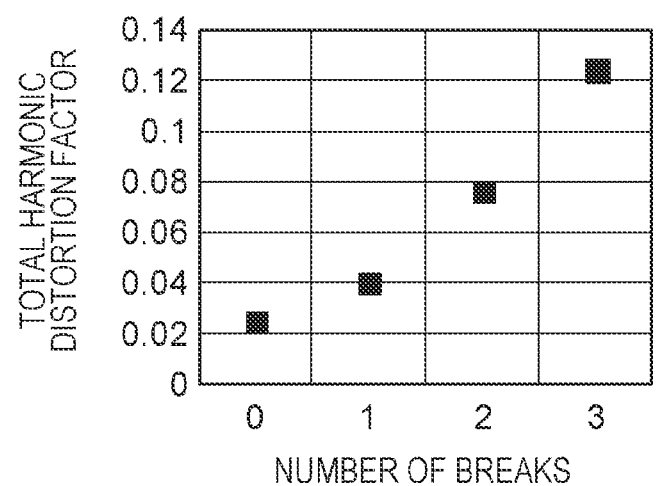
FIG. 9C is a graph that shows a first example of the relationship between the number of breaks and an analysis result when driven with a pulse signal with a duty cycle of 38% according to the first embodiment.
Figure 9D:
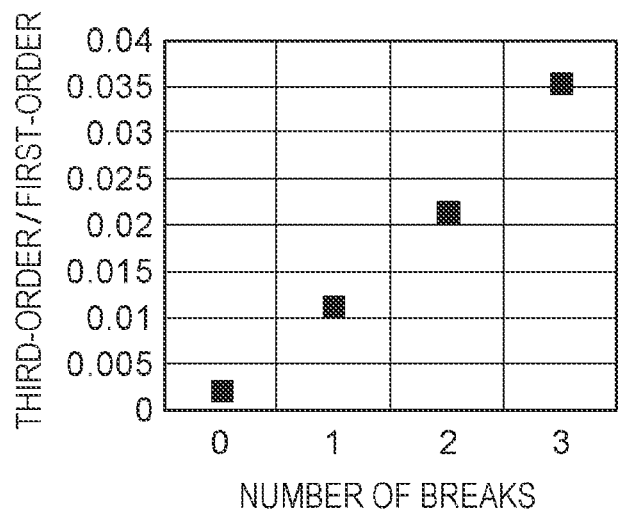
FIG. 9D is a graph that shows a first example of the relationship between the number of breaks and an analysis result when driven with a pulse signal with a duty cycle of 38% according to the first embodiment.

FIGS. 9A, 9B, 9C, and 9D are graphs that show a change in analysis result for the number of breaks when the frequency in a state where the rectangular voltage generating unit 12 outputs a pulse signal with a duty cycle of 38% is fixed at a predetermined frequency in accordance with FIGS. 7A, 7B, 7C, and 7D. FIG. 9A is a graph that shows a form factor. FIG. 9B is a graph that shows a value obtained by subtracting (a mean value of an absolute value) from an effective value. FIG. 9C is a graph that shows a total harmonic distortion factor. FIG. 9D is a graph that shows a value obtained by dividing the amplitude of a third-order harmonic by the amplitude of a fundamental.

As in the case of the description of FIGS. 7A, 7B, 7C, and 7D, the analysis results of FIGS. 9A and 9B uniformly change in an increasing or reducing direction due to a break; however, the results between the numbers of breaks are close to each other, so an error can increase even when the number of breaks is calculated. The analysis results of FIGS. 9C and 9D have a sufficient gap between break 0 and break 1, so it is possible to calculate the number of breaks as in the case of a duty cycle of 50%.

The reason why there is a large difference between the analysis results for a duty cycle of 50% and the analysis results for a duty cycle of 38% in this way is that the amplitude ratio between second-order and third-order harmonics of a pulse signal is different. The frequency characteristics of the drive voltage amplitude of FIG. 4 are such that a characteristic change due to a break is significant around the frequencies of second-order and third-order harmonics. Therefore, a difference in the amplitude ratio between the second-order and third-order harmonics of a pulse signal influences a difference in analysis result. Since the analysis result changes depending on a drive condition (duty cycle or drive frequency) in this way, it is effective to switch a waveform analyzing method depending on a drive condition in an application of which the drive condition changes.

Figure 10:
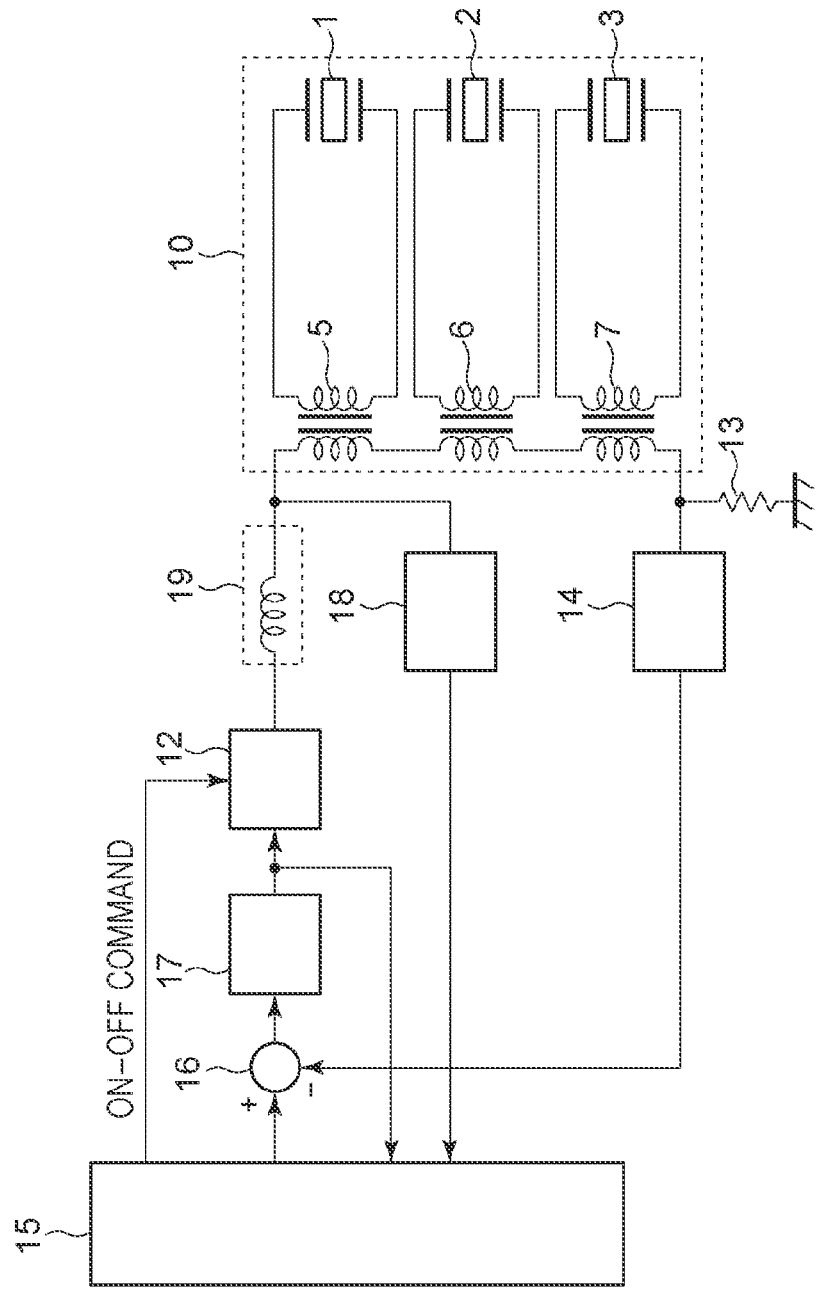
FIG. 10 is a diagram that shows a second example of the drive circuit of the vibration-type actuator according to the first embodiment.

FIG. 10 is a diagram that shows a configuration when the waveform shaping unit 11 of the drive circuit of the vibration-type actuator of FIG. 1 is replaced with a waveform shaping unit 19 having only an inductor. Although the operation of the CPU 15 is not different from that of the above-described example, a change in the frequency characteristics of the amplitude of a drive voltage in the event of a break in the vibrators of the vibration-type actuator 10 is different, so the analysis results of the drive signal analyzing unit 18 are different.

FIG. 11 is a graph that shows a change in the frequency characteristics of a drive voltage amplitude in the event of a break in connection of the vibrators of the vibration-type actuator 10 in the drive circuit of the vibration-type actuator of FIG. 10.

Since there is no capacitor to cut direct current in the waveform shaping unit, the frequency characteristics of a drive voltage amplitude in a low-frequency range are increased as compared to the characteristics of FIG. 4.

Figure 12A:
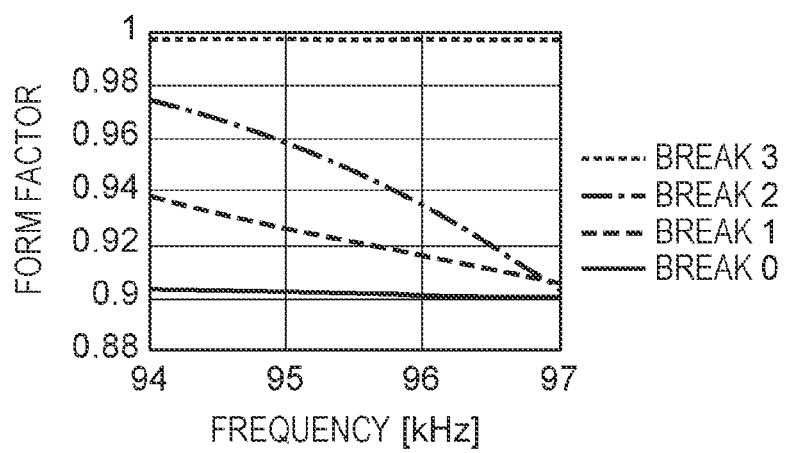
FIG. 12A is a graph that shows a second example of an analysis result when driven with a pulse signal with a duty cycle of 50% according to the first embodiment.
Figure 12B:
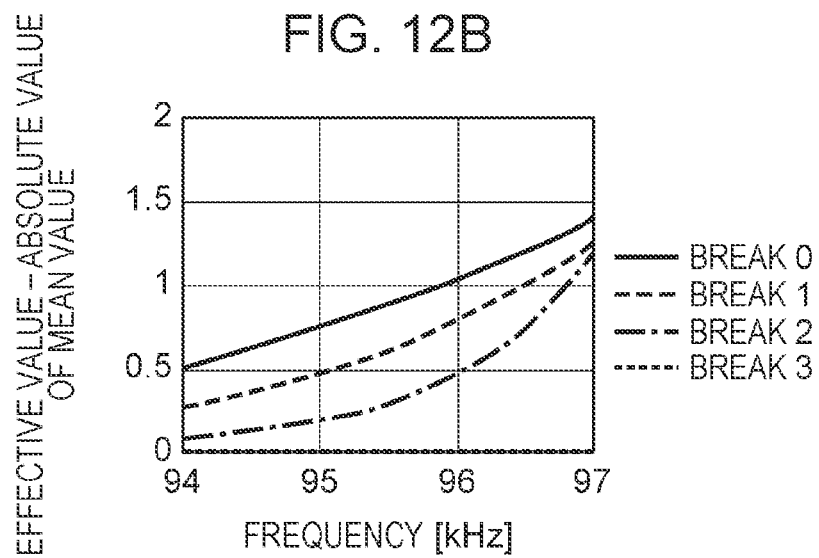
FIG. 12B is a graph that shows a second example of an analysis result when driven with a pulse signal with a duty cycle of 50% according to the first embodiment.
Figure 12C:
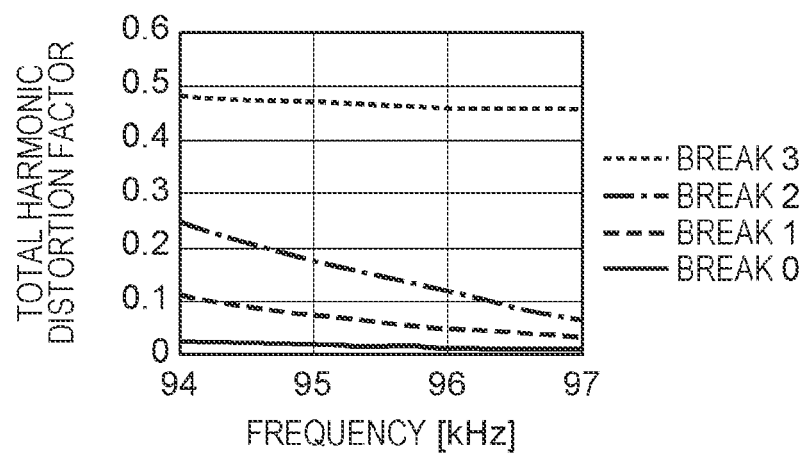
FIG. 12C is a graph that shows a second example of an analysis result when driven with a pulse signal with a duty cycle of 50% according to the first embodiment.
Figure 12D:
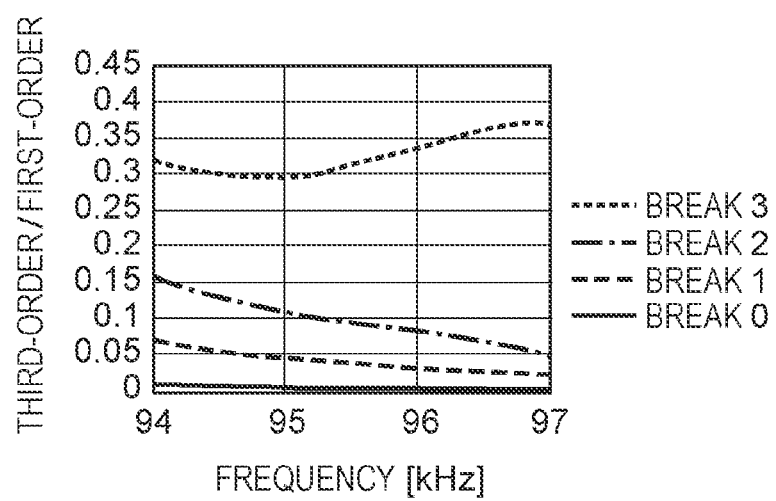
FIG. 12D is a graph that shows a second example of an analysis result when driven with a pulse signal with a duty cycle of 50% according to the first embodiment.

FIGS. 12A, 12B, 12C, and 12D show an example of waveform analysis results of a drive voltage by the drive signal analyzing unit 18 when the rectangular voltage generating unit 12 outputs a pulse signal with a duty cycle of 50%. FIG. 12A is a graph that shows a form factor. FIG. 12B is a graph that shows a value obtained by subtracting (a mean value of an absolute value) from an effective value. FIG. 12C is a graph that shows a total harmonic distortion factor (a value obtained by dividing the amplitude of a harmonic component other than a fundamental by the amplitude of the fundamental). FIG. 12D is a graph that shows a value obtained by dividing the amplitude of a third-order harmonic by the amplitude of a fundamental. In the graph of FIG. 11, the characteristics other than break 3 of which all the wiring lines each have a break and have less amplitude change in a high-frequency range (frequencies higher than or equal to $F_2$). In contrast, since the amplitude increases as the frequency approaches from 90 kHz to 100 kHz, a change in waveform due to a break reduces as the frequency of the fundamental (near $F_1$) approaches 100 kHz. Therefore, in the analysis results of FIGS. 12A, 12C, and 12D, changes in break 0, break 1, and break 2 reduce as the frequency increases.

In the analysis results of each of FIGS. 12A, 12B, 12C, and 12D, a change due to a break is small near 97 kHz; however, values uniformly change depending on the number of breaks. Therefore, it is possible to obtain whether there is a break and the number of breaks by measuring in advance the characteristics of the amplitude of a drive voltage generated due to a break and preparing analysis results as a comparison table for each frequency.

Figure 13:
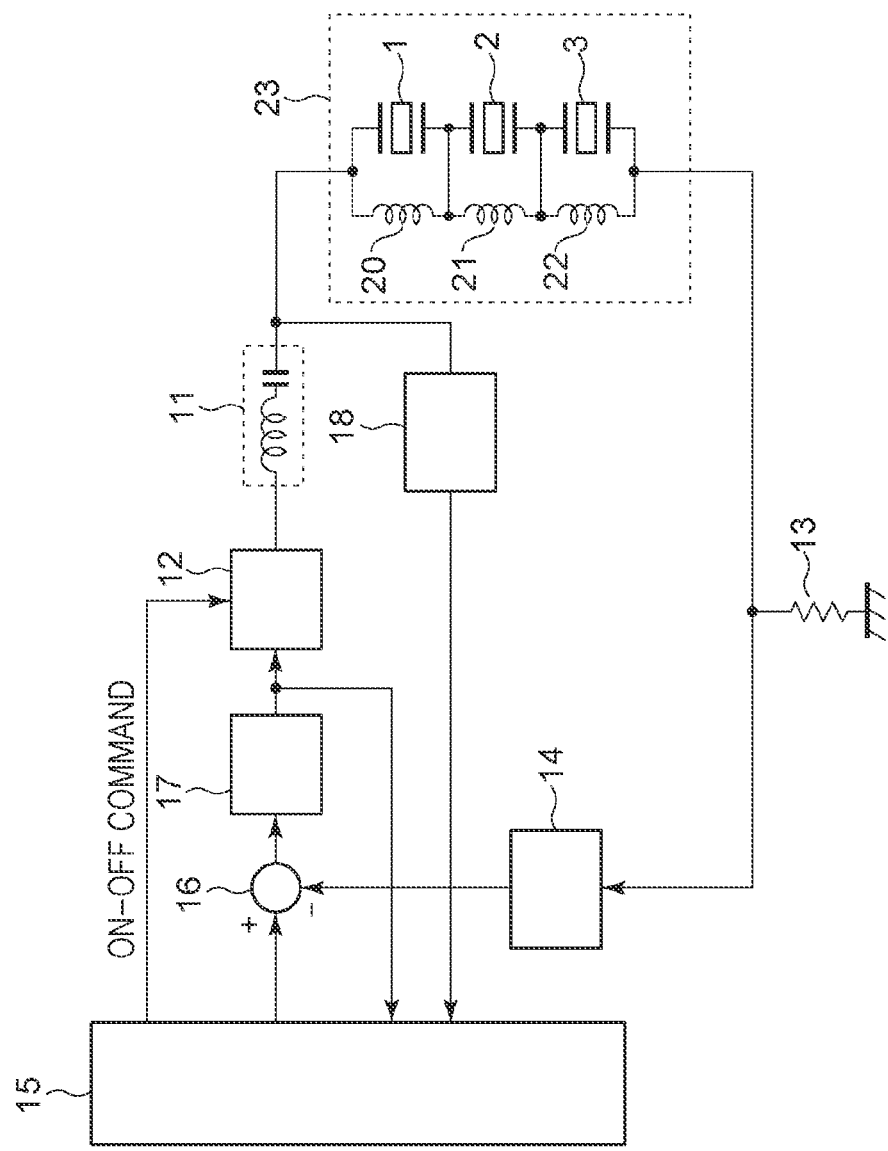
FIG. 13 is a diagram that shows a third example of the drive circuit of the vibration-type actuator according to the first embodiment.

FIG. 13 is a diagram that shows a third example of the drive circuit of the vibration-type actuator, which is an example of a case where the configuration of the vibration-type actuator is different. In the above-described example, the transformers 5, 6, 7, respectively, are connected in parallel with the vibrators 1, 2, 3 to make up the vibration-type actuator 10. In the present example, inductors 20, 21, 22, respectively, are connected in parallel with the vibrators 1, 2, 3, and the vibrators 1, 2, 3 are connected in series to make up a vibration-type actuator 23 as a vibrator unit. In other words, the vibrator unit in which a plurality of pairs of parallel-connected inductor and vibrator is connected in series is provided.

Since the operations of the units are similar to those of the above-described example, only the operation of the drive signal analyzing unit 18 will be described.

Figure 14:
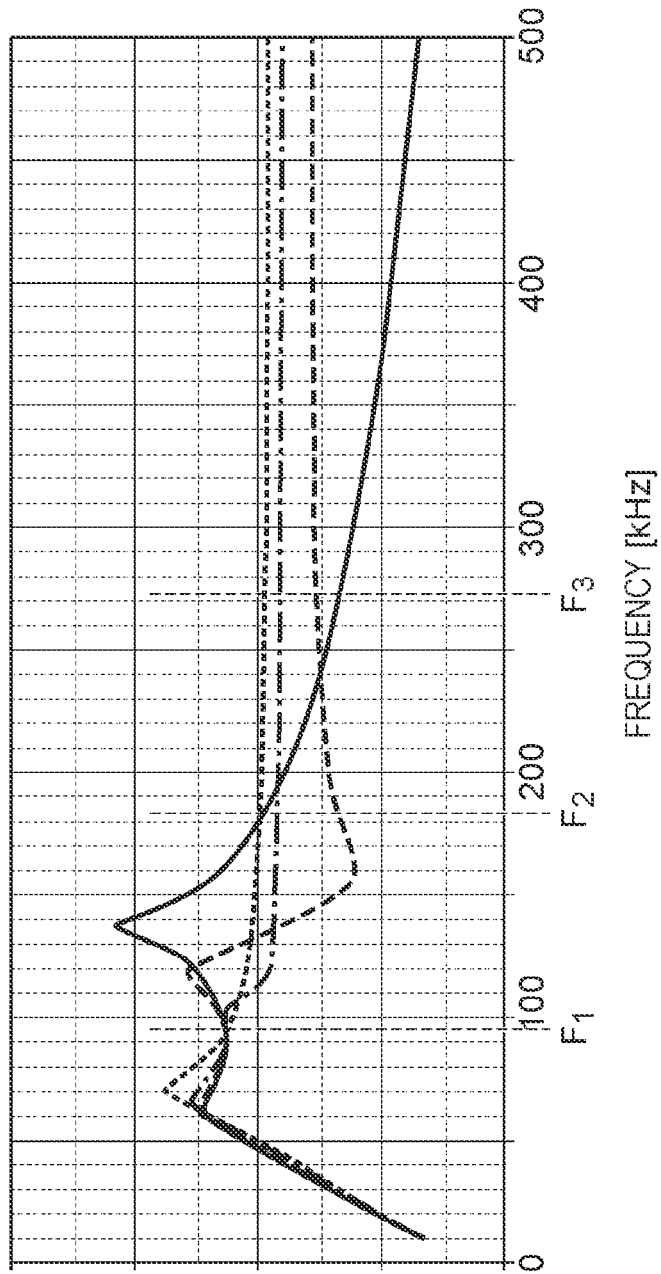
FIG. 14 is a graph that shows a third example of a change in the frequency characteristics of a drive voltage amplitude in the event of a break according to the first embodiment.

FIG. 14 is a graph that shows a change in the frequency characteristics of a drive voltage amplitude in the event of a break in connection of the vibrators of the vibration-type actuator 23. As in the case of the above description, this graph is the amplitude of a drive voltage measured by sweeping frequency on the assumption that the rectangular voltage generating unit 12 outputs a sinusoidal wave.

The solid line represents that there is no break, the dashed line represents that one of the vibrators has a break, the alternate long and short dashed line represents that two of the vibrators each have a break, and the dotted line represents that all the vibrators each have a break. $F_1$ represents the frequency of a fundamental of a drive voltage waveform used for normal driving, and $F_2$ represents the frequency of a second-order harmonic, and $F_3$ represents the frequency of a third-order harmonic.

Figure 15A:
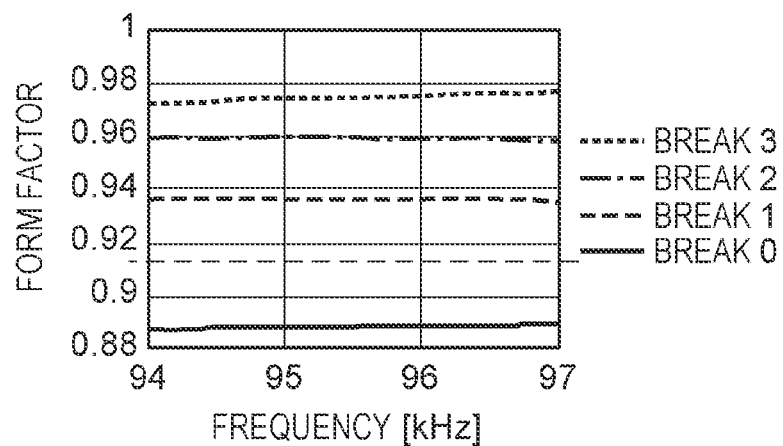
FIG. 15A is a graph that shows a third example of an analysis result when driven with a pulse signal with a duty cycle of 50% according to the first embodiment.
Figure 15B:
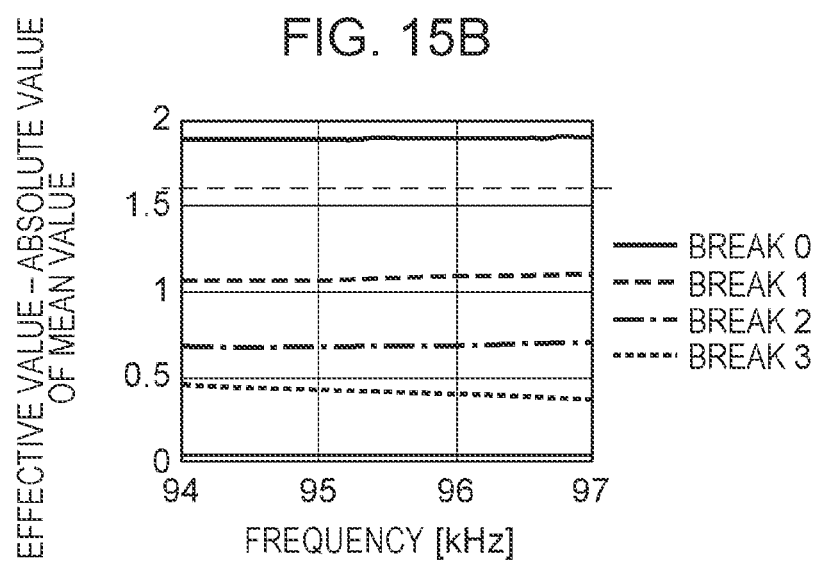
FIG. 15B is a graph that shows a third example of an analysis result when driven with a pulse signal with a duty cycle of 50% according to the first embodiment.
Figure 15C:
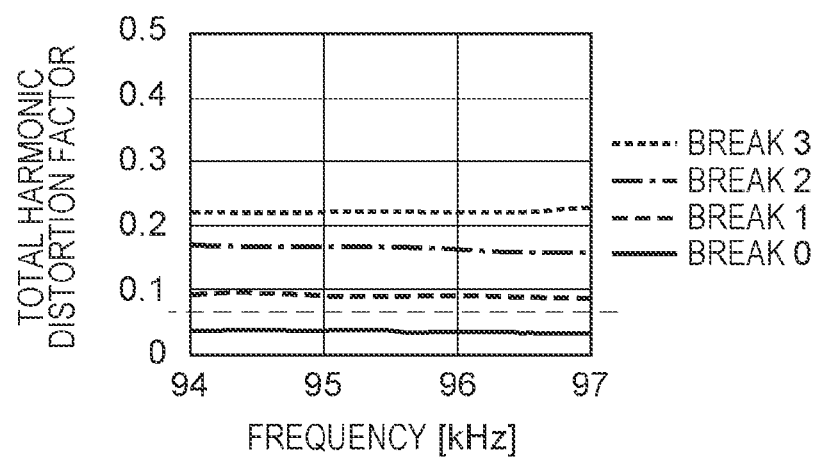
FIG. 15C is a graph that shows a third example of an analysis result when driven with a pulse signal with a duty cycle of 50% according to the first embodiment.
Figure 15D:
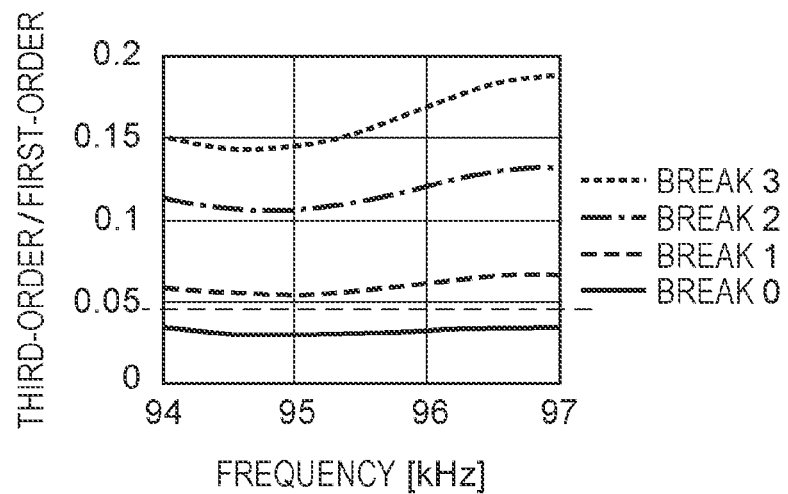
FIG. 15D is a graph that shows a third example of an analysis result when driven with a pulse signal with a duty cycle of 50% according to the first embodiment.

FIGS. 15A, 15B, 15C, and 15D show an example of waveform analysis results of the drive signal analyzing unit 18 when the rectangular voltage generating unit 12 outputs a pulse signal with a duty cycle of 50%. FIG. 15A is a graph that shows a form factor. FIG. 15B is a graph that shows a value obtained by subtracting (a mean value of an absolute value) from an effective value. FIG. 15C is a graph that shows a total harmonic distortion factor (a value obtained by dividing the amplitude of a harmonic component other than a fundamental by the amplitude of the fundamental). FIG. 15D is a graph that shows a value obtained by dividing the amplitude of a third-order harmonic by the amplitude of a fundamental. Since there is a large gap between break 0 and break 1 among the analysis results, it is easy to determine whether there is a break. The long dashed line in each graph is a threshold for break determination.

Figure 16A:
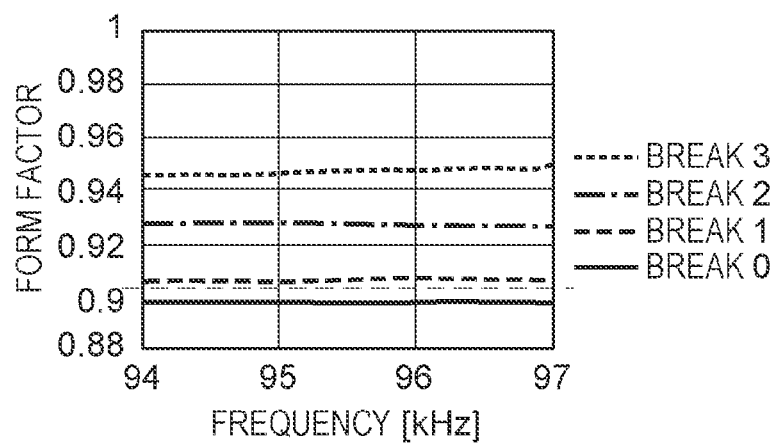
FIG. 16A is a graph that shows a second example of an analysis result when driven with a pulse signal with a duty cycle of 38% according to the first embodiment.
Figure 16B:
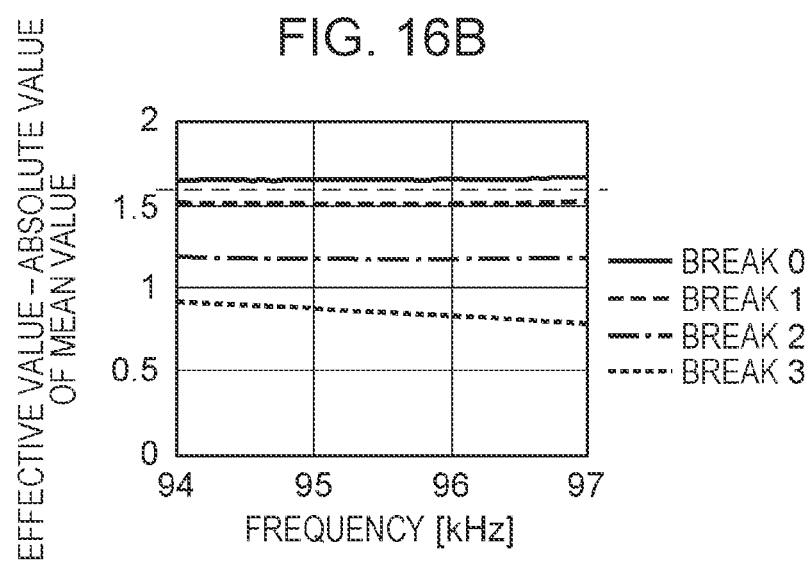
FIG. 16B is a graph that shows a second example of an analysis result when driven with a pulse signal with a duty cycle of 38% according to the first embodiment.

FIGS. 16A, 16B, 16C, and 16D show an example of waveform analysis results of a drive voltage by the drive signal analyzing unit 18 when the rectangular voltage generating unit 12 outputs a pulse signal with a duty cycle of 38%. FIG. 16A is a graph that shows a form factor. FIG. 16B is a graph that shows a value obtained by subtracting (a mean value of an absolute value) from an effective value. FIG. 16C is a graph that shows a total harmonic distortion factor (a value obtained by dividing the amplitude of a harmonic component other than a fundamental by the amplitude of the fundamental). FIG. 16D is a graph that shows a value obtained by dividing the amplitude of a third-order harmonic by the amplitude of a fundamental. The characteristics in FIG. 16C, other than the total harmonic distortion factor, are the same as in the case of a duty cycle of 50% of FIGS. 15A, 15B, 15C, and 15D, except that a gap between the numbers of breaks is narrowed, and it is easy to determine whether there is a break. However, in the total harmonic distortion factor of FIG. 16C, the order of break 0 and break 1 is interchanged as compared to FIG. 15C. The fact that the total harmonic distortion factor reduces indicates that a high frequency component relatively reduces with respect to a fundamental component, and the characteristics of FIG. 16C indicate that the high frequency component of a drive voltage reduces as a result of break 1. Therefore, to determine whether there is a break by using the total harmonic distortion factor of FIG. 16C, two large and small thresholds are needed as in the case of the two long dashed lines in the graph. There is no intersection of the graph between the number of breaks within a range from 94 kHz to 97 kHz even with any one of the analyzing methods of FIGS. 16A, 16B, 16C, and 16D. Therefore, the analysis results of a drive voltage waveform due to a break are created in advance as a comparison table, and it is possible to determine whether there is a break when determination is performed in accordance with the comparison table.

The above description has demonstrated that the influence of a break on a drive voltage waveform is different in a different circuit, with a different duty cycle, and at a different drive frequency. The description of FIGS. 16A, 16B, 16C, and 16D has demonstrated that a high frequency component can reduce even in the event of a break and it is not possible to determine whether there is a break simply only with whether there is a high frequency component depending on a drive condition. The description has demonstrated that, when the analysis results of a drive voltage waveform due to a break are created in advance as a comparison table, it is possible to determine whether there is a break when determination is performed by using a frequency command, the analysis result, and the comparison table in accordance with these pieces of information.

The above description has demonstrated a method of determining whether there is a break by using the four examples of waveform analyzing methods, and a computation method or a measuring method in which an output changes depending on a waveform may be used. For example, since a steep waveform appears due to a break and the magnitude changes depending on the number of breaks, a maximum value of a change in drive voltage per unit time may be used. It is also possible to determine whether there is a break in accordance with a specific-order harmonic amplitude.

In the above description, a pulse signal that is the output of the rectangular voltage generating unit 12 is used as a drive voltage. Alternatively, another waveform may be used. Even a triangular wave, a sawtooth wave, or a PWM modulated wave that is the output of a known class D amplifier, which includes a lot of relatively low-order harmonics lower than or equal to a fifth-order harmonic, relatively significantly changes due to a break, so the waves are usable to detect a break.

In this way, the drive signal analyzing unit should analyze the waveform of an output voltage or output current of the waveform shaping unit and detect a value according to any one of a form factor, a harmonic distortion factor, a difference between an effective value and the absolute value of a mean value, and a harmonic amplitude. It is more desirable that the waveform shaping unit be provided; however, it is not indispensable. Signal processing may be performed directly.

Second Embodiment

Figure 17:
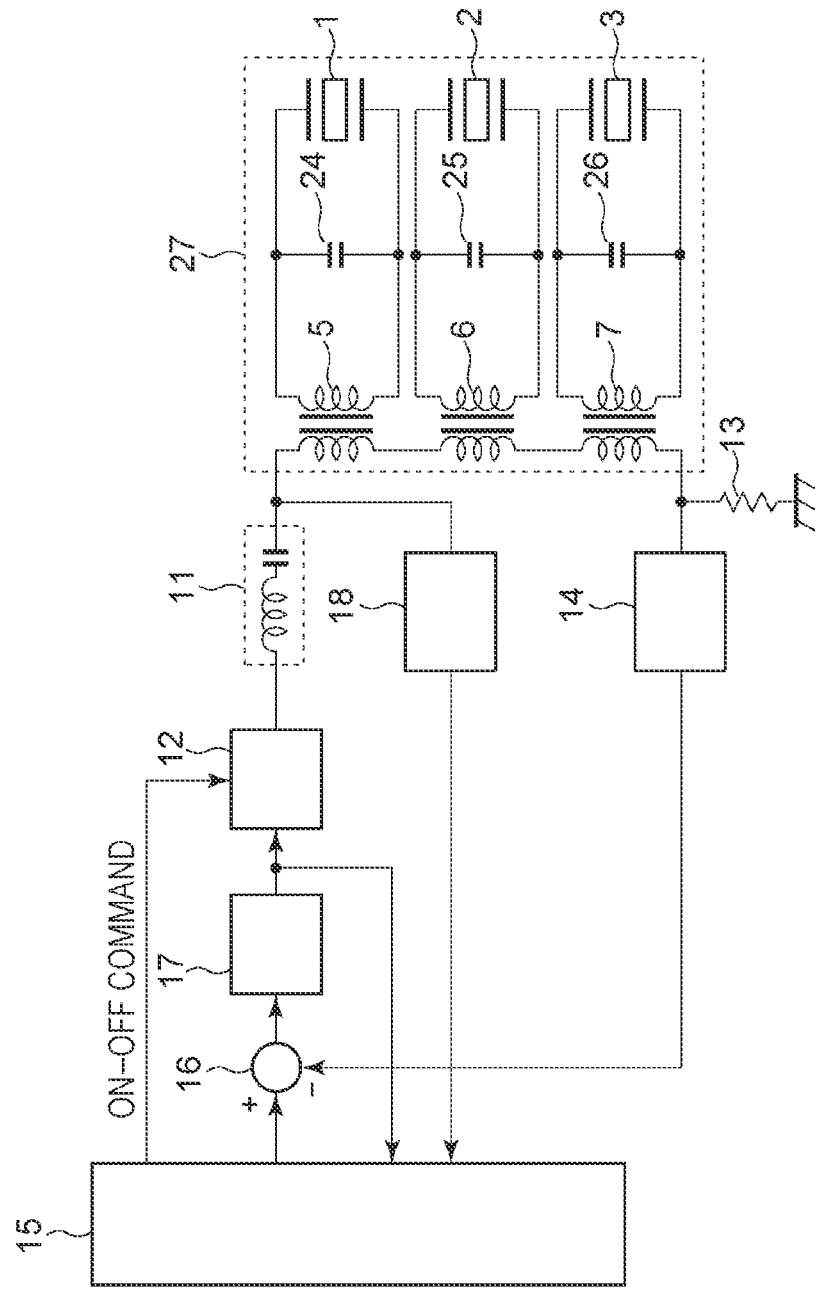
FIG. 17 is a diagram that shows a first example of a drive circuit of a vibration-type actuator according to a second embodiment.

FIG. 17 is a diagram that shows a drive circuit of a vibration-type actuator according to a second embodiment. In the vibration-type actuator according to the above-described embodiment, the vibrators 1, 2, 3 and the transformers 5, 6, 7, respectively, are connected in parallel; whereas, in the present embodiment, matching adjustment capacitors 24, 25, 26 are additionally connected in parallel. The operations of the units are the same as those of the first embodiment, so the description is omitted, and analyzing a drive voltage waveform and determining whether there is a break will be described.

The capacitors respectively connected in parallel with the vibrators are capacitors for adjusting a matching frequency. Where the matching frequency is $F_0$, a damping capacity value is $C_0$, and the inductance value of a secondary-side coil of the transformer is $L_0$, the relationship between the capacitance value $C_1$ and these values is expressed by the expression 2.

$$2\pi \cdot F_0 = \frac{1}{\sqrt{L_0 \cdot (C_0 + C_1)}} \quad (2)$$

Variations in the inductance value $L_0$ of the secondary-side coil of the transformer and the damping capacity value $C_0$ are large, so the matching adjustment capacitor (capacitance value $C_1$) is connected in parallel to equalize the matching frequency $F_0$.

Next, a difference from the above-described embodiment in the drive voltage waveform in the event of a break in the vibrators will be described. As for the circuit configuration, in the above-described embodiment, when there occurs a break in connection of the vibrator, a capacitance component connected in parallel with the transformer or inductor connected in parallel with the vibrator disappears; whereas, in the present embodiment, connection of a capacitor for matching adjustment remains. For this reason, a parallel resonant system of a transformer and a matching adjustment capacitor appears due to a break, and the influence of the parallel resonant system appears in the drive voltage waveform.

Figure 18:
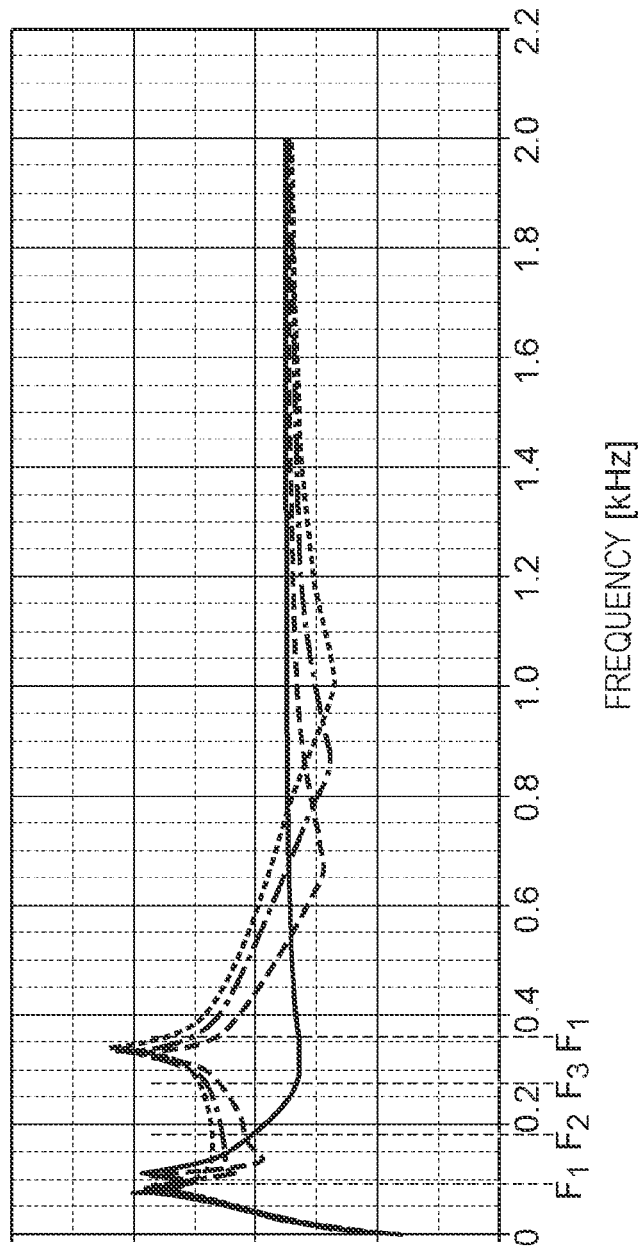
FIG. 18 is a graph that shows an example of a change in the frequency characteristics of a drive voltage amplitude in the event of a break according to the second embodiment.

FIG. 18 is a graph that shows a change in the frequency characteristics of a drive voltage amplitude in the event of a break in connection of vibrators of a vibration-type actuator 27 of FIG. 17. This graph is the amplitude of a drive voltage measured by sweeping frequency on the assumption that the rectangular voltage generating unit 12 outputs a sinusoidal wave.

The solid line represents that there is no break, the dashed line represents that one of the vibrators has a break, the alternate long and short dashed line represents that two of the vibrators each have a break, and the dotted line represents that all the vibrators each have a break. $F_1$ represents the frequency of a fundamental of a drive voltage waveform used for normal driving, and $F_2$ represents the frequency of a second-order harmonic, $F_3$ represents the frequency of a third-order harmonic, and $F_4$ represents the frequency of a fourth-order harmonic. A peak characteristic between the frequency $F_3$ of a third-order harmonic and the frequency $F_4$ of a fourth-order harmonic is the influence of parallel resonance of the matching adjustment capacitor and the transformer, which occurs due to a break in the vibrator. Since the frequency $F_3$ of the third-order harmonic of the drive voltage is near the frequency (around 310 kHz) of the lowest point of the valley of the frequency characteristics when there is no break, the amplitude of the third-order harmonic significantly changes in the event of a break to increase a change in waveform in the event of a break.

Figure 19:
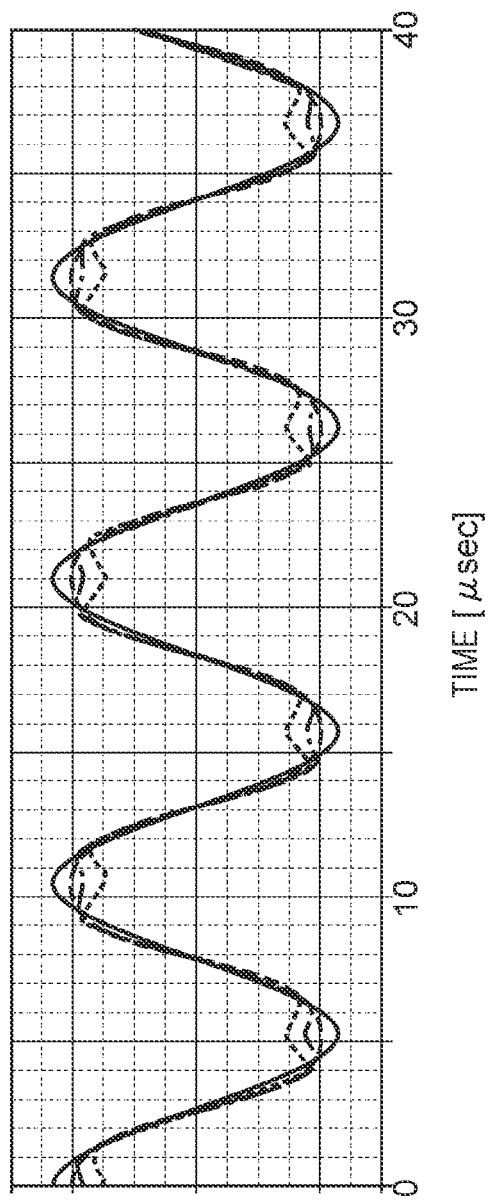
FIG. 19 is a graph that shows an example of a change in drive voltage waveform in the event of a break according to the second embodiment.

FIG. 19 is a graph that shows a drive voltage waveform when the rectangular voltage generating unit 12 outputs a pulse signal with a duty cycle of 50%. The solid line represents that there is no break, the dashed line represents that one of the vibrators has a break, the alternate long and short dashed line represents that two of the vibrators each have a break, and the dotted line represents that all the vibrators each have a break. It appears that, as a break occurs, the sinusoidal wave is more similar to a rectangular wave with an increase in the number of breaks.

Figure 20A:
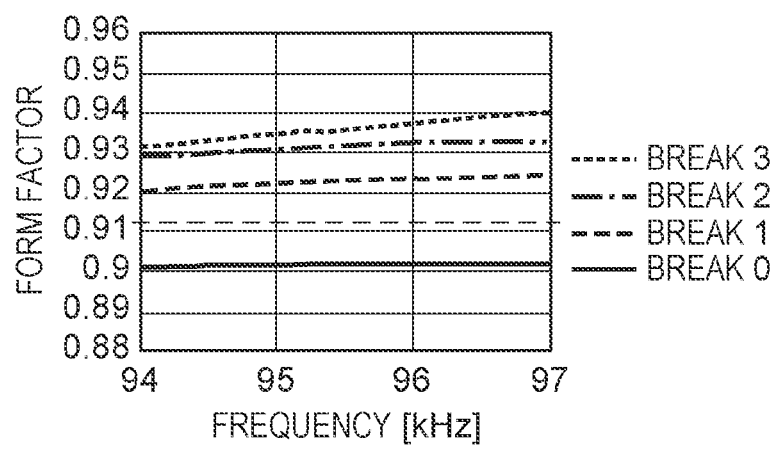
FIG. 20A is a graph that shows an example of an analysis result when driven with a pulse signal with a duty cycle of 50% according to the second embodiment.
Figure 20B:
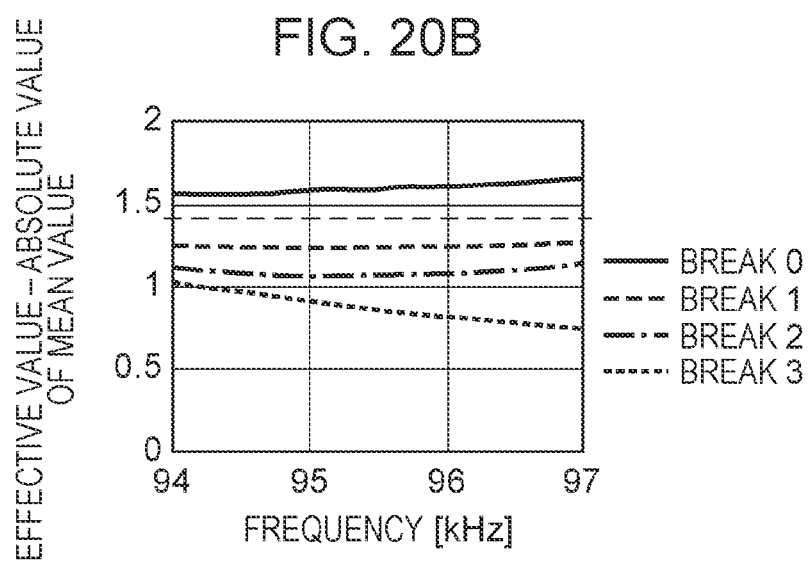
FIG. 20B is a graph that shows an example of an analysis result when driven with a pulse signal with a duty cycle of 50% according to the second embodiment.
Figure 20C:
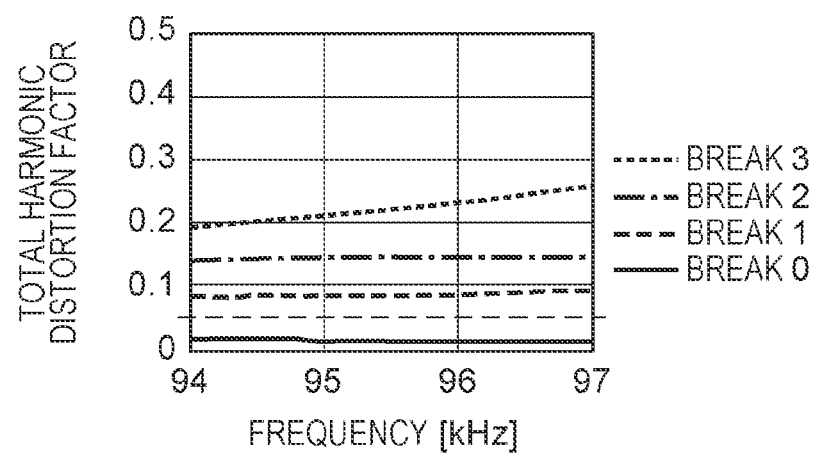
FIG. 20C is a graph that shows an example of an analysis result when driven with a pulse signal with a duty cycle of 50% according to the second embodiment.
Figure 20D:
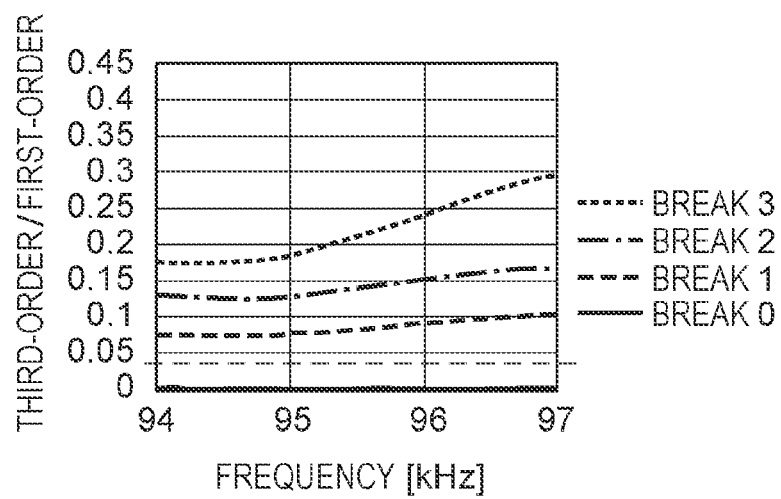
FIG. 20D is a graph that shows an example of an analysis result when driven with a pulse signal with a duty cycle of 50% according to the second embodiment.

FIGS. 20A, 20B, 20C, and 20D show an example of waveform analysis results of a drive voltage by the drive signal analyzing unit 18 when the rectangular voltage generating unit 12 outputs a pulse signal with a duty cycle of 50%. FIG. 20A is a graph that shows a form factor. FIG. 20B is a graph that shows a value obtained by subtracting (a mean value of an absolute value) from an effective value. FIG. 20C is a graph that shows a total harmonic distortion factor (a value obtained by dividing the amplitude of a harmonic component other than a fundamental by the amplitude of the fundamental). FIG. 20D is a graph that shows a value obtained by dividing the amplitude of a third-order harmonic by the amplitude of a fundamental. In all the waveform analysis results of FIGS. 20A, 20B, 20C, and 20D, a gap between break 0 and break 1 is wide, so it is easy to determine whether there is a break. The long dashed line in each of FIGS. 20A, 20B, 20C, and 20D indicates a threshold for determining whether there is a break in driving of the vibration-type actuator 27. The reason why the gap is wide in this way is that the frequency characteristics of the drive voltage amplitude of FIG. 18 significantly change as a result of whether there is a break around a third-order harmonic ($F_3$) due to the influence of parallel resonance of the matching adjustment capacitor and the transformer. It is possible to easily determine whether there is a break by setting the frequency of parallel resonance of the matching adjustment capacitor and the transformer to around a low-order harmonic of a pulse signal in this way.

When a comparison table of analysis results is created in advance by measuring the characteristics of the amplitude of a drive voltage, which occurs due to a break as in the case of the above-described embodiment, it is possible to determine whether there is a break and the number of breaks by using analysis results and the comparison table in driving of the vibration-type actuator 27.

Figure 21:
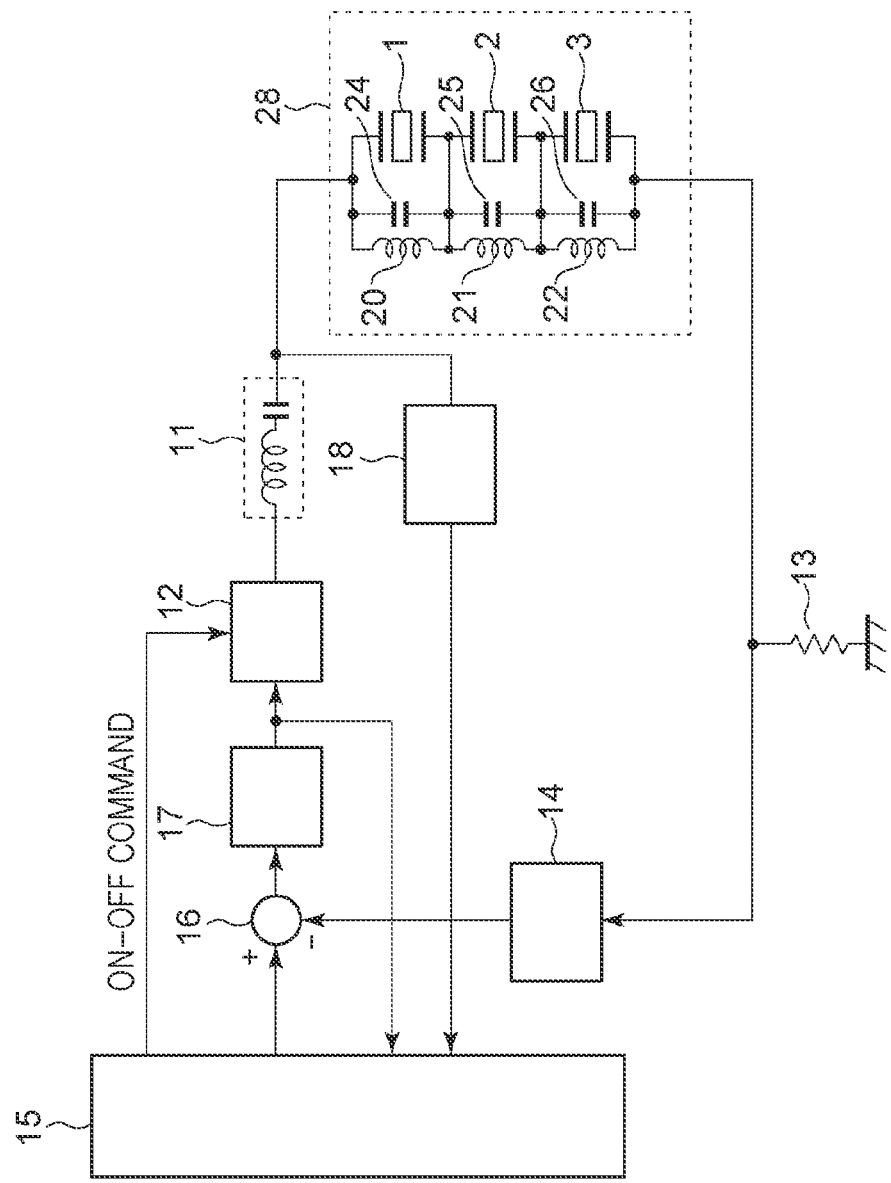
FIG. 21 is a diagram that shows a second example of the drive circuit of the vibration-type actuator according to the second embodiment.

FIG. 21 is a diagram that shows a second example of the drive circuit of the vibration-type actuator according to the second embodiment. In the example shown in FIG. 17, the transformers 5, 6, 7 and matching adjustment capacitor 24, 25, 26, respectively, are connected in parallel with the vibrators 1, 2, 3; whereas inductors 20, 21, 22 and the matching adjustment capacitors 24, 25, 26, respectively, are connected in parallel with the vibrators 1, 2, 3. The matching adjustment capacitors 24, 25, 26, respectively, are mounted on a circuit substrate (not shown) so as to be adjacent to the inductors 20, 21, 22. The vibrators 1, 2, 3 are connected to the circuit substrate with a flexible substrate via a connector. When the flexible substrate is used to be repeatedly bent or used to be folded, the risk of a break of the flexible substrate increases.

A parallel and series circuit of the vibrators 1, 2, 3, the inductors 20, 21, 22, and the matching adjustment capacitors 24, 25, 26 makes up a vibration-type actuator 28. A pulse signal of the rectangular voltage generating unit 12 is applied to the vibration-type actuator 28 via the waveform shaping unit 11. A current flowing through the vibration-type actuator 28 is converted to a voltage signal by the resistor 13 and is input to the amplitude detecting unit 14. The operations of the units are the same as those of the first embodiment, so the description is omitted.

As the number of vibrators connected in series increases, the risk of insertion failure or the like of a connector also increases during manufacturing. Insertion failure is also one type of a break, and the analysis result changes from the state of break 0 to the state of break 1 during times from contact failure to when the connector completely comes off (breaks). In the process of the change, the analysis result crosses the threshold, and it is possible to detect insertion failure, or the like, of the connector.

The above description has demonstrated four waveform analyzing methods, and a method with which the output changes depending on a waveform is usable.

In the above description, a pulse signal that is the output of the rectangular voltage generating unit 12 is used as a drive voltage. Alternatively, another waveform may be used. Even a triangular wave, a sawtooth wave, or a PWM modulated wave that is the output of a known class D amplifier, which includes a lot of relatively low-order harmonics lower than or equal to a fifth-order harmonic, relatively significantly changes due to a break, so the waves are usable to detect a break.

Third Embodiment

Figure 22A:
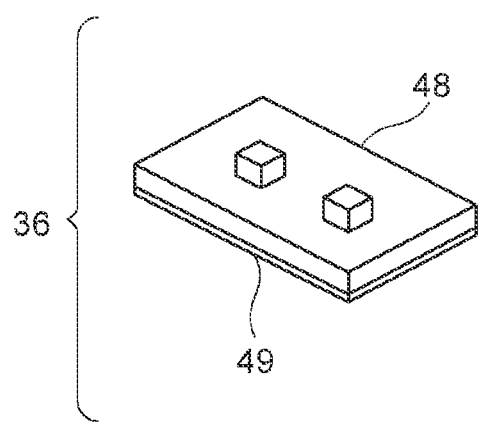
FIG. 22A is a view that shows the configuration of a vibrator of a vibration-type actuator according to a third embodiment.
Figure 22B:
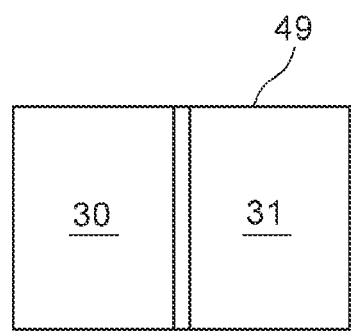
FIG. 22B is a view that shows the configuration of the vibrator of the vibration-type actuator according to the third embodiment.

FIGS. 22A and 22B are views that show the configuration of a vibrator used in the third embodiment. In FIG. 22A, reference numeral 48 indicates a rectangular elastic body made of a conductive material, and two protrusions that contact with a contact body are provided on the surface. Reference numeral 49 indicates a piezoelectric body that serves as part of the elastic body 48 and used to vibrate the elastic body 48. FIG. 22B shows electrodes provided on the piezoelectric body 49. The electrodes 30, 31 are electrically insulated from each other, and two alternating-current voltages of which the phase changes independently are applied between the electrodes 30, 31. The entire back surface of the piezoelectric body 49 serves as the electrodes. The piezoelectric body 49 is configured such that a current can be supplied from the surface through vias (not shown) respectively provided in parts of the electrodes 30, 31.

Figure 23A:
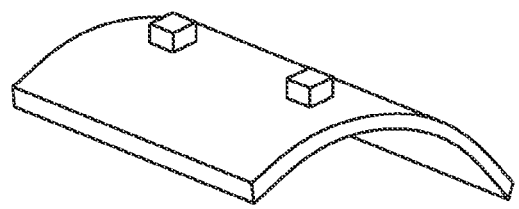
FIG. 23A is a view that shows a vibration mode of the vibrator according to the third embodiment.
Figure 23B:
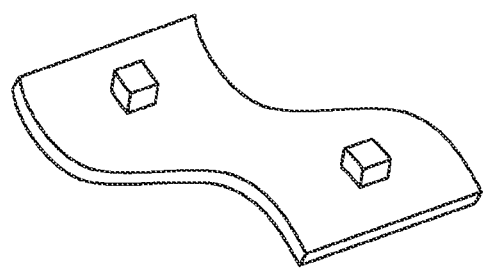
FIG. 23B is a view that shows the vibration mode of the vibrator according to the third embodiment.

FIGS. 23A and 23B are views that show a vibration mode of the elastic body 48. FIG. 23A is a vibration form of a vibration mode (upthrust vibration mode) that is excited when alternating-current voltages in phase are respectively applied to the electrode 30 and the electrode 31. FIG. 23B is a vibration form of a vibration mode (feed vibration mode) that is executed when alternating-current voltages in opposite phase are applied.

In other words, where it is assumed that a phase difference between the alternating-current voltages to be applied is 0°, the mode of FIG. 23A is excited; when the phase difference is 180°, the mode of FIG. 23B is excited. When a phase difference between the alternating-current voltages is set to between 0° and 180° (actually, about 0° to about 120° is used), both vibration modes are excited at the same time, and the contact body in press-contact with the protrusions provided on the elastic body 48 moves in a longitudinal direction of a rectangular shape of the elastic body 48.

FIG. 24 is a view that shows the configuration of a direct-drive vibration-type actuator according to the present embodiment. Specifically, the protruding portions of the vibrators 36, 37 are disposed up and down so as to face each other, and, similarly, five sets of upper and lower pair of vibrators are disposed up to a vibrator 38 along a straight line, a common contact body 50 is sandwiched in an up and down direction by the ten vibrators so as to move in an arrow direction.

Figure 25:
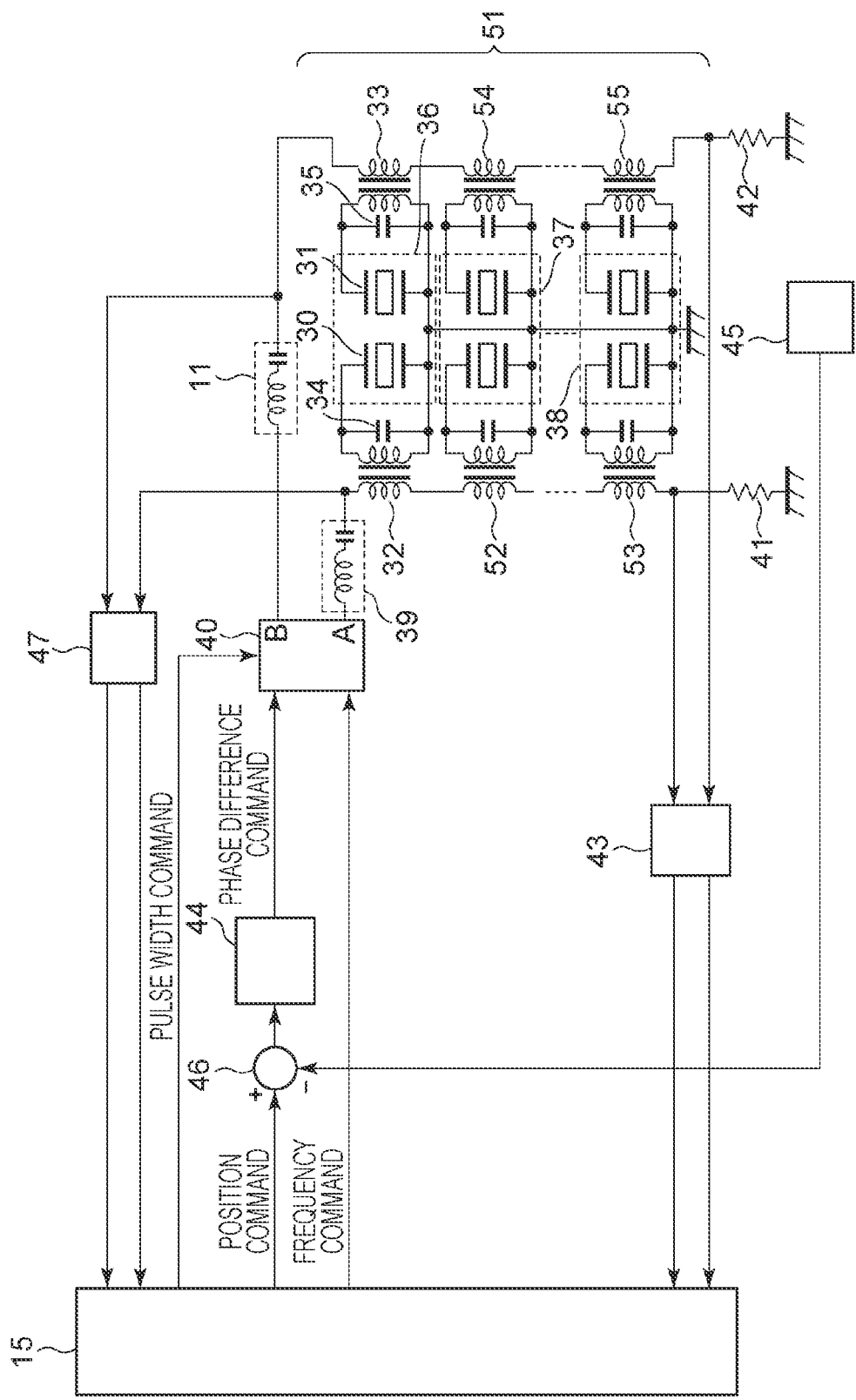
FIG. 25 is a diagram that shows a drive circuit of the vibration-type actuator according to the third embodiment.

FIG. 25 is a diagram that shows a drive circuit of a vibration-type actuator according to a third embodiment. The number of the vibrators is three and the number of phases of a drive voltage is one in each of the vibration-type actuators according to the first and second embodiments, and the number of the vibrators is 10 and the vibrators are driven with two-phase drive voltages in the present embodiment. The electrically conductive elastic bodies (not shown) of the 10 vibrators 36, 37 . . . 38 are connected to a ground potential.

The electrodes 30, 31 provided on the piezoelectric body 49 are provided on the vibrator 36 and, respectively, are connected in parallel with the transformers 32, 33 together with matching adjustment capacitors 34, 35. Primary sides of nine transformers of transformers 52 . . . 53 are connected in series with the primary side of a transformer 32, and one electrode of each of the nine vibrators 37 . . . 38 is connected in parallel with a corresponding one of secondary sides of the transformers 52, . . . , 53. Similarly, primary sides of nine transformers 54 . . . 55 are connected in series with the primary side of a transformer 33, and the other one electrode of each of the nine vibrators 37 . . . 38 is connected in parallel with a corresponding one of secondary sides of the transformers 54 . . . 55. Matching adjustment capacitors are respectively connected in parallel with the 10 vibrators 36, 37 . . . 38 together with the transformers. A vibration-type actuator 51 is made up of 10 units each made up of these vibrator, matching adjustment capacitor, and transformer connected in series.

Reference numeral 40 indicates a rectangular voltage generating unit that outputs a two-phase pulse signal. The rectangular voltage generating unit 40 applies a drive voltage to the vibration-type actuator 51 via waveform shaping units 11, 39 each made up of a series circuit of an inductor and a capacitor. Reference numerals 41 and 42 indicate resistors to respectively measure two-phase currents flowing through the vibration-type actuator 51. The resistors 41, 42 each detect a voltage proportional to a vibration speed of each of the vibrators 36, 37 . . . 38.

Reference numeral 43 indicates an A/D converter to detect a vibration speed detected by the resistors 41, 42. The resistors 41, 42 input two-phase current signals (CurA, CurB) to the CPU 15 as time-series data. The CPU 15 determines a position command, a pulse width command, and a frequency command in accordance with a position command from the command unit (not shown), two-phase current signals from the A/D converter 43, and an analysis result of the drive signal analyzing unit 47 (described later), and outputs the position command, the pulse width command, and the frequency command. The pulse width command and the frequency command are input to the rectangular voltage generating unit 40 to set the frequency and pulse width of each of the two-phase pulse signals to be output. The operation of the CPU 15 will be described in detail later.

Reference numeral 45 indicates a known linear encoder to detect the position of the common contact body 50. Reference numeral 46 is a position comparing unit that outputs a difference between the position command from the CPU 15 and the position signal to be output by the linear encoder 45. Reference numeral 44 indicates a position control unit that outputs a phase difference command to the rectangular voltage generating unit 40 according to the output of the position comparing unit 46. The position control unit 44 controls the moving direction and speed of the contact body 50 by setting a phase difference between the two-phase pulse signals. Reference numeral 47 indicates a drive signal analyzing unit that analyzes the waveforms of two-phase drive voltages of the vibration-type actuator 51. The drive signal analyzing unit 47 analyses each of the waveforms of the two-phase drive voltages and outputs an analysis result.

Figure 26:
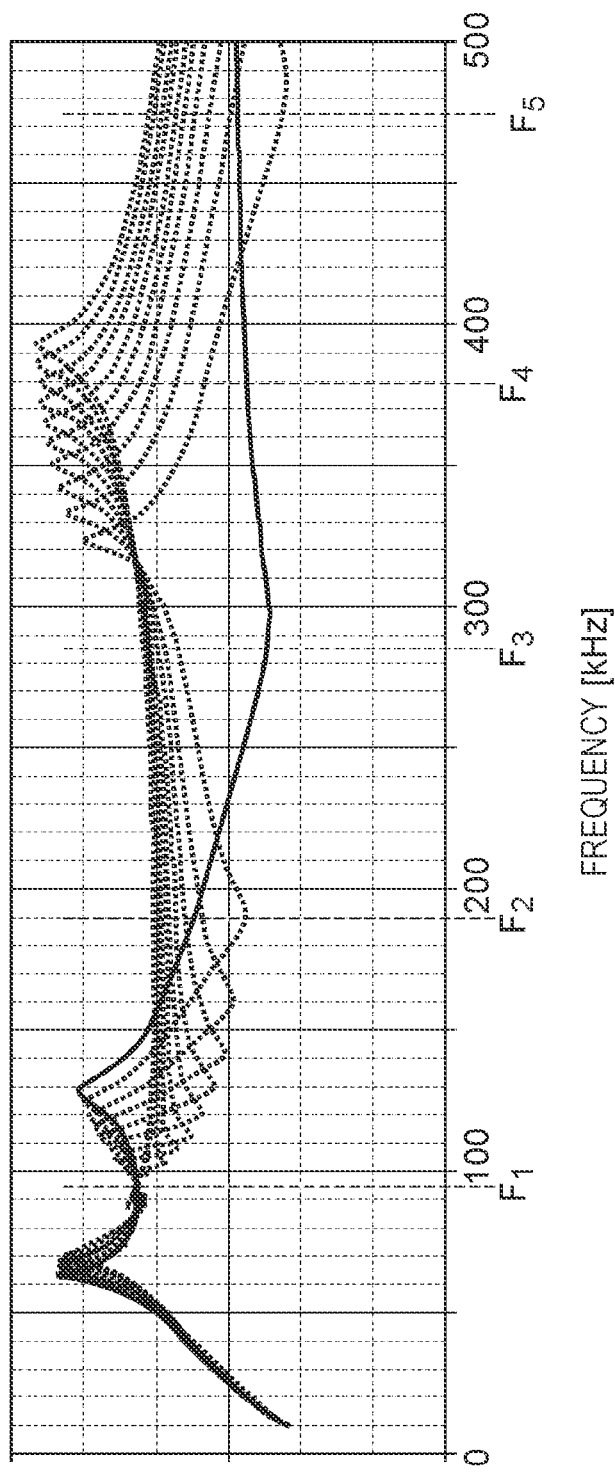
FIG. 26 is a graph that shows an example of a change in the frequency characteristics of a drive voltage amplitude in the event of a break according to the third embodiment.

FIG. 26 is a graph that shows a change in the frequency characteristics of a drive voltage amplitude in the event of a break in connection of vibrators of the vibration-type actuator 51 of FIG. 25. This graph is the amplitude of a drive voltage measured by sweeping frequency on the assumption that the rectangular voltage generating unit 40 outputs a sinusoidal wave. The solid line represents characteristics without a break. The dotted lines represent characteristics of break numbers 1 to 10. $F_1$ represents the frequency of a fundamental of a drive voltage in normal driving, and $F_2$, $F_3$, $F_4$, and $F_5$ represent the frequencies of second-order to fifth-order harmonics. When the voltage amplitudes of the frequencies of harmonic orders of FIG. 26 are compared with one another, it appears that the ratio of amplitude among the orders varies depending on the number of breaks and the waveforms are changed. Particularly, it appears that a change in drive voltage amplitude due to whether there is a break is significant around the frequency ($F_3$) of a third-order harmonic. Since the frequency $F_3$ of the third-order harmonic of the drive voltage is near the frequency (around 290 kHz) of the lowest point of the valley of the frequency characteristics when there is no break, the amplitude of the third-order harmonic significantly changes in the event of a break to increase a change in waveform in the event of a break.

FIG. 27 shows a change in the waveform of a drive voltage. The solid line represents that there is no break, the dashed line represents that one of the vibrators has a break, the alternate long and short dashed line represents that two of the vibrators each have a break, and the dotted line represents that all the vibrators each have a break. It appears that, as a break occurs, the vertexes of a sinusoidal wave collapse and the sinusoidal wave has a wave more similar to a rectangular wave with an increase in the number of breaks.

Figure 28A:
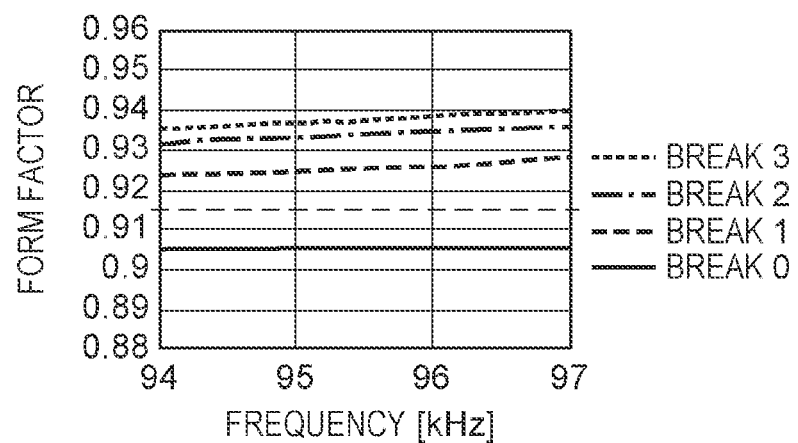
FIG. 28A is a graph that shows an example of an analysis result when driven with a pulse signal with a duty cycle of 50% according to the third embodiment.
Figure 28B:
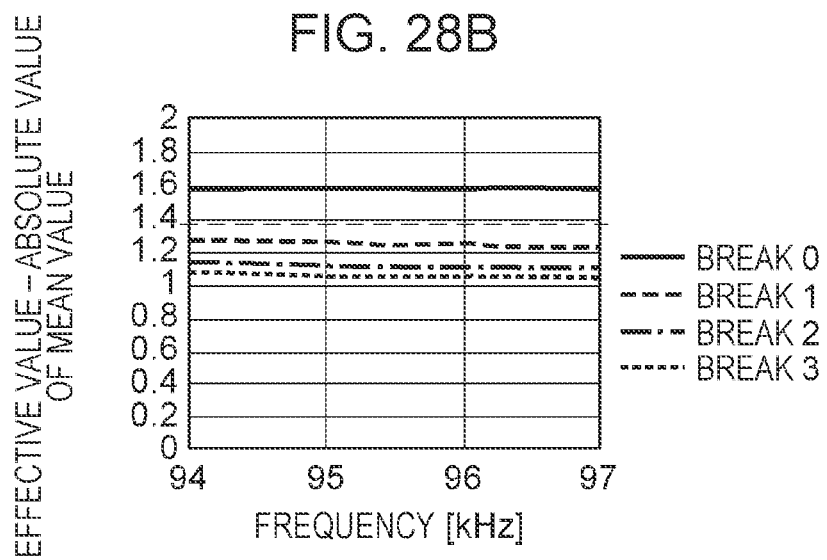
FIG. 28B is a graph that shows an example of an analysis result when driven with a pulse signal with a duty cycle of 50% according to the third embodiment.
Figure 28C:
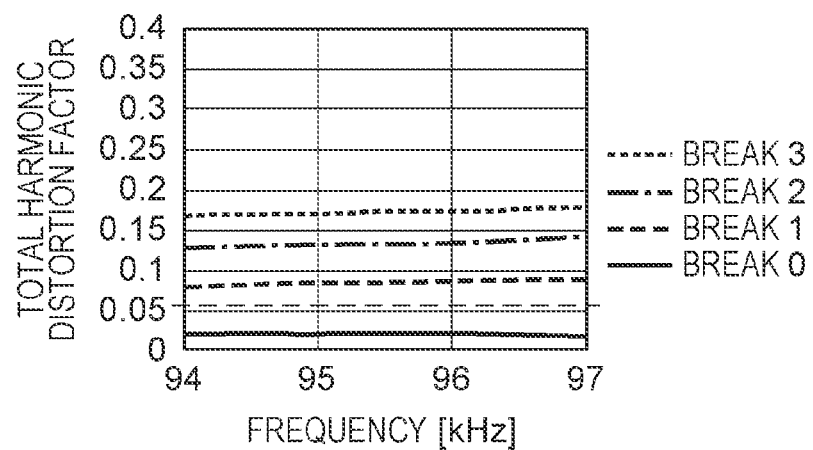
FIG. 28C is a graph that shows an example of an analysis result when driven with a pulse signal with a duty cycle of 50% according to the third embodiment.
Figure 28D:
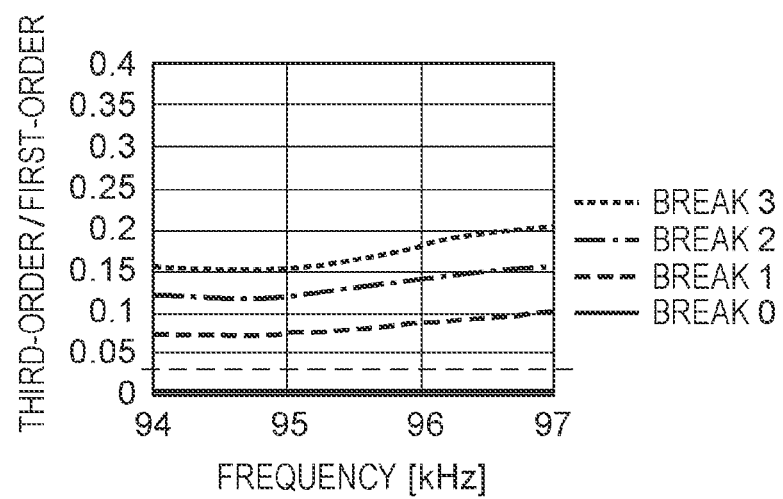
FIG. 28D is a graph that shows an example of an analysis result when driven with a pulse signal with a duty cycle of 50% according to the third embodiment.

FIGS. 28A, 28B, 28C, and 28D show an example of waveform analysis results of a drive voltage by the drive signal analyzing unit 47 when the rectangular voltage generating unit 40 outputs a pulse signal with a duty cycle of 50%. FIG. 28A is a graph that shows a form factor (a mean value of the absolute value/an effective value). FIG. 28B is a graph that shows a value obtained by subtracting (a mean value of the absolute value) from an effective value. FIG. 28C is a graph that shows a total harmonic distortion factor. FIG. 28D is a graph that shows a value obtained by dividing the amplitude of a third-order harmonic by the amplitude of a fundamental.

In all the waveform analysis results of FIGS. 28A, 28B, 28C, and 28D, a gap between break 0 and break 1 is wide, so it is easy to determine whether there is a break. The long dashed line in each of FIGS. 28A, 28B, 28C, and 28D indicates a threshold for determining whether there is a break in driving of the vibration-type actuator 51. It appears that, even when one of the 10 vibrators has a break, it is possible to sufficiently determine whether there is a break.

Here, the detailed operation of the CPU 15 will be described with reference to a flowchart. The CPU 15 executes vibration amplitude control based on two-phase current signals from the A/D converter 43 and control over an operation, such as drive and stop, of the vibration-type actuator 51, based on a waveform analysis result of the drive signal analyzing unit 47. Initially, the operation, such as drive and stop, of the vibration-type actuator 51 based on a waveform analysis result will be described.

A control method for a vibration-type drive apparatus according to the present embodiment is as follows. The control method for a vibration-type drive apparatus includes outputting, by a control unit, a command signal to a drive unit to cause a vibrator unit made up of two or more vibrators to vibrate by using a drive signal output from the drive unit. The control method further includes analyzing the drive signal and outputting an analysis result to determine whether there is a break in wiring lines respectively coupled to the vibrators in accordance with the analysis result.

Figure 29:
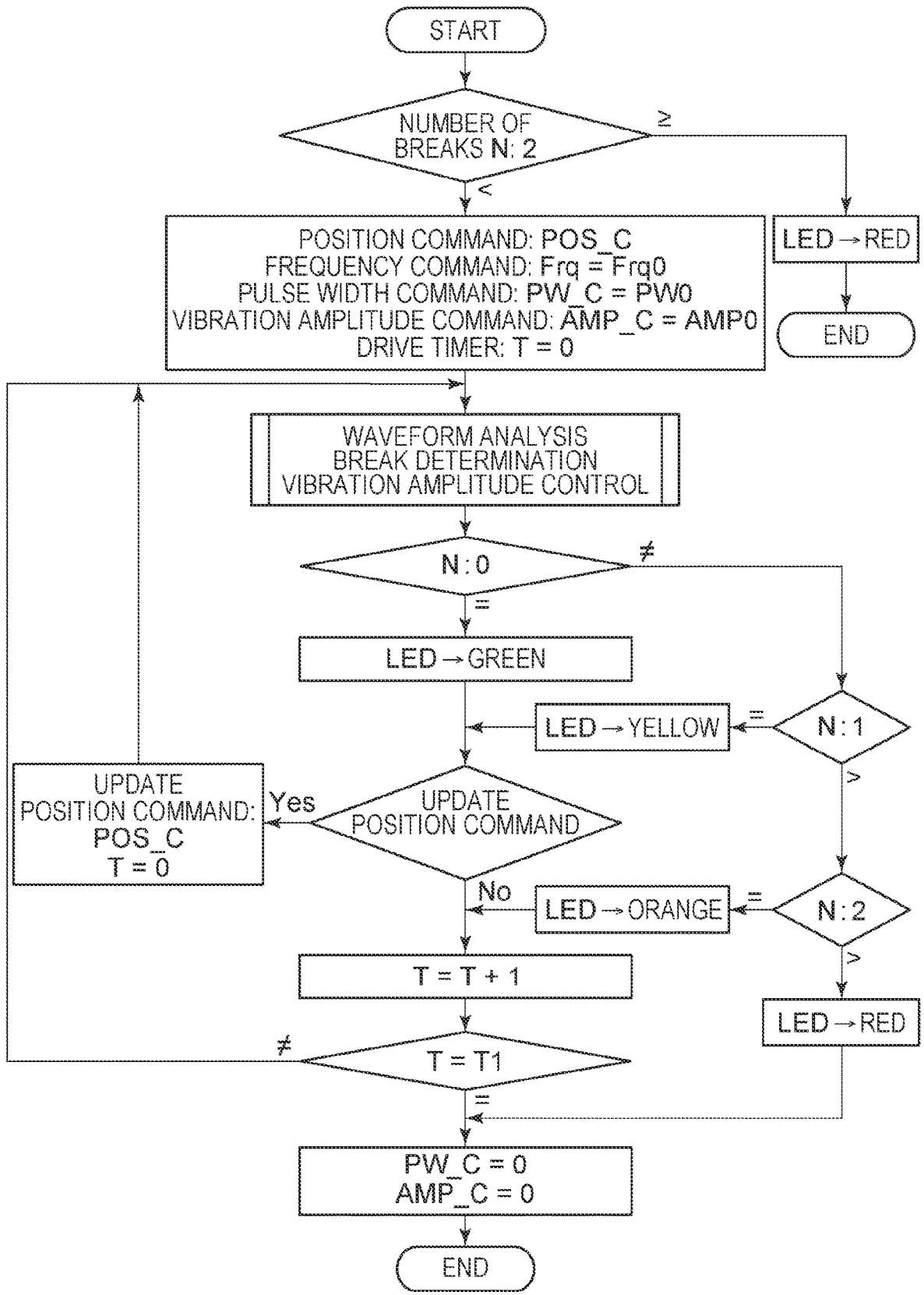
FIG. 29 is a flowchart that shows an operation example of a CPU 15 according to the third embodiment.

FIG. 29 is a flowchart that shows an example of the operation of the CPU 15 that executes a different drive sequence of the vibration-type actuator 51 depending on the result of a break. The flowchart shows the sequence of position control operation of the contact body 50. A different operation sequence is selected depending on the number of breaks (N). The operation sequences will be described by using the flowchart. The position control operation starts when a new position command POS_C is input from the command unit (not shown). First, the number of breaks N of the vibrators, occurred so far, is checked. When the number of breaks N is two or more, a break status indicator LED turns on in red, and the position control operation is ended. When the number of breaks N is one or less, the pulse width command PW_C is set to a predetermined pulse width PW0 and a frequency command Frq is set to an initial frequency $F_0$ to generate a drive voltage to be applied to the vibration-type actuator 51. Then, an amplitude command AMP_C is set to a predetermined amplitude AMP0, and a drive timer T is initialized to zero. After that, a pulse signal is output from the rectangular voltage generating unit 40, and movement of the vibration-type actuator 51 starts. Subsequently, waveform analysis, break determination, and vibration amplitude control are performed. The details of vibration amplitude control will be described later. When the number of breaks N determined through break determination is zero, the break status indicator LED turns on in green, and waveform analysis, break determination, and vibration amplitude control are repeated until the drive timer T becomes T1 or the number of breaks N becomes one or more. When the position command POS_C is updated from the command unit (not shown) during then, the drive timer T is initialized to zero, and waveform analysis, break determination, and vibration amplitude control are repeated until the drive timer T becomes T1. When the drive timer T becomes T1, the pulse width command PW_C is set to zero, the vibration amplitude command AMP_C is also set to zero, and the position control operation is ended.

When the number of breaks N becomes one or more before the drive timer T becomes T1, a different operation is performed depending on the number of breaks N. When the number of breaks N is one, the break status indicator LED turns on in yellow, and the same operation as that when the number of breaks N is zero is continued. When the number of breaks N is two, the break status indicator LED turns on in orange, and the position command POS_C is not updated; however, the same operation as that when the number of breaks N is zero is continued until the drive timer T becomes T1. When the number of breaks N is three or more, the break status indicator LED turns on in red, the pulse width command PW_C is set to zero, and the vibration amplitude command AMP_C is also set to zero, after which the position control operation is ended.

A vibration-type actuator in which a plurality of vibrator units is connected in series as in the case of the vibration-type actuator 51 may continue to be driven even when some of the vibrators have a break, so the vibration-type actuator can be continued depending on an application. Even when the number of breaks is small, damage accumulates in a peripheral mechanism if the vibration-type actuator continues to be driven. For this reason, even when the vibration-type actuator continues to be driven, measures, such as prohibiting driving may be taken if an accumulated drive time becomes longer than or equal to a certain time.

Next, the operations of waveform analysis, break determination, and vibration amplitude control will be described.

Figure 30:
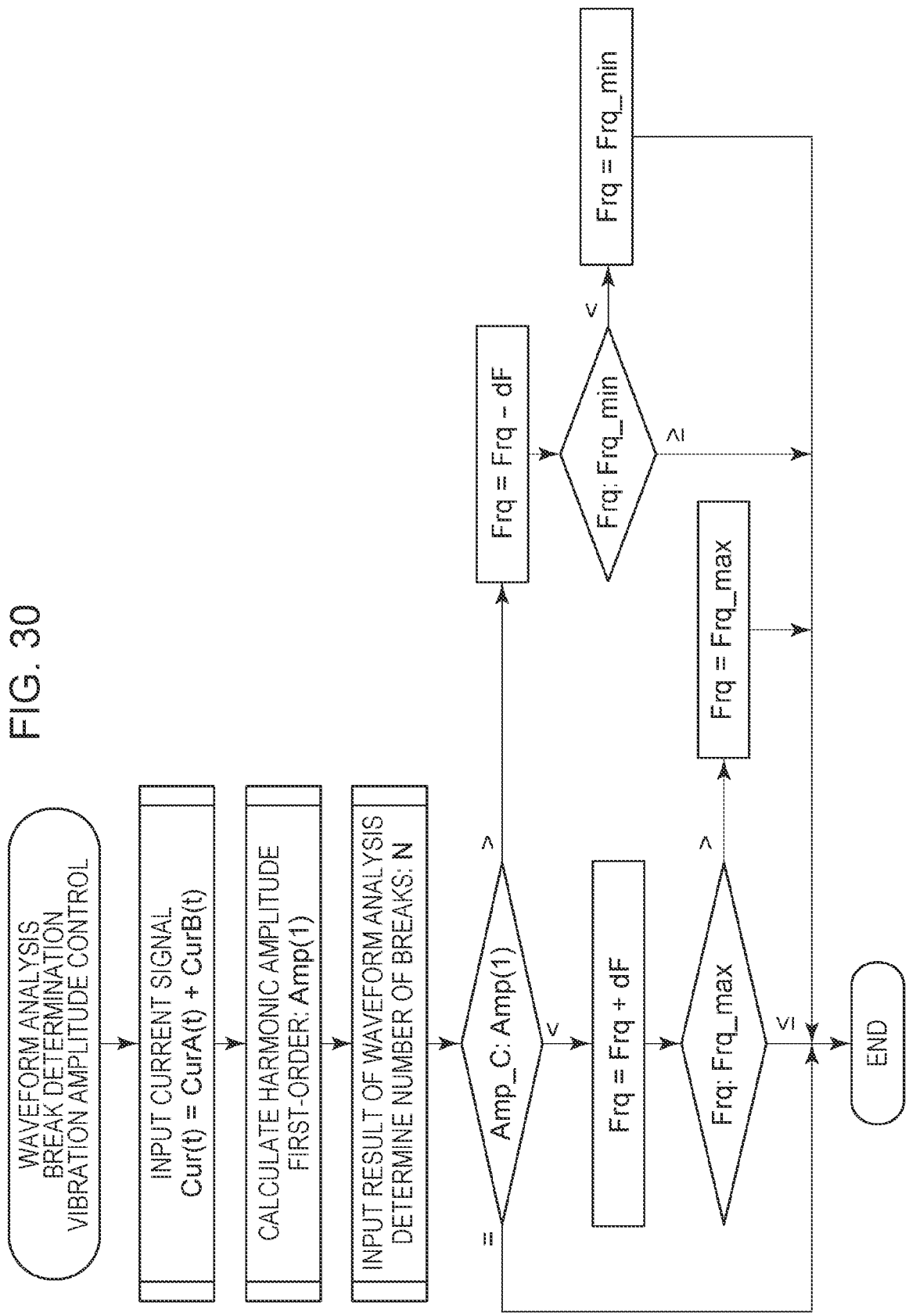
FIG. 30 is a flowchart that shows an operation example of waveform analysis, break determination, and vibration amplitude control of the CPU 15 according to the third embodiment.

FIG. 30 is a flowchart of the waveform analysis, break determination, and vibration amplitude control operation. First, a signal Cur(t) is generated by adding two-phase time-series current signals CurA(t), CurB(t) input separately from the A/D converter 43 through interrupt processing. This corresponds to the vibration speed (vibration amplitude) of upthrust vibration mode of the vibrator. Subsequently, a first-order amplitude Amp(1) is calculated by extracting a first-order (fundamental) signal through low-pass filter computation. After that, the number of breaks of each of the two phases is calculated from an analysis result (for example, form factor) based on the analysis methods of FIGS. 28A, 28B, 28C, and 28D, input from the drive signal analyzing unit 47, and the total number of breaks N is calculated. Then, the vibration amplitude command Amp_C and the first-order amplitude Amp(1) are compared with each other, and, when Amp(1) is less than Amp_C, a frequency is set so as to be lower by dF from the frequency command Frq. When Amp(1) is greater than Amp_C, a frequency is set so as to be higher by dF from the frequency command Frq. The frequency command is limited so as to fall between a minimum frequency Frq_min and a maximum frequency Frq_max.

In this way, the vibration amplitude of the upthrust vibration mode of the vibration-type actuator 51 is controlled to the vibration amplitude command Amp_C to maintain a contact state between the contact body 50 and the vibrators in a desired state. In the present embodiment, waveform analysis of the two-phase drive voltages is individually performed. Alternatively, waveform analysis may be performed in accordance with a signal obtained by adding drive voltages.

The above description has demonstrated four waveform analyzing methods, and a method with which the output changes depending on a waveform is usable.

In the above description, a pulse signal that is the output of the rectangular voltage generating unit 12 is used as a drive voltage. Alternatively, another waveform may be used. Even a triangular wave, a sawtooth wave, or a PWM modulated wave that is the output of a known class D amplifier, which includes a lot of relatively low-order harmonics lower than or equal to a fifth-order harmonic, relatively significantly changes due to a break, so the waves are usable to detect a break.

Fourth Embodiment

Figure 31:
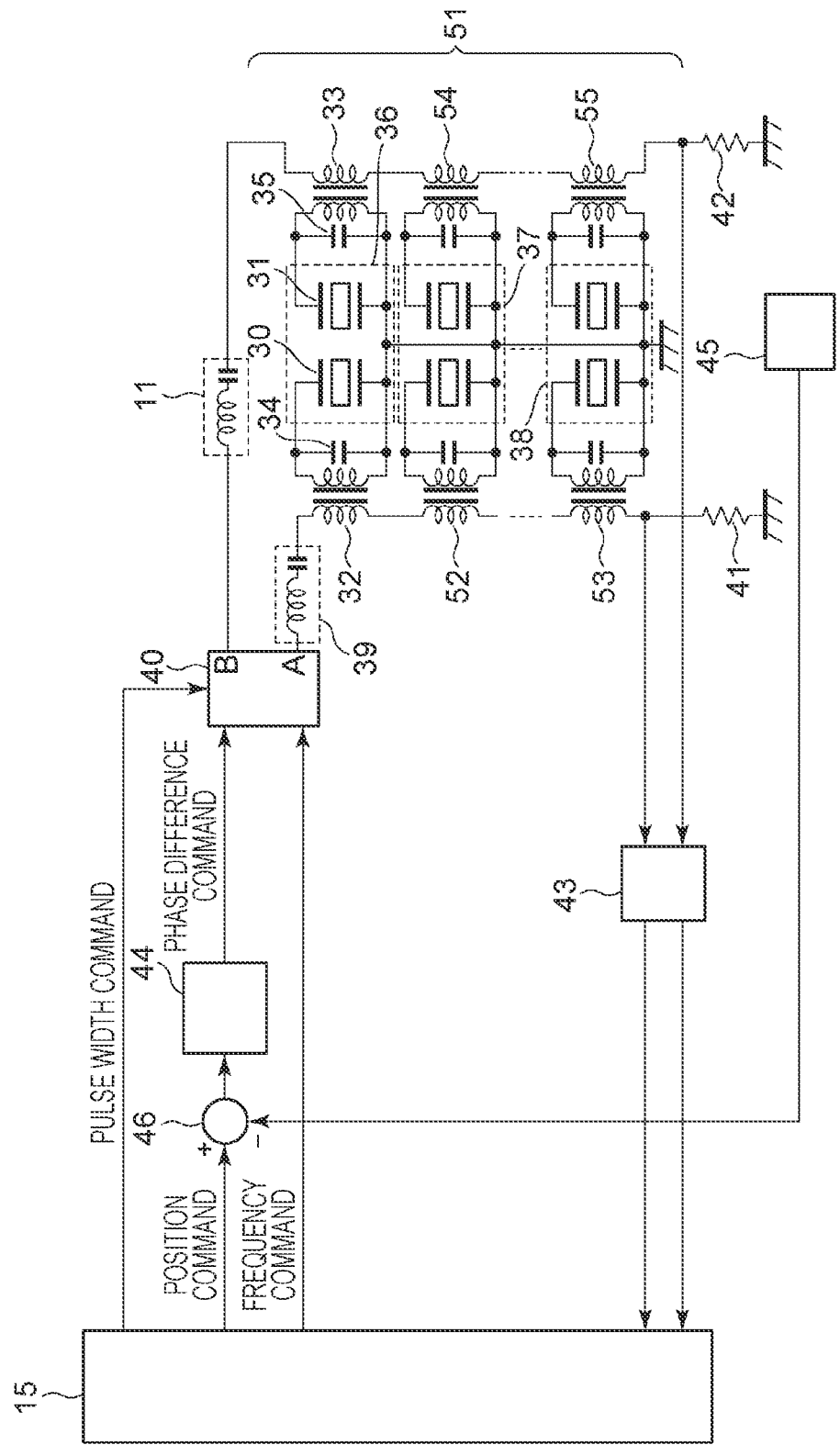
FIG. 31 is a diagram that shows a drive circuit of a vibration-type actuator according to a fourth embodiment.

In the above-described embodiments, a break in vibrators of a vibration-type actuator is detected by analyzing the waveform of a drive voltage. Alternatively, it is also possible to detect a break by analyzing the waveform of a current flowing into a vibration-type actuator. FIG. 31 shows a configuration in which the drive signal analyzing unit 47 of the drive circuit of the vibration-type actuator of FIG. 25 is modified to analyze the waveform of not a drive voltage but a terminal voltage of the resistor 41 or resistor 42 (a current flowing into the vibration-type actuator). The description of the operations of the units is the same as that of the third embodiment, so the description thereof is omitted, and a waveform analysis operation will be described.

Figure 32:
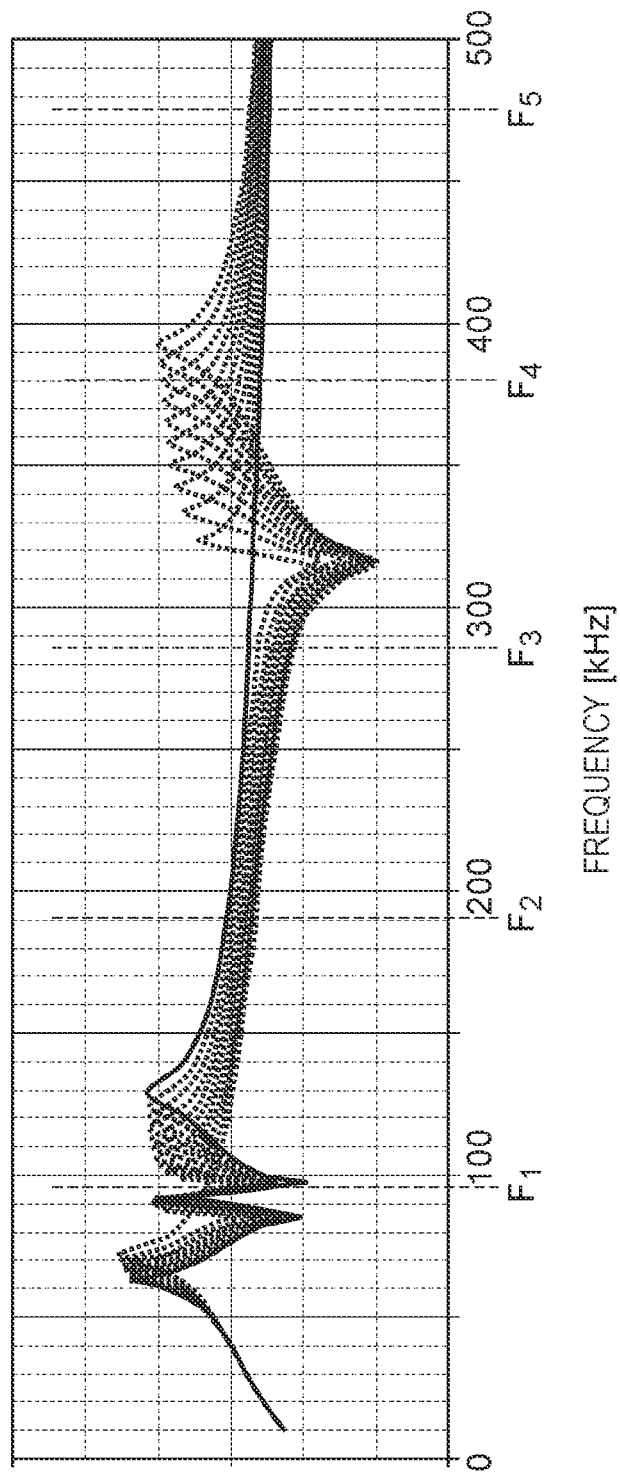
FIG. 32 is a graph that shows an example of a change in the frequency characteristics of a drive current in the event of a break according to the fourth embodiment.

FIG. 32 is a graph that shows a change in the frequency characteristics of the amplitude of the terminal voltage of the resistor 41 or the resistor 42 (a current flowing into the vibration-type actuator) in the event of a break in connection of the vibrators of the vibration-type actuator 51 of FIG. 31. The solid line represents characteristics without a break. The dotted lines represent characteristics of break numbers 1 to 10. $F_1$ represents the frequency of a fundamental of a drive voltage waveform in normal driving, and $F_2$, $F_3$, $F_4$, and $F_5$ represent the frequencies of second-order to fifth-order harmonics. When the inflow current amplitudes of the frequencies of harmonic orders of FIG. 32 are compared with one another, it appears that the ratio of amplitude among the orders varies depending on the number of breaks and the waveforms are changed. Particularly, it appears that a change in inflow current amplitude due to whether there is a break is significant around the frequency ($F_3$) of a third-order harmonic. In comparison with the characteristics of the drive voltage amplitude of FIG. 26, a characteristic point is that negative peak characteristics coincide with one another regardless of the number of breaks around 310 kHz. This occurs from parallel resonance between the secondary sides of the transformers respectively connected in parallel with the vibrators and the matching adjustment capacitors.

Figure 33A:
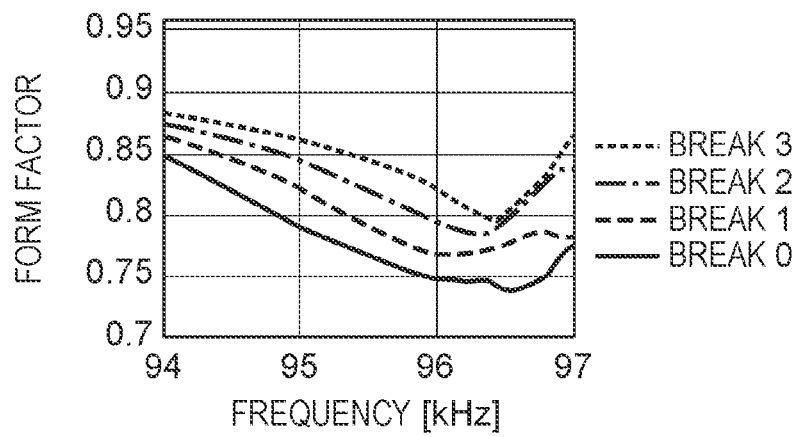
FIG. 33A is a graph that shows an example of an analysis result when driven with a pulse signal with a duty cycle of 50% according to the fourth embodiment.
Figure 33B:
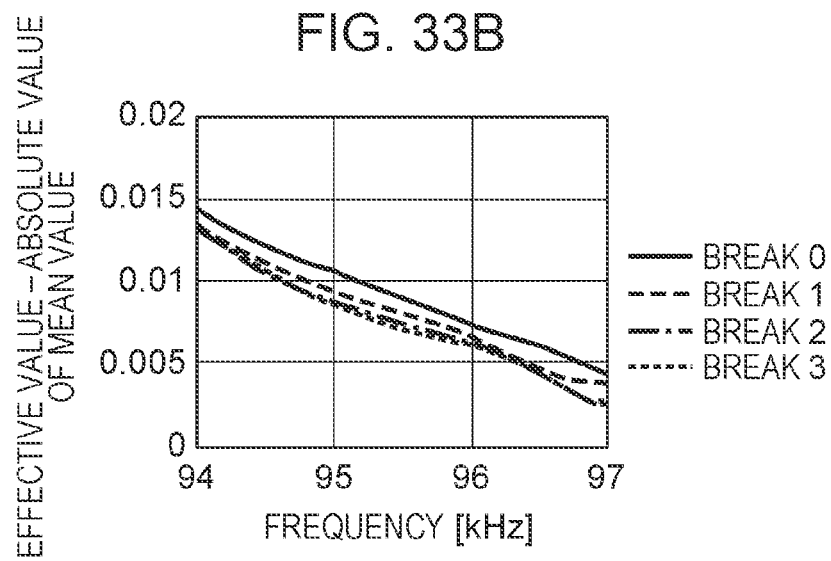
FIG. 33B is a graph that shows an example of an analysis result when driven with a pulse signal with a duty cycle of 50% according to the fourth embodiment.
Figure 33C:
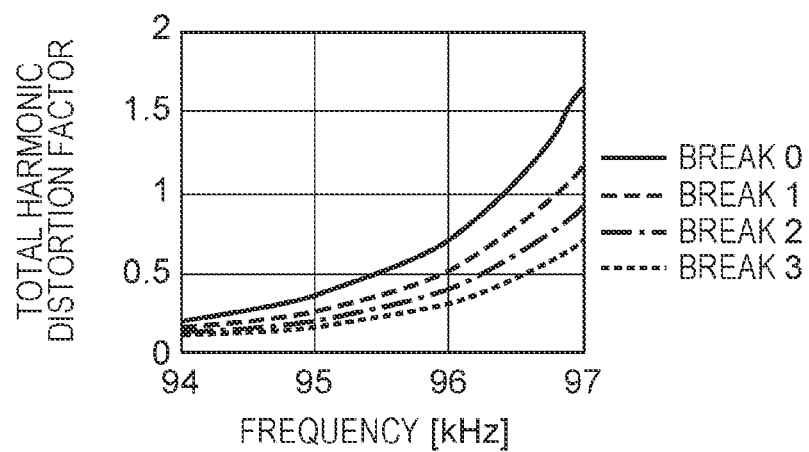
FIG. 33C is a graph that shows an example of an analysis result when driven with a pulse signal with a duty cycle of 50% according to the fourth embodiment.
Figure 33D:
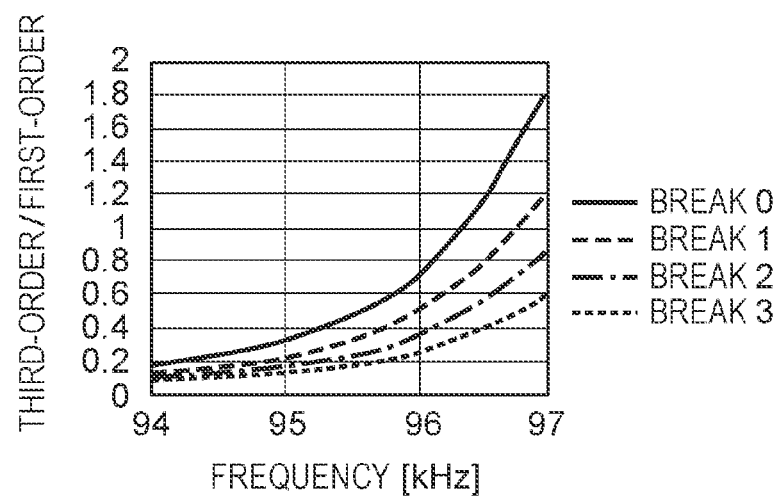
FIG. 33D is a graph that shows an example of an analysis result when driven with a pulse signal with a duty cycle of 50% according to the fourth embodiment.

FIGS. 33A, 33B, 33C, and 33D show an example of waveform analysis results of a current flowing into the vibration-type actuator 51 by the drive signal analyzing unit 47 when the rectangular voltage generating unit 40 outputs a pulse signal with a duty cycle of 50%. FIG. 33A is a graph that shows a form factor (a mean value of the absolute value/an effective value). FIG. 33B is a graph that shows a value obtained by subtracting (a mean value of the absolute value) from an effective value. FIG. 33C is a graph that shows a total harmonic distortion factor. FIG. 33D is a graph that shows a value obtained by dividing the amplitude of a third-order harmonic by the amplitude of a fundamental.

In all the waveform analysis results of FIGS. 33A, 33B, 33C, and 33D, it is possible to determine whether there is a break between break 0 and break 1; however, a value of the analysis result significantly changes depending on frequency. Therefore, a threshold for break determination needs to be changed according to a drive frequency. A comparison table for an analysis result needs to be created by measuring in advance the characteristics of the amplitude of a current flowing into the vibration-type actuator and that occurs as a result of a break. Thus, as in the case of the above-described embodiments, it is possible to determine whether there is a break and the number of breaks by using the analysis results and the comparison table in driving of the vibration-type actuator 51.

The operation of the CPU 15 that controls drive and stop in a sequence that varies according to the result of a break is in accordance with the flowchart of FIG. 29 and is the same as the above description, so the description thereof is omitted.

Figure 34:
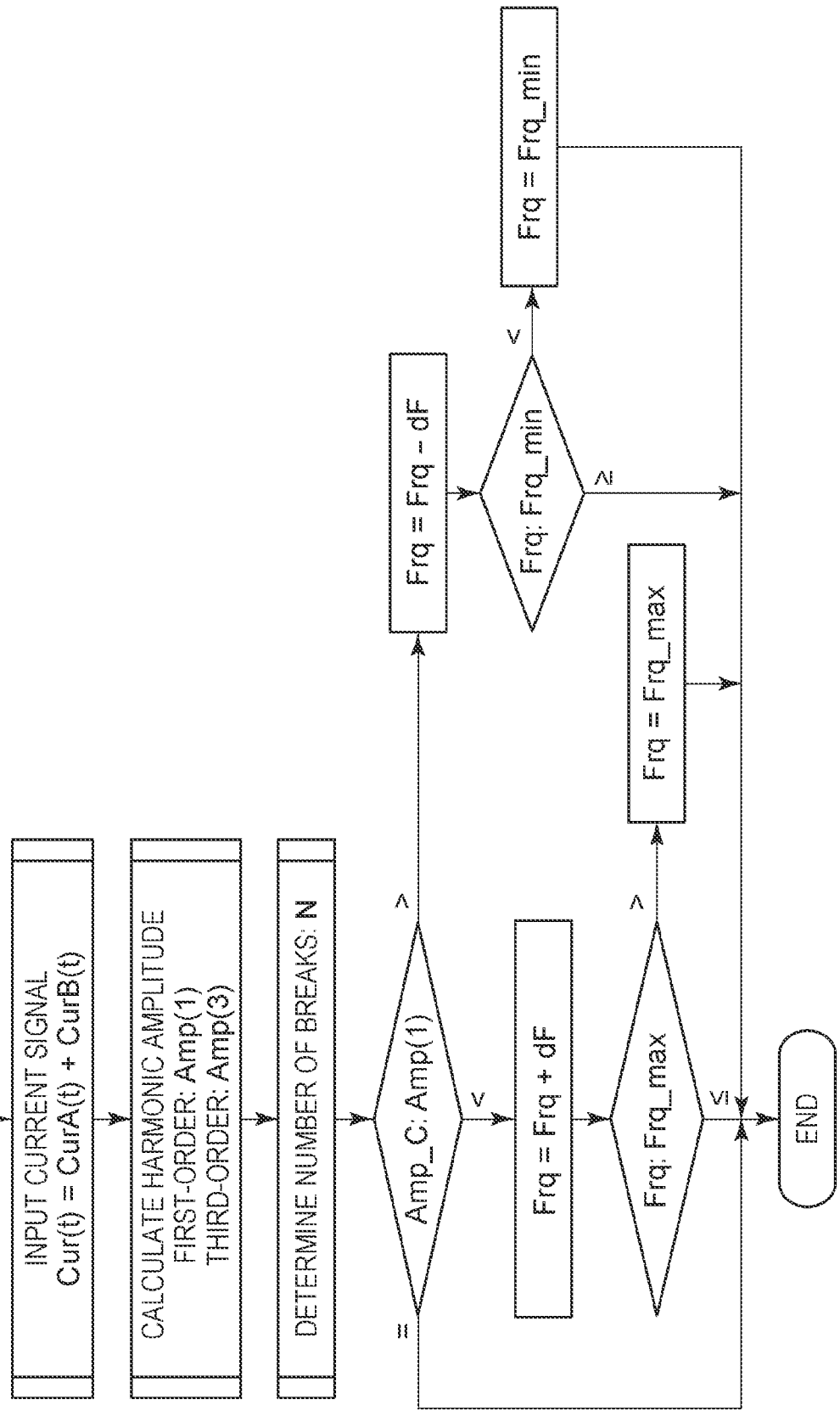
FIG. 34 is a flowchart that shows an operation example of waveform analysis, break determination, and vibration amplitude control of the CPU 15 according to the fourth embodiment.

Next, the operations of waveform analysis, break determination, and vibration amplitude control will be described. FIG. 34 is a flowchart of the waveform analysis, break determination, and vibration and amplitude control operation. First, a signal Cur(t) is generated by adding two-phase time-series current signals CurA(t), CurB(t) input separately from the A/D converter 43 through interrupt processing. This corresponds to the vibration speed (vibration amplitude) of upthrust vibration mode of the vibrator. Subsequently, a first-order amplitude Amp(1) and a third-order amplitude Amp(3) are calculated by extracting a first-order (fundamental) harmonic signal and a third-order harmonic signal through band-pass filter computation. After that, Amp(3)/Amp(1) is calculated, and the number of breaks N is calculated from the frequency command Frq and the relationship of FIG. 33D, obtained in advance. Then, the vibration amplitude command Amp_C and the first-order amplitude Amp(1) are compared with each other, and, when Amp(1) is less than Amp_C, a frequency is set so as to be lower by dF from the frequency command Frq. When Amp(1) is greater than Amp_C, a frequency is set so as to be higher by dF from the frequency command Frq. The frequency command is limited so as to fall between a minimum frequency Frq_min and a maximum frequency Frq_max. In this way, the vibration amplitude of the upthrust vibration mode of the vibration-type actuator 51 is controlled to the vibration amplitude command Amp_C.

In this way, in the present embodiment, a current signal flowing through the vibration-type actuator 51 is used in both vibration amplitude control and break analysis, so a circuit size is reduced.

In this way, the analysis result is a result obtained by analyzing the waveform of a drive voltage or the waveform of a current flowing into the vibrator unit.

The above description has demonstrated four waveform analyzing methods, and a method with which the output changes depending on a waveform is usable.

In the above description, the piezoelectric body is bonded to the vibrator. Alternatively, the vibrator itself may be made up of a piezoelectric body. Alternatively, the piezoelectric body may be a multilayer piezoelectric body.

Hereinafter, other embodiments will be described with reference to the drawings.

An example of an embodiment of the present invention includes a control unit that outputs a command signal, a drive unit that outputs a drive signal in accordance with the command signal, and a vibrator unit in which two or more vibrators that vibrate in accordance with the drive signal are connected. A current detecting unit that detects a current signal flowing through the vibrator unit is further provided. Where a current signal flowing through the vibrator unit and corresponding to a range of a drive frequency of the vibrator unit is defined as a fundamental, the control unit determines whether there is a break in wiring lines respectively coupled to the vibrators in accordance with a current signal flowing through the vibrator unit and corresponding to a harmonic of the fundamental.

Another example of an embodiment of the present invention is a control method as follows.

The control method for a vibration-type drive apparatus includes outputting, by a control unit, a command signal to a drive unit to cause a vibrator unit made up of two or more vibrators to vibrate by using a drive signal output from the drive unit in accordance with the command signal. Where a current signal flowing through the vibrator unit and corresponding to a range of a drive frequency of the vibrator unit is defined as a fundamental, the control unit determines whether there is a break in wiring lines respectively coupled to the vibrators in accordance with a current signal flowing through the vibrator unit and corresponding to a harmonic of the fundamental.

A current detecting unit that detects a current signal flowing through the vibrator unit is provided as the drive signal analyzing unit.

Hereinafter, the description will be made in detail with reference to the accompanying drawings.

Fifth Embodiment

Figure 35:
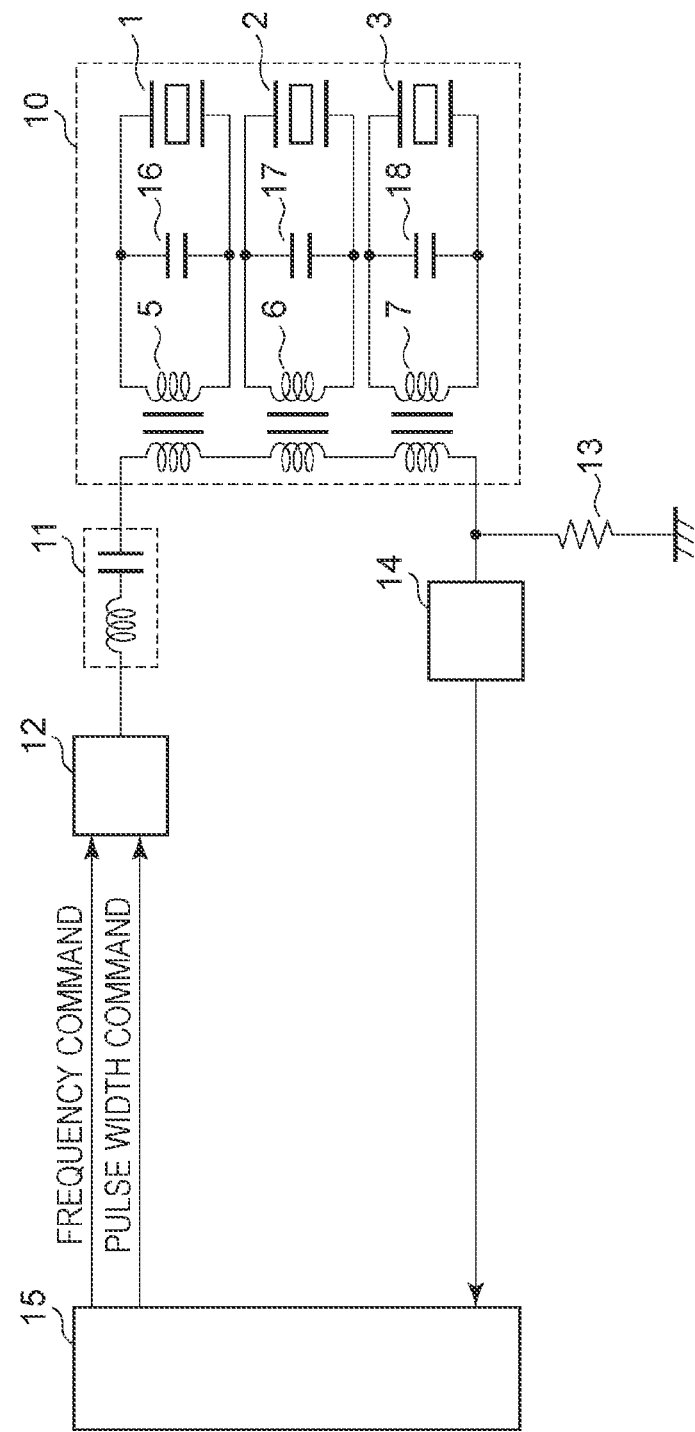
FIG. 35 is a diagram that shows a first example of a drive circuit of a vibration-type actuator according to a fifth embodiment.

FIG. 35 is a diagram that shows a drive circuit of a vibration-type actuator according to a fifth embodiment. Reference numerals 1, 2, and 3 indicate vibrators. Reference numerals 5, 6, and 7 indicate transformers of which primary sides are connected in series. Reference numerals 16, 17, and 18 indicate matching adjustment capacitors. The vibrators 1, 2, 3 and the matching adjustment capacitors 16, 17, 18 are respectively connected in parallel with secondary sides of the transformers 5, 6, 7. A portion surrounded by the dashed line represents an internal circuit of a vibration-type actuator 10 serving as a vibrator unit.

An inductance value of each of secondary-side coils of the transformers respectively connected in parallel with the vibrators is matched with a predetermined frequency close to the resonant frequency of the vibration-type actuator 10. In other words, where a matching frequency is $F_0$, the damping capacity value of a piezoelectric element bonded to each of the vibrators is $C_0$, the capacitance of each of the matching adjustment capacitors is $C_1$, and the inductance value of each of the secondary-side coils of the transformers is $L_0$, the relationship among these values is expressed by the expression 3.

$$2\pi \cdot F_0 = \frac{1}{\sqrt{L_0 \cdot (C_0 + C_1)}} \quad (3)$$

Reference numeral 12 indicates a rectangular voltage generating unit that outputs a pulse signal as a drive signal according to a frequency command. The rectangular voltage generating unit functions as a drive unit. The rectangular voltage generating unit 12 outputs a drive voltage to the vibration-type actuator 10 via a waveform shaping unit 11 made up of a series circuit of an inductor and a capacitor. In other words, the primary sides of the plurality of transformers are configured to be applied with the drive signal.

Reference numeral 13 indicates a resistor for measuring a current flowing through the vibration-type actuator 10. The resistor functions as a current detecting unit. The resistor 13 outputs a voltage proportional to a vibration speed of each of the vibrators 1, 2, 3.

Accurately, the vibration displacement of each vibrator is proportional to a value obtained by integrating the vibration speed with respect to time, and the amplitude of vibration speed is substantially proportional to a vibration amplitude. Therefore, in the following embodiments, the vibration amplitude of the vibration-type actuator 10 is controlled by controlling the amplitude of a vibration speed signal.

Reference numeral 14 indicates an A/D converter. Reference numeral 15 indicates a known CPU. The A/D converter 14 inputs a current signal detected by the resistor 13 to the CPU 15. The CPU 15 calculates the amplitude of a fundamental of the current signal (hereinafter, the amplitude of the fundamental of the current signal is referred to as a vibration amplitude) and outputs a frequency command and a pulse width command to the rectangular voltage generating unit 12 in accordance with the vibration amplitude and a speed command from the command unit (not shown).

The vibration-type actuator 10 serving as the vibrator unit illustrated in FIG. 35 is configured such that the vibrators, respectively, are connected in parallel with the secondary sides of the plurality of transformers of which the primary sides are connected in series, and the primary sides of the plurality of transformers are configured to be applied with the drive signal. In addition, the waveform shaping unit inserted between the rectangular voltage generating unit and the vibrator unit is provided.

In this way, the vibration-type actuator 10 serving as the vibrator unit is made up of two or more vibrators connected, and the vibrators are configured to be respectively driven by a common command signal that the CPU 15 serving as the control unit issues.

Here, for example, a configuration using the above-described cylindrical shaft may be used as the vibration-type actuator according to the present embodiment.

A control method for a vibration-type drive apparatus according to the present embodiment is as follows. The control method for a vibration-type drive apparatus includes outputting, by a control unit, a command signal to a drive unit to cause a vibrator unit made up of two or more vibrators to vibrate by using a drive signal output from the drive unit in accordance with the command signal. Where a current signal flowing through the vibrator unit and corresponding to a range of a drive frequency of the vibrator unit is defined as a fundamental, the control unit determines whether there is a break in wiring lines respectively coupled to the vibrators in accordance with a current signal flowing through the vibrator unit and corresponding to a harmonic of the fundamental.

Figure 36:
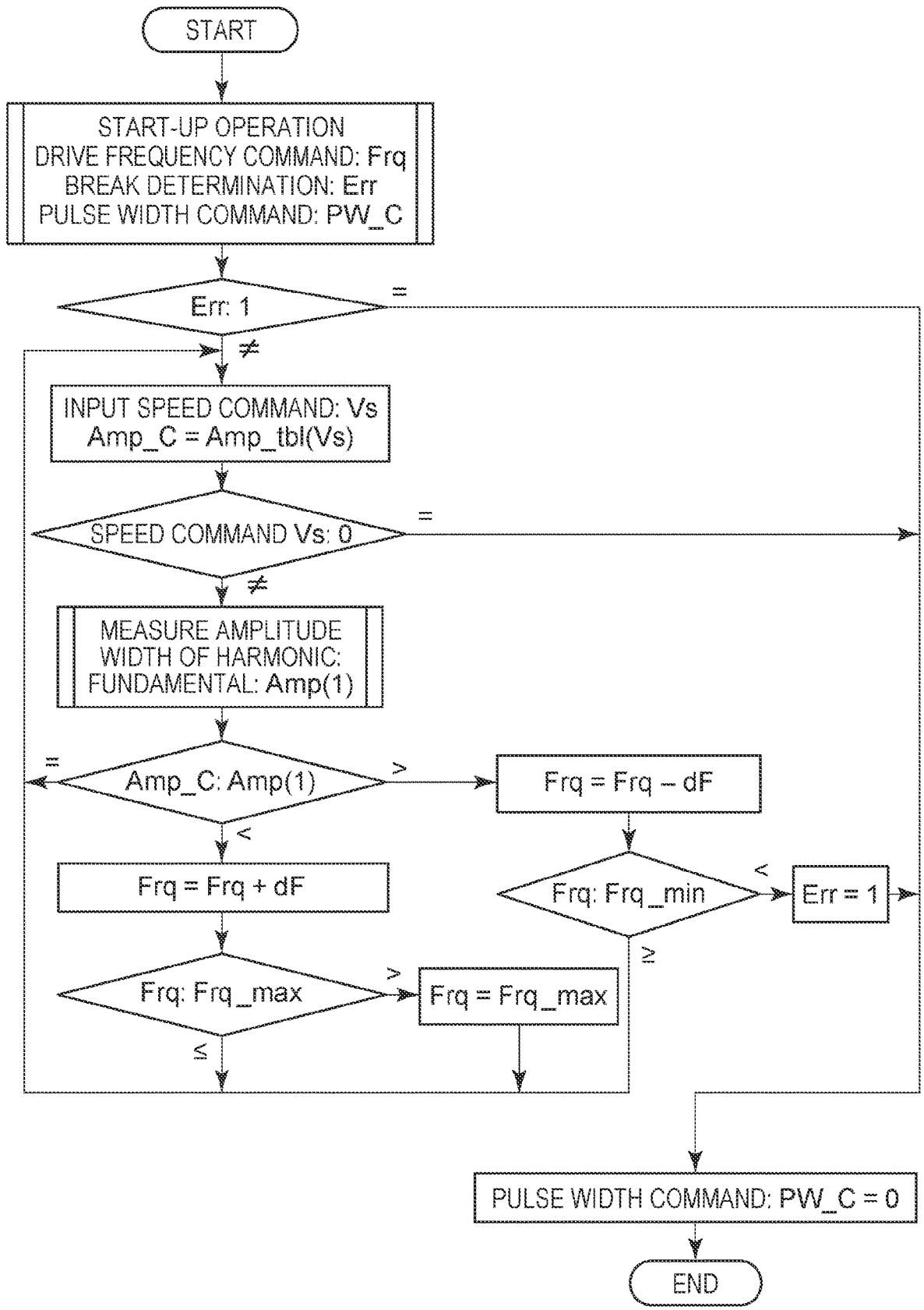
FIG. 36 is a flowchart that shows an operation example of the CPU 15 according to the fifth embodiment.

The operation of the CPU 15 will be described with reference to the flowchart of FIG. 36. When a speed command Vs input from the command unit (not shown) is input, the CPU 15 starts a start-up operation. Although the detailed description of the start-up operation will be separately made, a drive voltage is applied to the vibration-type actuator 10 by outputting a frequency command Frq and a pulse width command PW_C to the rectangular voltage generating unit 12 in the start-up operation, and a break determination result Err is output through break determination. When the break determination result Err is 1, the pulse width command PW_C is set to 0 to end; whereas, when the break determination result Err is 0, vibration amplitude control over the vibration-type actuator 10 is performed.

The vibration amplitude control determines a vibration amplitude command Amp_C corresponding to the input speed command Vs and repeatedly executes the operation described below until the speed command Vs becomes 0. A harmonic amplitude measuring routine measures the amplitude of a harmonic of the current signal and measures the amplitude (vibration amplitude) Amp(1) of a fundamental. Specifically, first, a desired order waveform is extracted with a band-pass filter from a time-series signal input by the A/D converter 14, and the waveform of a fundamental component is also extracted. For each of the components, the amplitude is obtained from a maximum value, a minimum value, an effective value, and the like.

The pass band of the band-pass filter may include at least any one of a second-order harmonic and a third-order harmonic of a pulse signal.

The vibration-type drive apparatus may be configured to have any one of a high-pass filter that cuts a fundamental component of a current signal and a band-pass filter that detects a specific-order harmonic for the fundamental.

Next, the vibration amplitude command Amp_C and the amplitude (vibration amplitude) Amp(1) of the fundamental are compared. When the vibration amplitude Amp(1) is greater than the vibration amplitude command Amp_C, the frequency is increased by a predetermined amount. When the vibration amplitude Amp(1) is less than the vibration amplitude command, the frequency is reduced by a predetermined amount. Thus, the amplitude (vibration amplitude) Amp(1) of the fundamental approaches the vibration amplitude command Amp_C. At this time, when the frequency command Frq exceeds a maximum frequency Frq_max, the frequency command is limited to the maximum frequency Frq_max. If the frequency command Frq falls below a minimum frequency Frq_min, it is regarded that the amplitude (vibration amplitude) Amp(1) of the fundamental has not reached the vibration amplitude command Amp_C, and it is determined that there is a break. Then, the break determination result Err is set to 1, the pulse width command PW_C is set to zero, and the routine ends.

When the amplitude (vibration amplitude) Amp(1) of the fundamental coincides with the vibration amplitude command Amp_C or when the frequency command Frq has not fallen below the minimum frequency Frq_min, the speed command Vs is input again, and the vibration amplitude control operation is repeatedly executed until the speed command Vs becomes zero. Then, when the speed command Vs becomes zero during execution of the vibration amplitude control, the pulse width command PW_C is set to zero, and the vibration amplitude control is ended.

Figure 37:
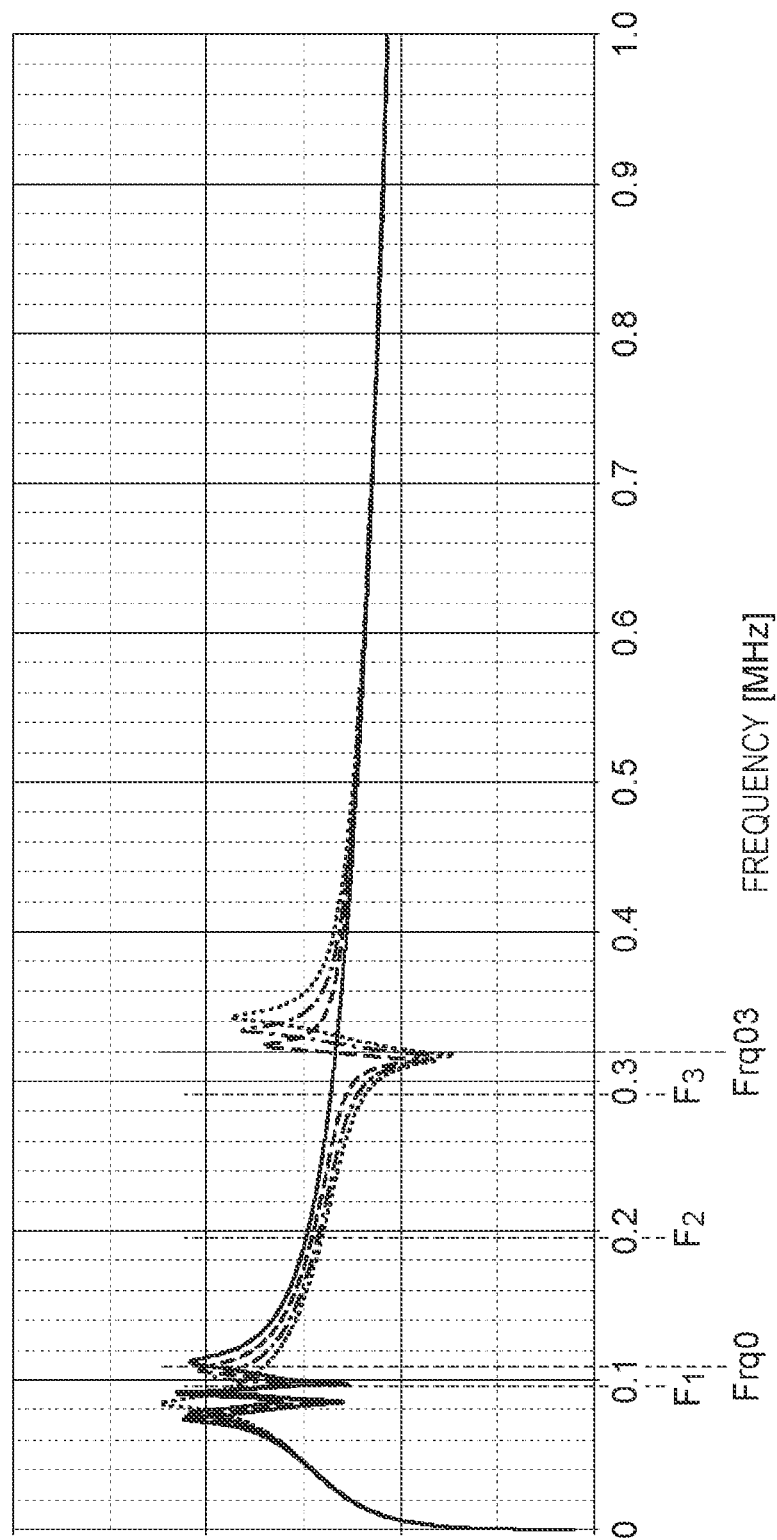
FIG. 37 is a graph that shows a first example of a change in the frequency characteristics of an inflow current amplitude in the event of a break according to the fifth embodiment.

Next, the start-up operation will be described. FIG. 37 is a graph that shows the frequency characteristics of a current flowing into the vibration-type actuator 10, which changes depending on the number of breaks in the vibrators of the vibration-type actuator 10.

The range of the drive frequency of the vibration-type actuator 10 according to the present embodiment is a range of about 93 kHz to about 98 kHz.

The solid line represents that there is no break, the dashed line represents that one of the vibrators has a break, the alternate long and short dashed line represents that two of the vibrators each have a break, and the dotted line represents that all the vibrators each have a break. $F_1$ that is the frequency corresponding to the range of the drive frequency of the vibration-type actuator 10 is a frequency around the frequency of a valley of a current amplitude. When a pulse signal is generated with the frequency $F_1$, this corresponds to a current signal serving as a fundamental flowing through the vibration-type actuator 10 serving as a vibrator unit. The frequency of a second-order harmonic of the frequency $F_1$ is $F_2f$ and the frequency of a third-order harmonic is $F_3$. In the present embodiment, it appears that a resonant characteristic occurs near $F_3$ when there occurs a break. The matching frequency $F_0$ is set to a frequency around $F_1$.

Figure 38:
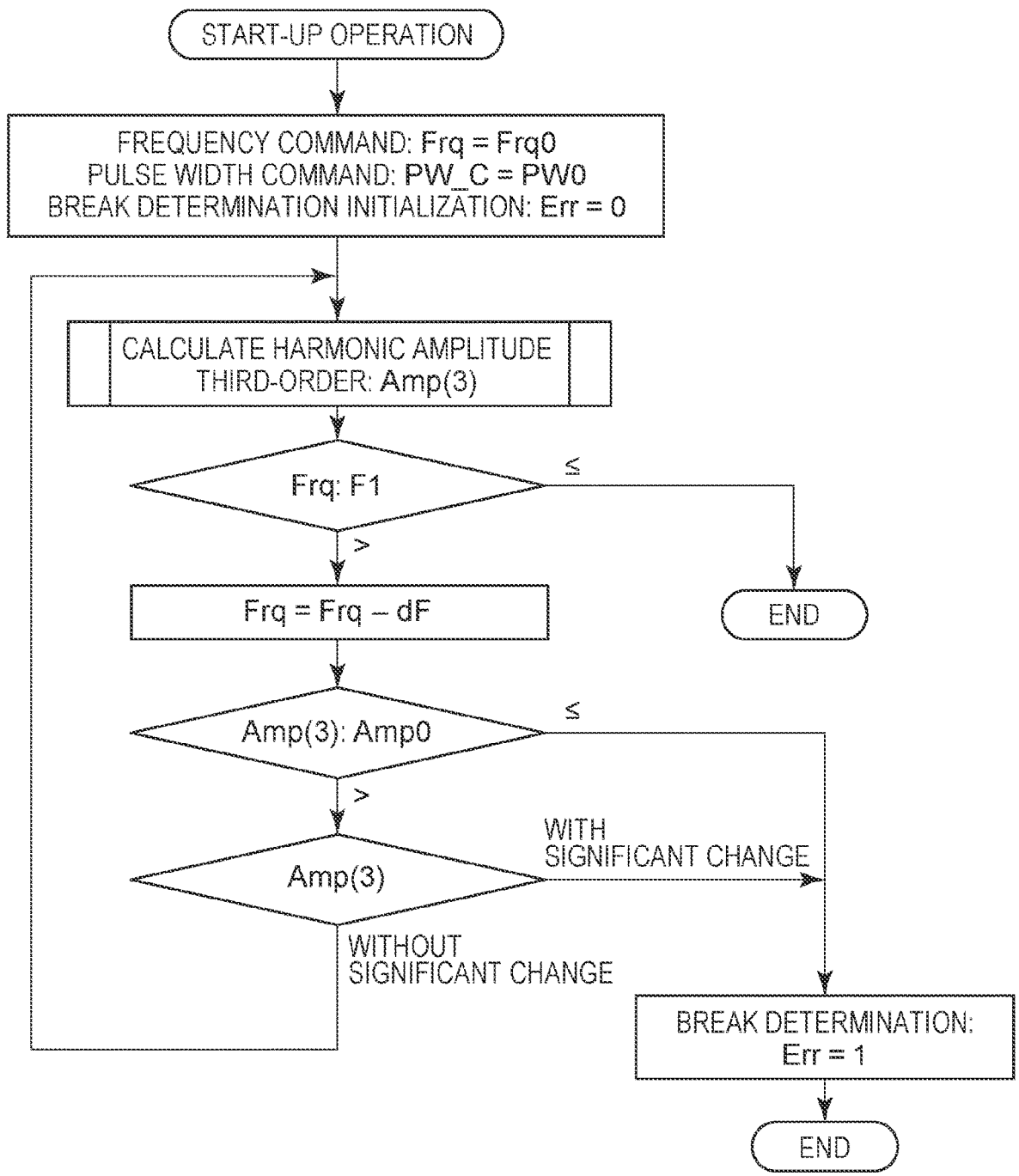
FIG. 38 is a flowchart that shows an example of start-up operation of the CPU 15 according to the fifth embodiment.

FIG. 38 is a flowchart of a first example of the start-up operation of the CPU 15. When the start-up operation starts, a pulse signal is generated by setting the frequency command Frq for the rectangular voltage generating unit 12 to a frequency Frq0, the pulse width command PW_C is set to a drive pulse width PW0 to generate a pulse signal, and a drive voltage is applied to the vibration-type actuator 10. Then, the determination result Err of break determination is set to 0, and the break determination operation is started.

Break determination is repeatedly performed until the frequency command Frq is swept from a high-frequency side (Frq0) to a low-frequency side and the frequency becomes $F_1$.

Break determination is performed by using the amplitude Amp(3) of a third-order waveform, detected in a harmonic amplitude calculation routine. A frequency Frq03 of a third-order harmonic at start-up time is a frequency that is three times the frequency Frq0 and is set such that, as shown in FIG. 37, Frq03 becomes a frequency around the bottom of a valley (around 320 kHz) of the resonant characteristic that occurs in the event of a break or higher. When there occurs a break, the amplitude Amp(3) of a third-order waveform significantly changes around the frequency of the valley of the resonant characteristic during sweeping of the frequency or becomes a value lower than a predetermined amplitude Amp0. After this change is detected, the break determination Err is set to 1, and the routine ends. When there is no break, sweeping of the frequency is directly continued to $F_1$, and the operation of break determination is repeated.

The frequency of the bottom (around 320 kHz) of the valley of the resonant characteristic in the event of a break is determined from a sweep time from the frequency Frq0 at start-up time to the frequency $F_1$, the speed of frequency sweep, constraints of the magnitude of current of a fundamental component, and the like. The frequency can be selectively set by adjusting the capacitance value $C_1$ of the matching adjustment capacitor. In other words, the capacitance value of the matching adjustment capacitor is configured to bring a frequency at a bottom of a valley of a resonant characteristic that appears in frequency characteristics of a current flowing through the vibrator unit in a state where there is a break and a frequency that is an integer multiple of a start-up frequency in a state where there is no break.

In this case, when the integer multiple is twice or three times, it is further desirable to detect a break with high accuracy without an increase in the range of frequency sweep.

Figure 39:
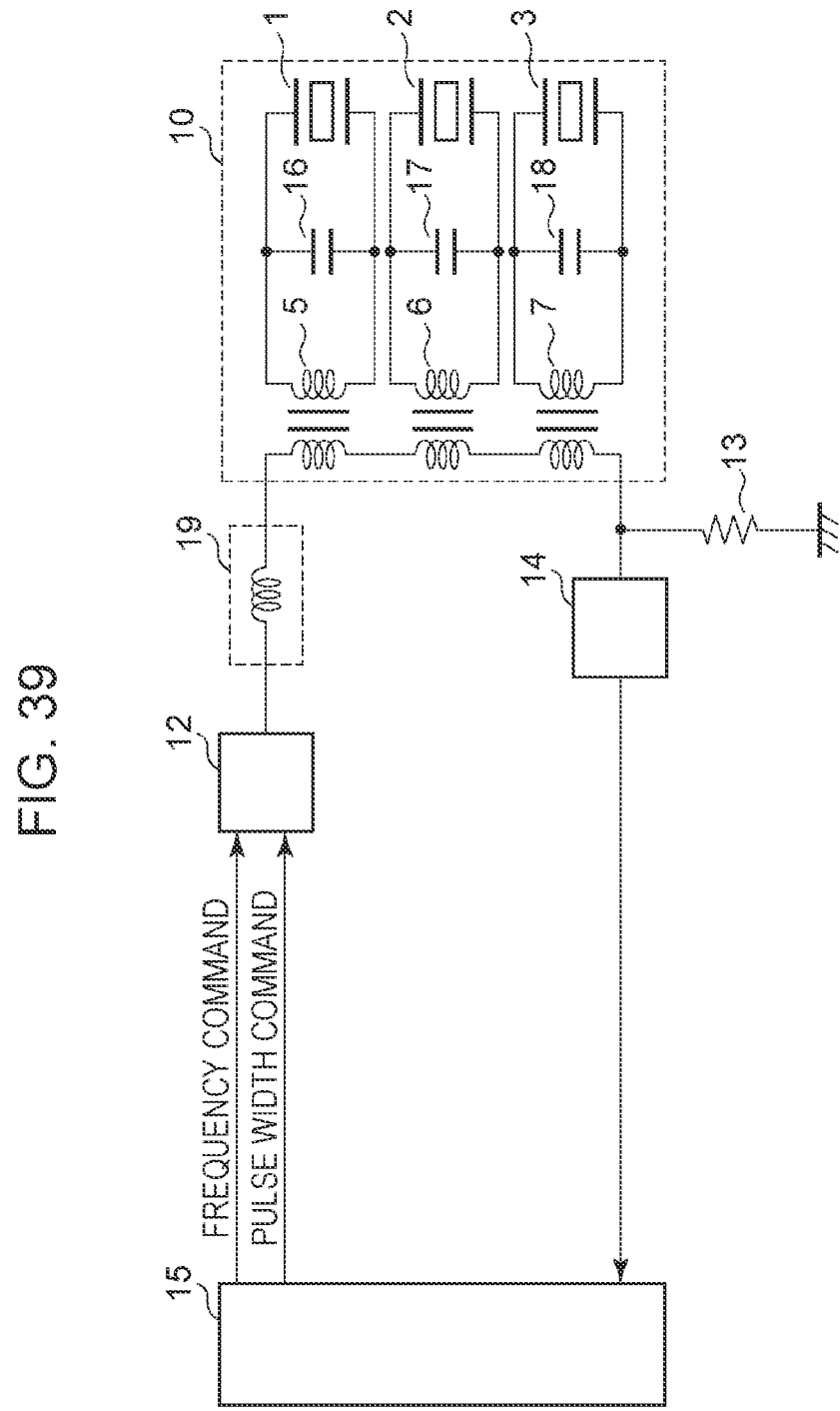
FIG. 39 is a diagram that shows a second example of the drive circuit of the vibration-type actuator according to the fifth embodiment.
Figure 40:
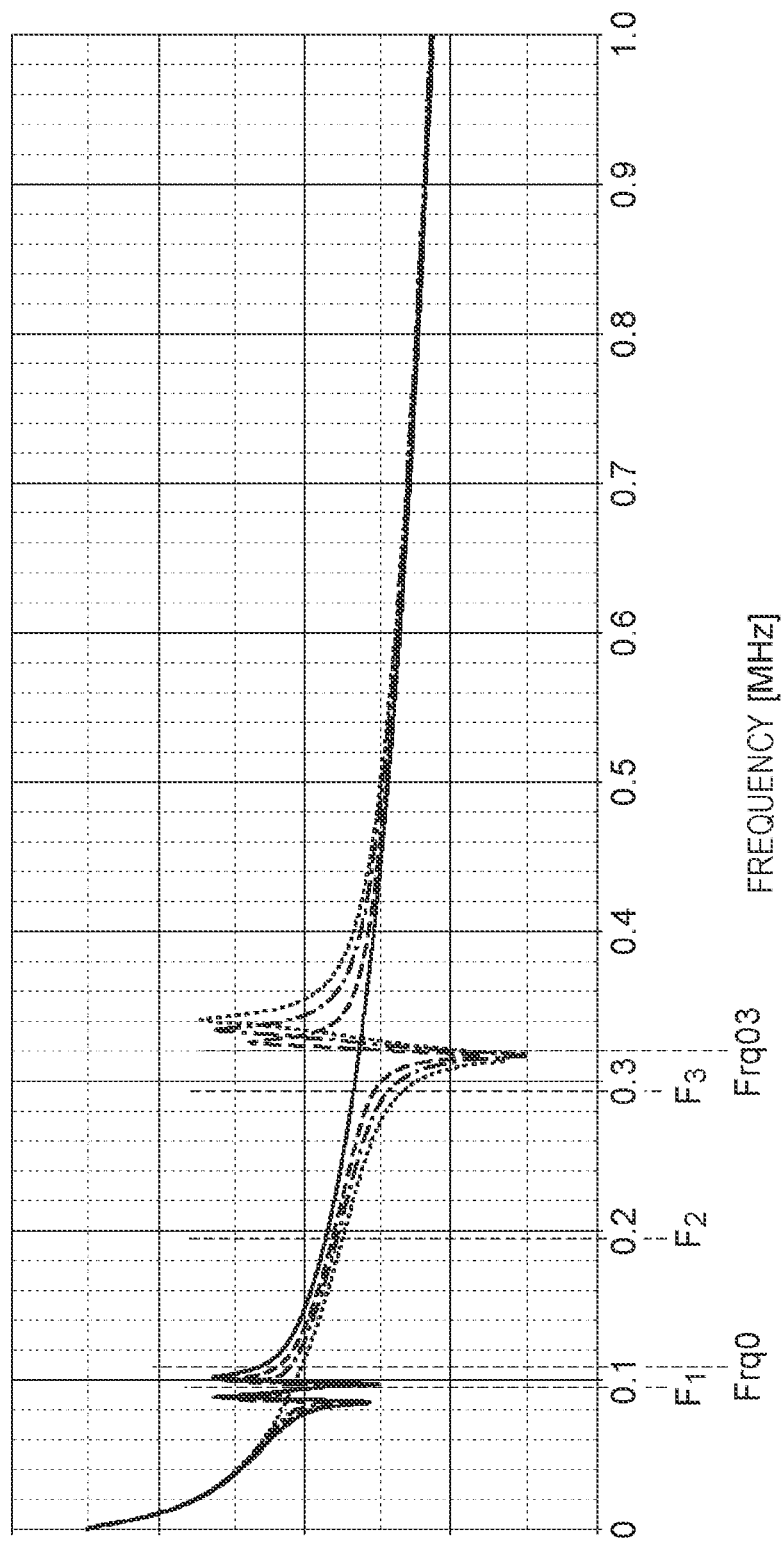
FIG. 40 is a graph that shows a second example of a change in the frequency characteristics of an inflow current amplitude in the event of a break according to the fifth embodiment.

FIG. 39 is a second example of the drive circuit of the vibration-type actuator. A difference from the drive circuit of the vibration-type actuator of FIG. 35 is that the waveform shaping unit 11 that is a series circuit of an inductor and a capacitor is replaced with a waveform shaping unit 19 including only an inductor. FIG. 40 is a graph that shows an example of the frequency characteristics of a current flowing into the vibration-type actuator 10, which changes depending on the number of breaks in the vibrators of the vibration-type actuator 10 of the drive circuit of FIG. 39. Since there is no capacitor to cut direct current in the waveform shaping unit 19, a current amplitude in a low-frequency range is increased as compared to the characteristics of FIG. 37. The solid line represents that there is no break, the dashed line represents that one of the vibrators has a break, the alternate long and short dashed line represents that two of the vibrators each have a break, and the dotted line represents that all the vibrators each have a break. $F_1$ is a frequency around the frequency of the valley of a current amplitude, and, when a pulse signal is generated with the frequency $F_1$, the frequency of a second-order harmonic is $F_2$ and the frequency of a third-order harmonic is $F_3$.

It is more desirable that the waveform shaping unit be provided; however, it is not indispensable.

As in the case of the characteristics of FIG. 37, the resonant characteristic of a current appears near $F_3$ in the event of a break. As in the case of the above description, the frequency Frq03 that is three times the frequency Frq0 is set to be a frequency around the bottom (320 kHz) of the valley of the resonant characteristic that occurs in the event of a break or higher. The description of the operations of the units is the same as the above description, so the description is omitted.

Figure 41:
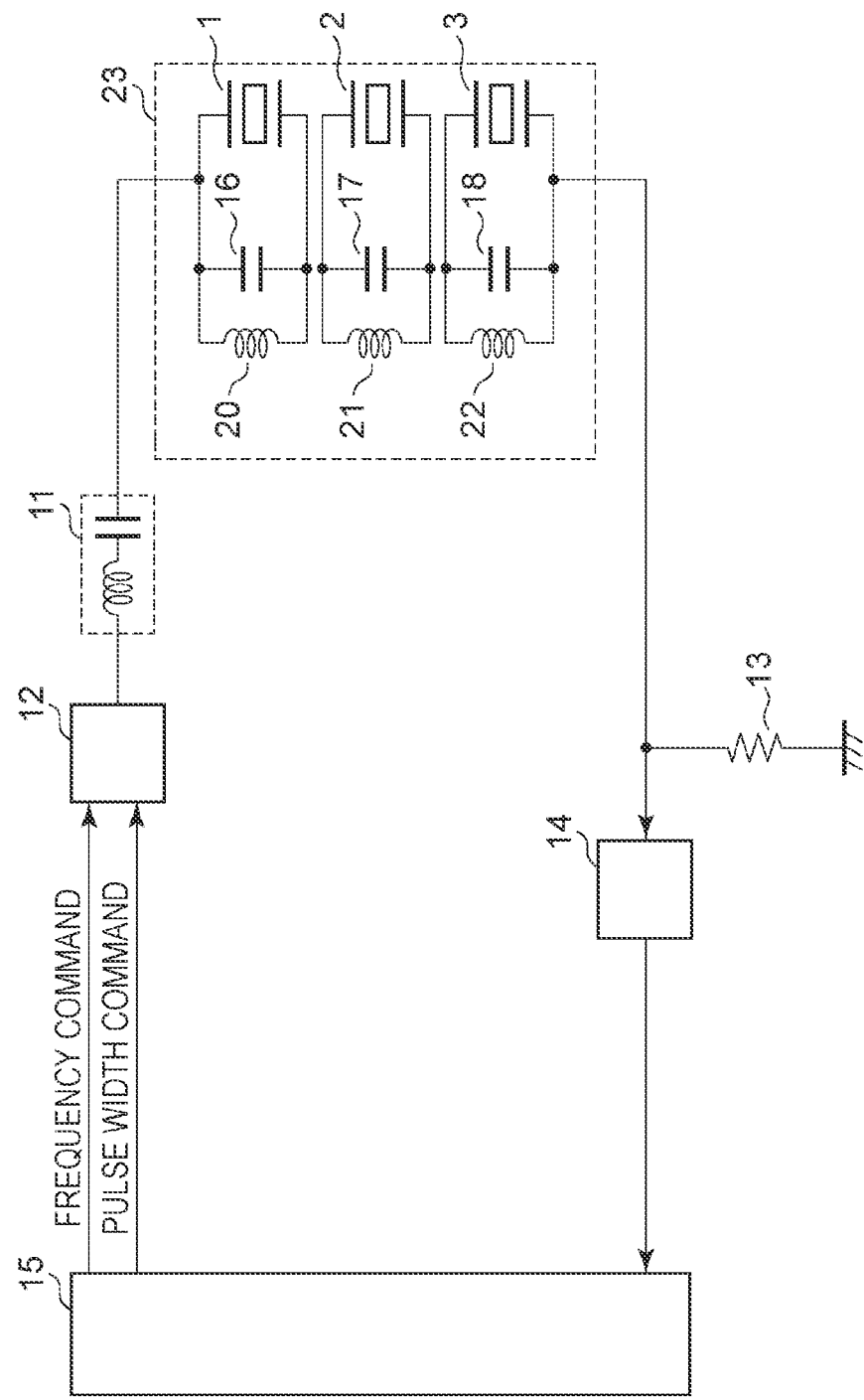
FIG. 41 is a diagram that shows a third example of the drive circuit of the vibration-type actuator according to the fifth embodiment.

FIG. 41 is a diagram that shows a third example of the drive circuit of the vibration-type actuator, which is an example of a case where the configuration of the vibration-type actuator is different. In the above-described example, the transformers 5, 6, 7 and the matching adjustment capacitors 16, 17, 18, respectively, are connected in parallel with the vibrators 1, 2, 3; whereas, in the present example, inductors 20, 21, 22 and the matching adjustment capacitors 16, 17, 18, respectively, are connected in parallel with the vibrators 1, 2, 3. The vibrators 1, 2, 3 are connected in series, the inductors 20, 21, 22 and the matching adjustment capacitors 16, 17, 18, respectively, are connected in parallel with each other, and these components make up a vibration-type actuator 23 serving as a vibrator unit. The basic configuration of the present embodiment is to include a vibrator unit in which a plurality of sets of parallel-connected inductor, capacitor, and vibrator is connected in series.

Figure 42:
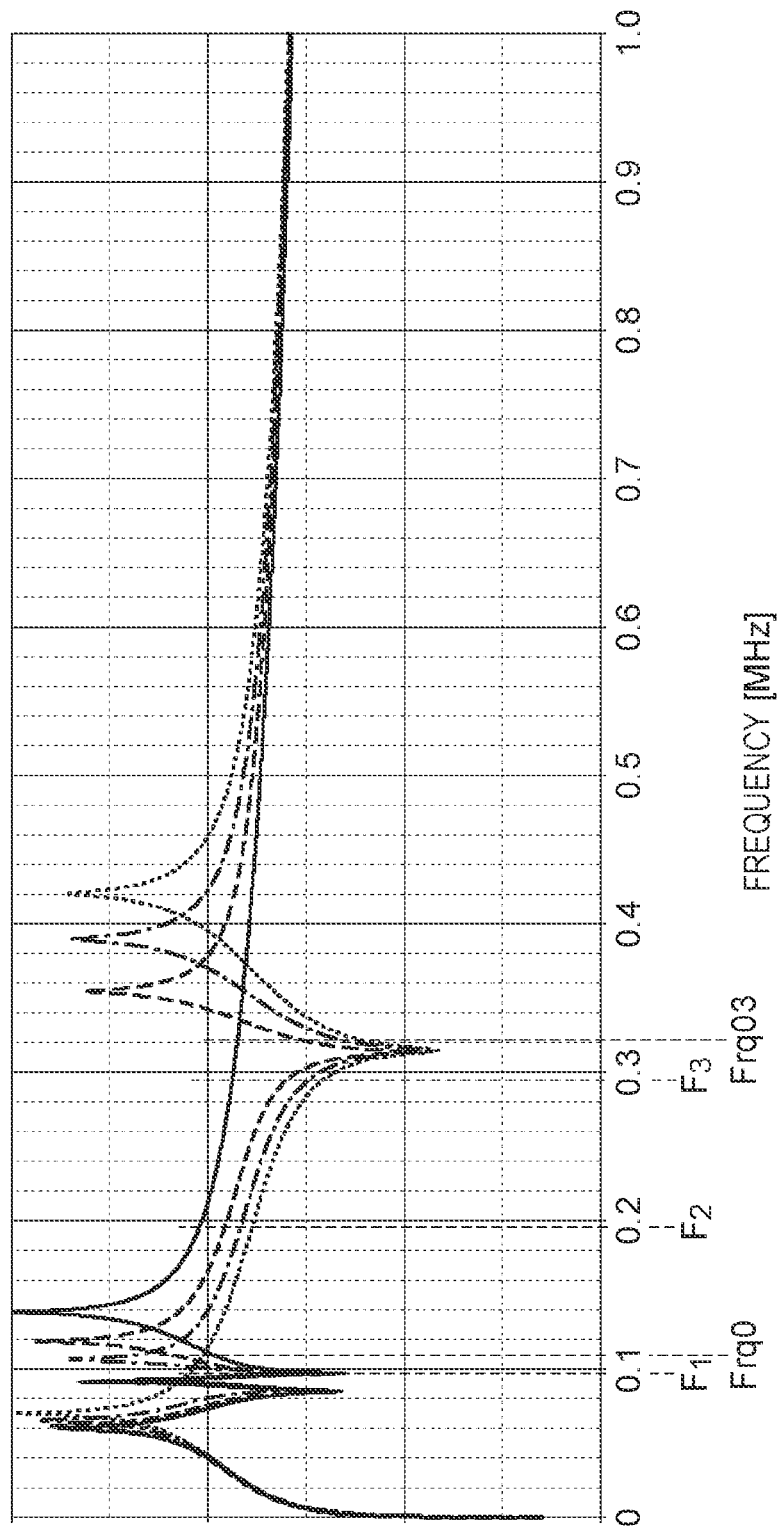
FIG. 42 is a graph that shows a third example of a change in the frequency characteristics of an inflow current amplitude in the event of a break according to the fifth embodiment.

FIG. 42 is a graph that shows a first example of the frequency characteristics of a current flowing into the vibration-type actuator 23 in the event of a break in connection of the vibrators of the vibration-type actuator 23. As in the case of the above description, the amplitude of an inflow current is measured by sweeping frequency on the assumption that the rectangular voltage generating unit 12 outputs a sinusoidal wave.

The solid line represents that there is no break, the dashed line represents that one of the vibrators has a break, the alternate long and short dashed line represents that two of the vibrators each have a break, and the dotted line represents that all the vibrators each have a break. $F_1$ is a frequency around the frequency of the valley of a current amplitude, and, when a pulse signal is generated with the frequency $F_1$, the frequency of a second-order harmonic is $F_2$ and the frequency of a third-order harmonic is $F_3$. As in the case of the characteristics of FIGS. 37 and 40, the resonant characteristic of a current appears near $F_3$ in the event of a break. As in the case of the above description, the frequency Frq03 that is three times the frequency Frq0 is set to be a frequency around the bottom (320 kHz) of the valley of the resonant characteristic that occurs in the event of a break or higher, and a break is detected in the start-up operation of FIG. 38 as in the case of the above-described example.

Each of the vibrators 1, 2, 3 is made up of an elastic body and a piezoelectric element bonded to the elastic body. Alternatively, each of the vibrators 1, 2, 3 may be made up of only a piezoelectric body. In the above-description, a pulse signal that is the output of the rectangular voltage generating unit 12 is used as a drive voltage. Alternatively, another waveform may be used. Even a triangular wave, a sawtooth wave, or a PWM modulated wave that is the output of a known class D amplifier, which includes a lot of relatively low-order harmonics lower than or equal to a fifth-order harmonic, can detect a harmonic current, so it is possible to determine whether there is a break and the number of breaks. It is more desirable that the waveform shaping unit be provided; however, it is not indispensable. Signal processing may be performed directly.

Sixth Embodiment

Figure 43:
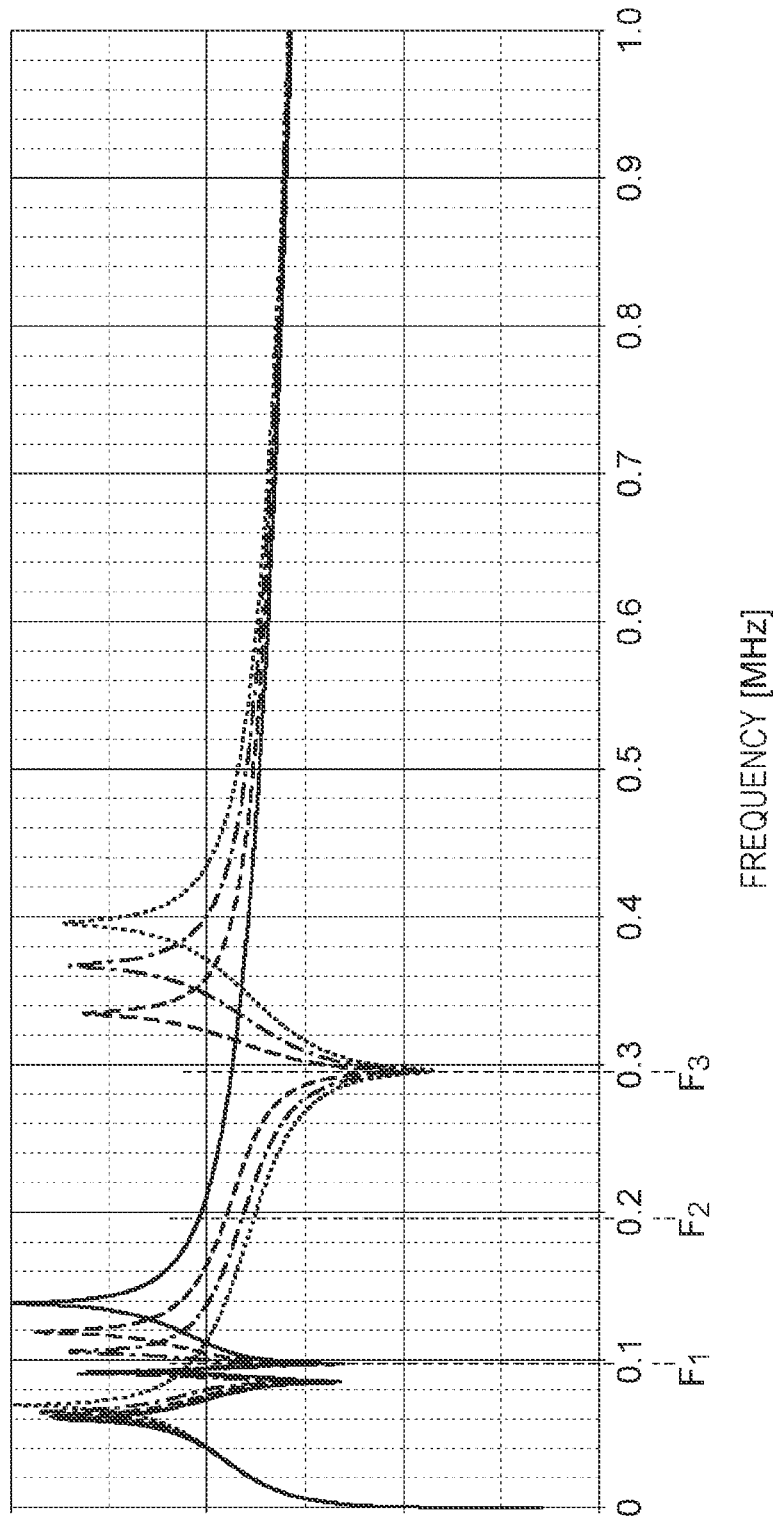
FIG. 43 is a graph that shows an example of a change in the frequency characteristics of an inflow current amplitude in the event of a break according to a sixth embodiment.

FIG. 43 is a graph that shows a second example of the frequency characteristics of a current flowing into the vibration-type actuator 23 in the event of a break in connection of the vibrators of the vibration-type actuator 23. The characteristics of FIG. 43 differ from the characteristics of FIG. 42 in that the frequency $F_3$ of a third-order harmonic of the pulse signal is set to a frequency around the bottom (294 kHz) of the valley of the resonant characteristic that occurs in the event of a break by adjusting the values of the matching adjustment capacitors. The configuration of the drive circuit of the vibration-type actuator is similar to that of FIG. 41; however, the operation of the CPU 15 is different.

Figure 44:
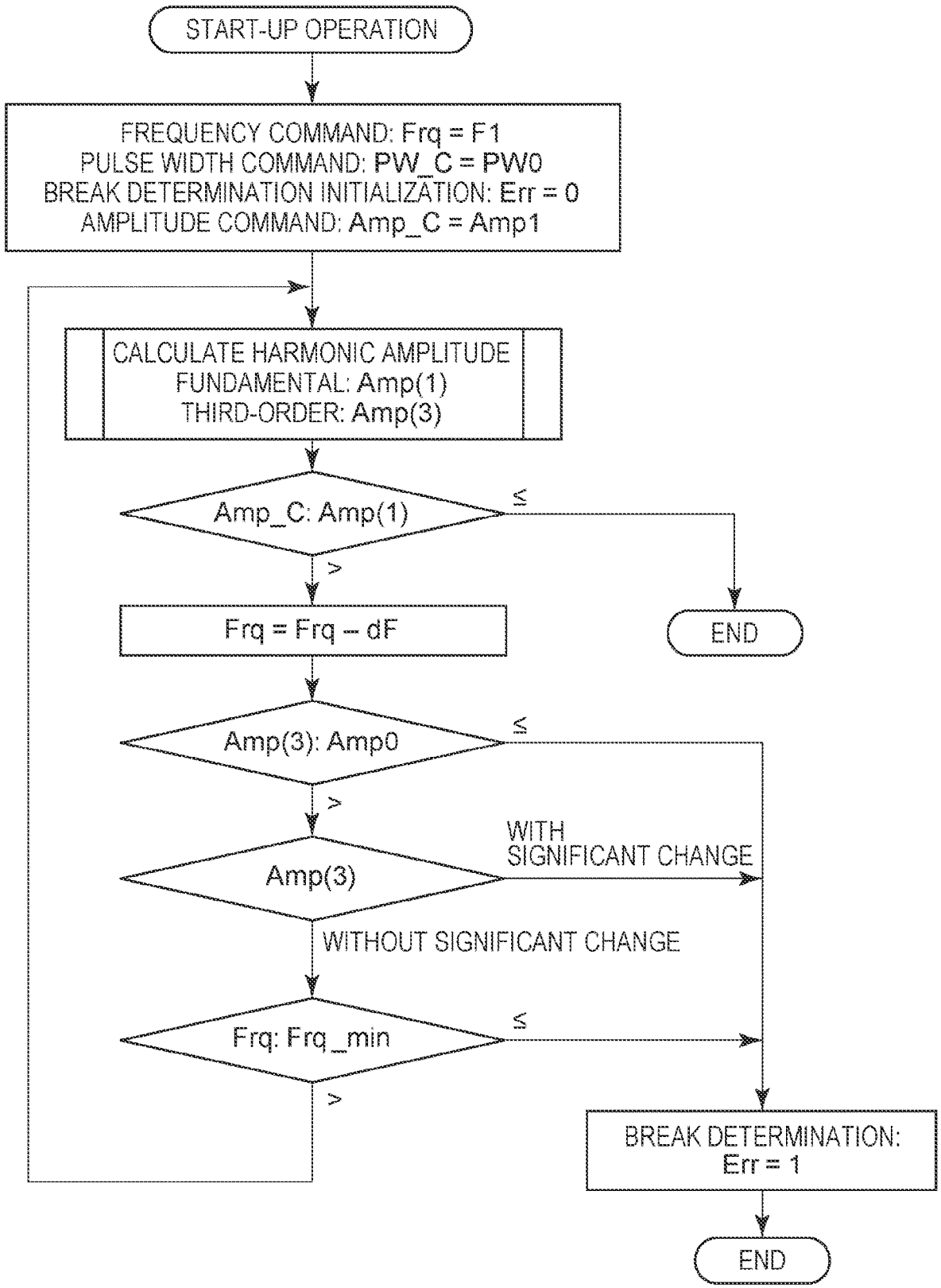
FIG. 44 is a flowchart that shows an example of start-up operation of the CPU 15 according to the sixth embodiment.

Hereinafter, the operation of the CPU 15 will be described. FIG. 44 is a second example of the flowchart of the start-up operation of the CPU 15. When the start-up operation starts, a pulse signal is generated by setting the frequency command Frq to the frequency $F_1$ and setting the pulse width command PW_C to a drive pulse width PW0 for the rectangular voltage generating unit 12, and a drive voltage is applied to the vibration-type actuator 10. Then, the amplitude command Amp_C is set to an initial amplitude Amp1, a break determination result Err is set to 0, and the break determination operation is started.

Break determination is repeatedly performed by sweeping the frequency command Frq from a high-frequency side ($F_1$) to a low-frequency side until the amplitude (vibration amplitude) Amp(1) of the fundamental becomes greater than or equal to the amplitude command Amp_C.

Break determination is performed by using the amplitude Amp(3) of a third-order waveform, detected in the harmonic amplitude calculation routine. A frequency $F_3$ of a third-order harmonic at start-up time is a frequency that is three times the frequency $F_1$ and is set such that, as shown in FIG. 43, $F_3$ becomes a frequency around the bottom (around 294 kHz) of the valley of the resonant characteristic that occurs in the event of a break. When there occurs a break, the amplitude Amp(3) of a third-order waveform significantly changes around the frequency of the valley of the resonant characteristic during sweeping of the frequency or becomes a value lower than a predetermined amplitude Amp0. After this change is detected, the break determination Err is set to 1, and the routine ends. When the frequency Frq becomes lower than or equal to the minimum frequency Frq_min as well, the break determination Err is set to 1, and the routine ends. When there is no break, sweeping of the frequency is directly continued, and the operation of break determination is repeated.

Here, when the inductance value $L_0$ of each of the secondary-side coils of the transformers is set such that the matching frequency $F_0$ is equal to $F_1$, the expression 3 is replaced with the expression 4.

$$2\pi \cdot F_1 = \frac{1}{\sqrt{L_0 \cdot (C_0 + C_1)}} \qquad (4)$$

The relationship between the frequency $F_1$ and the capacitance value $C_1$ of the matching adjustment capacitor in the case where the order of a harmonic intended to match the resonant characteristic that occurs in the event of a break is N is expressed by the expression 5.

$$2\pi \cdot N \cdot F_1 = \frac{1}{\sqrt{L_0 \cdot C_1}} \qquad (5)$$

Then, the relationship between the damping capacity value $C_0$ and the capacitance value $C_1$ is expressed by the expression 6 from the expression 4 and the expression 5.

$$C_1 = \frac{C_0}{(N^2 - 1)} \qquad (6)$$

In the fifth embodiment, since the frequency is swept from the frequency Frq0 higher than the frequency of the valley of the current amplitude of the fundamental at start-up time, the current amplitude in a start-up initial stage increases, which decreases the efficiency. In contrast, in the sixth embodiment, sweeping the frequency is started from the frequency $F_1$, so the start-up operation is performed with an efficiency equivalent to that of existing driving, and it is possible to detect a break.

In the fifth embodiment and the sixth embodiment, the frequency Frq03 that is three times the frequency Frq0 at start-up time is brought close to around the bottom (around 320 kHz) of the valley of the resonant characteristic that occurs in the event of a break. However, when the order of a harmonic is included at a percentage higher than or equal to a certain extent in the pulse signal, the frequency of the same multiple as the order (when the order of a harmonic is fifth order, the frequency that is five times the frequency Frq0) may be brought close to a frequency around the bottom of the valley of the resonant characteristic that occurs in the event of a break. When the pulse width has a duty cycle of 50%, there are almost no even-numbered-order harmonics; however, even-numbered-order harmonics increase as the pulse width narrows. When the pulse width is narrow, the frequency that is twice the frequency Frq0 or the frequency further higher even-number multiple frequency may be used.

Seventh Embodiment

The configuration of vibrators used in a seventh embodiment will be described below. The configuration of each of the vibrators is as described in FIGS. 22A, 22B, 23A, 23B, and 24, so the description is omitted.

A vibration mode of a vibrator 48 is similar to the above-described mode, so the description is omitted.

Figure 45:
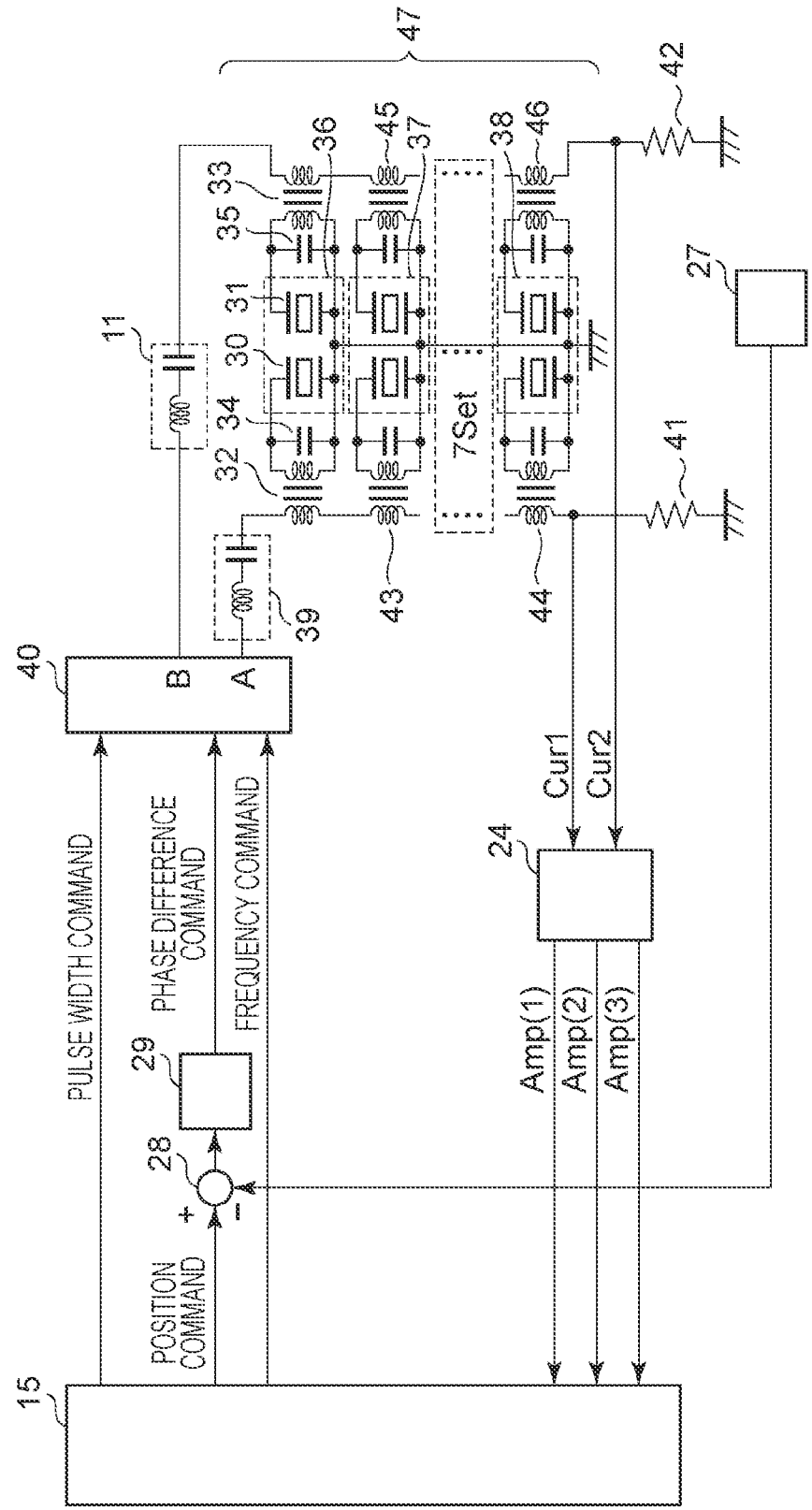
FIG. 45 is a diagram that shows an example of a drive circuit of a vibration-type actuator according to a seventh embodiment.

FIG. 45 is a diagram that shows a drive circuit of a vibration-type actuator according to the seventh embodiment. The number of the vibrators is three and the number of phases of a drive voltage is one in each of the vibration-type actuators according to the above-described embodiments, and the number of the vibrators is 10 and the vibrators are driven with two-phase drive voltages in the present embodiment. The electrically conductive elastic bodies (not shown) of the 10 vibrators 36, 37 . . . 38 are connected to a ground potential.

The electrodes 30, 31 provided on the piezoelectric body 49 in the vibrator 36, respectively, are connected in parallel with the transformers 32, 33 together with matching adjustment capacitors 34, 35. Primary sides of nine transformers 43 ... 44 are connected in series on a primary side of the transformer 32, and the nine vibrators 37 ... 38, respectively, are connected in parallel with secondary sides of the transformers together with matching adjustment capacitors. Nine transformers 45 ... 46 are similarly connected in series on a primary side of the transformer 33, and the nine vibrators 37 ... 38, respectively, are connected in parallel with the secondary sides of the transformers together with the matching adjustment capacitors. A vibration-type actuator 47 is made up of 10 units each made up of these vibrators, matching adjustment capacitors, and transformers connected in series.

Reference numeral 40 indicates a rectangular voltage generating unit that outputs a two-phase pulse signal. The rectangular voltage generating unit 40 applies a drive voltage to the vibration-type actuator 47 via waveform shaping units 11, 39 each made up of a series circuit of an inductor and a capacitor. Reference numerals 41 and 42 indicate resistors to respectively measure two-phase currents flowing through the vibration-type actuator 47. The resistors 41, 42 each detect a voltage proportional to a vibration speed of each of the vibrators 36, 37 ... 38.

Reference numeral 24 indicates an amplitude detecting unit that outputs the amplitude (vibration amplitude) Amp(1) of a fundamental, the amplitude Amp(2) of a second-order harmonic, and the amplitude Amp(3) of a third-order harmonic of a signal obtained by adding currents respectively detected by the resistors 41, 42. The amplitude (vibration amplitude) Amp(1) of the fundamental indicates the vibration amplitude of the upthrust vibration mode of each of the vibrators 36, 37 ... 38 and is input to the CPU 15. The CPU 15 determines a position command, a pulse width command, and a frequency command in accordance with a position command from the command unit (not shown) and the amplitude (vibration amplitude) Amp(1) of the fundamental and the amplitude Amp(3) of the third-order harmonic from the amplitude detecting unit 24 and outputs the position command, the pulse width command, and the frequency command. The pulse width command and the frequency command are input to the rectangular voltage generating unit 40 to set the frequency and pulse width of each of the two-phase pulse signals to be output. The operation of the CPU 15 will be described in detail later. Reference numeral 27 indicates a known linear encoder to detect the position of the contact body 50. Reference numeral 28 is a position comparing unit that outputs a difference between the position command from the CPU 15 and the position signal to be output by the linear encoder 27. Reference numeral 29 indicates a position control unit that outputs a phase difference command to the rectangular voltage generating unit 40 according to the output of the position comparing unit 28. The position control unit controls the moving direction and speed of the contact body 50 by setting a phase difference between the two-phase pulse signals.

Figure 46:
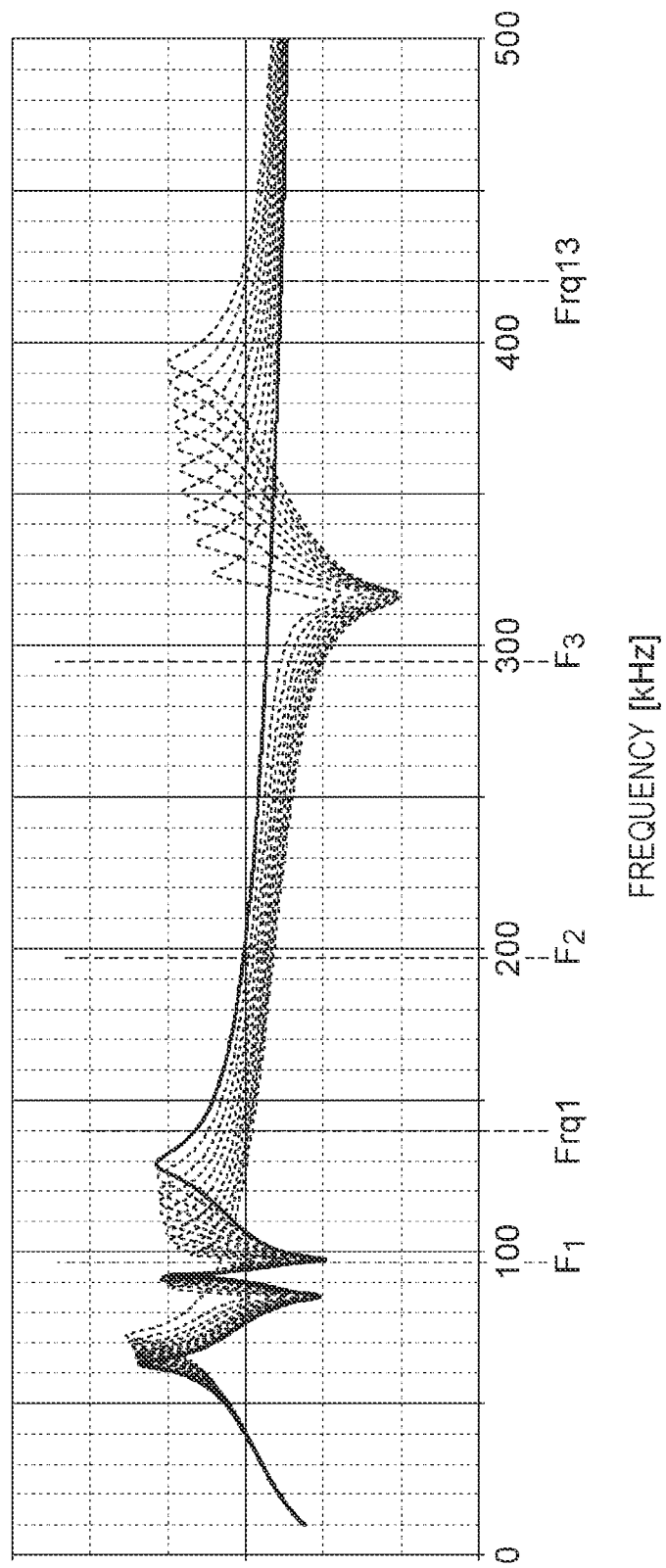
FIG. 46 is a graph that shows a first example of a change in the frequency characteristics of an inflow current amplitude in the event of a break according to the seventh embodiment.

FIG. 46 is a graph that shows a first example of the frequency characteristics of a current flowing into the vibration-type actuator 47 in the event of a break in the vibrators of the vibration-type actuator 47 of FIG. 45. The amplitude of an inflow current is measured by sweeping frequency on the assumption that the rectangular voltage generating unit 40 outputs a sinusoidal wave. The solid line represents that there is no break, the dashed line represents that one of the vibrators has a break, the alternate long and short dashed line represents that two of the vibrators each have a break, and the dotted line represents that all the vibrators each have a break. $F_1$ is a frequency around the frequency of the valley of a current amplitude, and, when a pulse signal is generated with the frequency $F_1$, the frequency of a second-order harmonic is $F_2$ and the frequency of a third-order harmonic is $F_3$.

In the present embodiment, as in the case of the sixth embodiment, the frequency $F_3$ of the third-order harmonic of the pulse signal is set to a frequency slightly lower than the bottom (around 316 kHz) of the valley of the resonant characteristic that occurs in the event of a break. Although the operation of the CPU 15 can also determine whether there is a break with the operation of FIG. 44 as in the case of the sixth embodiment, an example in which the number of breaks is detected will be described in the present embodiment.

Figure 47:
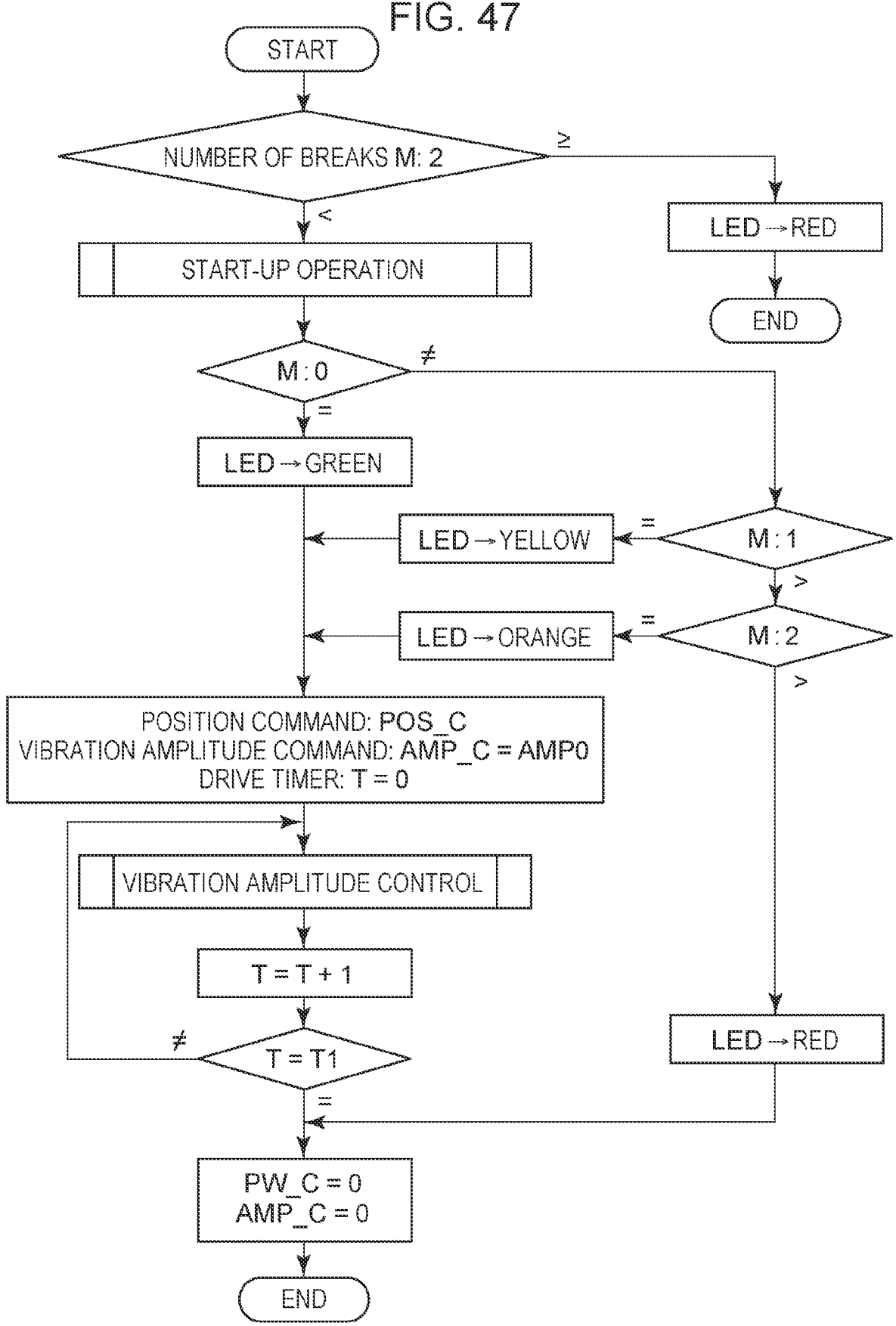
FIG. 47 is a flowchart that shows an operation example of the CPU 15 according to the seventh embodiment.

FIG. 47 is a flowchart that shows the operation of the CPU 15 according to the seventh embodiment. FIG. 47 is a flowchart that shows an example of the operation of the CPU 15 that executes a different drive sequence of the vibration-type actuator 47 depending on the result of a break. The flowchart shows the sequence of position control operation of the contact body 50. A different operation sequence is selected depending on the number of breaks (M). Hereinafter, the operation sequences will be described by using the flowchart. The position control operation starts when a new position command POS_C is input from the command unit (not shown). First, the number of breaks M occurred in the vibrators so far is checked. When the number of breaks M is two or more, a break status indicator LED turns on in red, and the position control operation is ended. When the number of breaks M is smaller than or equal to one, the start-up operation of the vibration-type actuator 47 is performed. In the start-up operation, a pulse width command PW_C is given to the rectangular voltage generating unit 40 to sweep the frequency in a predetermined frequency range with a predetermined pulse width, and the number of breaks M is determined. When the number of breaks M is zero, the break status indicator LED turns on in green; when the number of breaks M is one, the break status indicator LED turns on in yellow; when the number of breaks M is two, the break status indicator LED turns on in orange, and the position control operation is performed. When the number of breaks M is more than two, the break status indicator LED turns on in red, the pulse width command PW_C is set to zero, and the vibration amplitude command AMP_C is also set to zero, after which the position control operation is ended.

If the position control operation does not end up to here, the position command POS_C is set, the amplitude command AMP_C is set to a predetermined amplitude AMP0, the drive timer T is initialized to zero, and the position control operation is started. The CPU 15 executes vibration amplitude control in a set period of time (T1) during the position control operation. The value of T1 is allowed to be set according to a moving distance based on the position command. In the vibration amplitude control routine, the frequency of the pulse signal is controlled in accordance with a result of comparison between the amplitude command AMP_C and the amplitude (vibration amplitude) Amp(1) of the fundamental. When the amplitude command AMP_C is larger, the frequency Frq is decreased to a low-frequency side by a predetermined frequency; otherwise, the frequency Frq is increased to a high-frequency side by a predetermined frequency. Thus, the amplitude (vibration amplitude) Amp(1) of the fundamental is kept constant. Then, the vibration amplitude control is repeated until the drive timer T becomes T1. When the drive timer T becomes T1, the pulse width command PW_C is set to zero, the vibration amplitude command AMP_C is also set to zero, and the position control operation is ended.

A vibration-type actuator in which a plurality of vibrator units is connected in series as in the case of the vibration-type actuator 47 may continue to be driven even when some of the vibrators have a break, so the vibration-type actuator can be continued depending on an application. Even when the number of breaks is small, damage accumulates in a peripheral mechanism if the vibration-type actuator continues to be driven. For this reason, even when the vibration-type actuator continues to be driven, measures, such as prohibiting driving may be taken if an accumulated drive time becomes longer than or equal to a certain time.

Figure 48A:
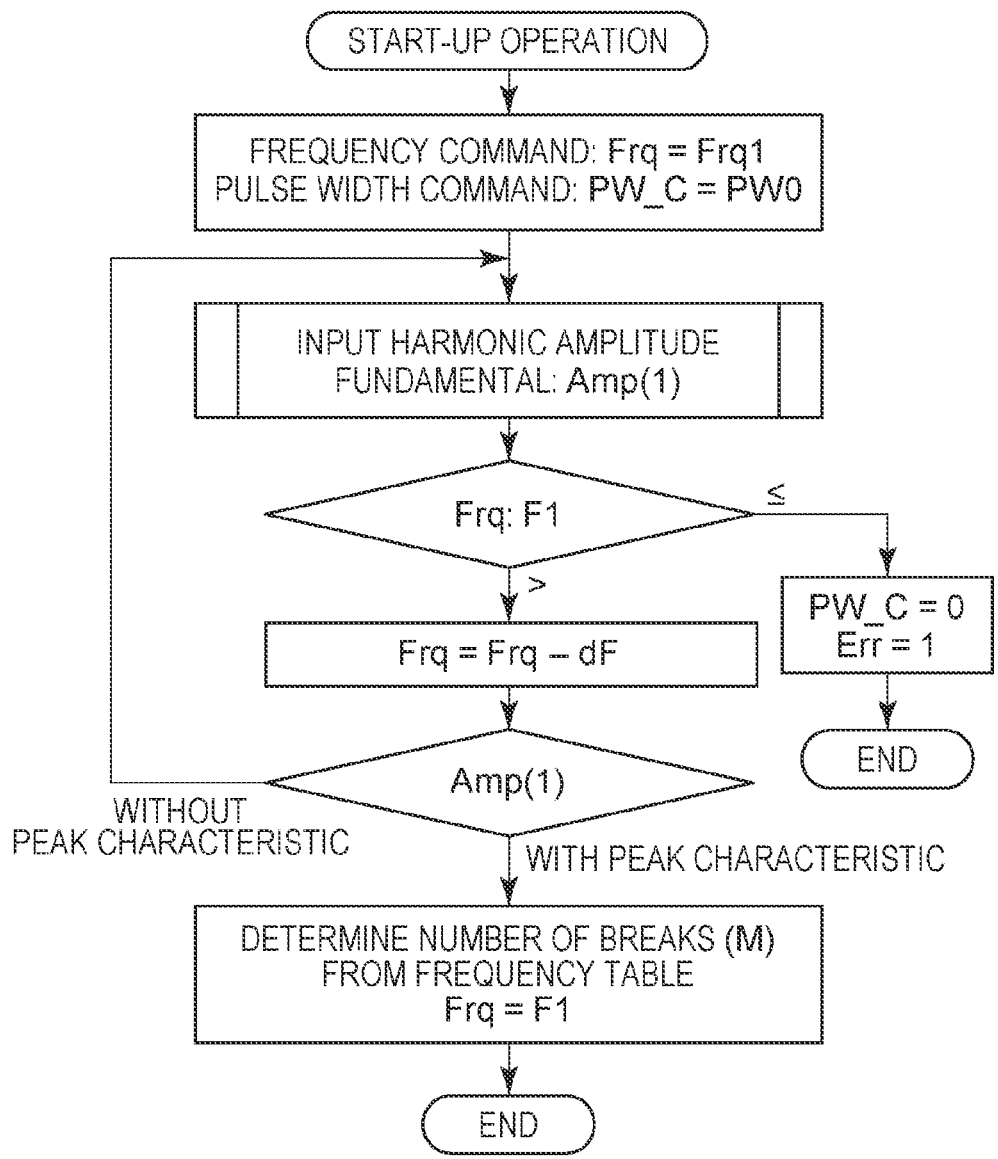
FIG. 48A is a flowchart that shows first and second examples of start-up operation of the CPU 15 according to the seventh embodiment.
Figure 48B:
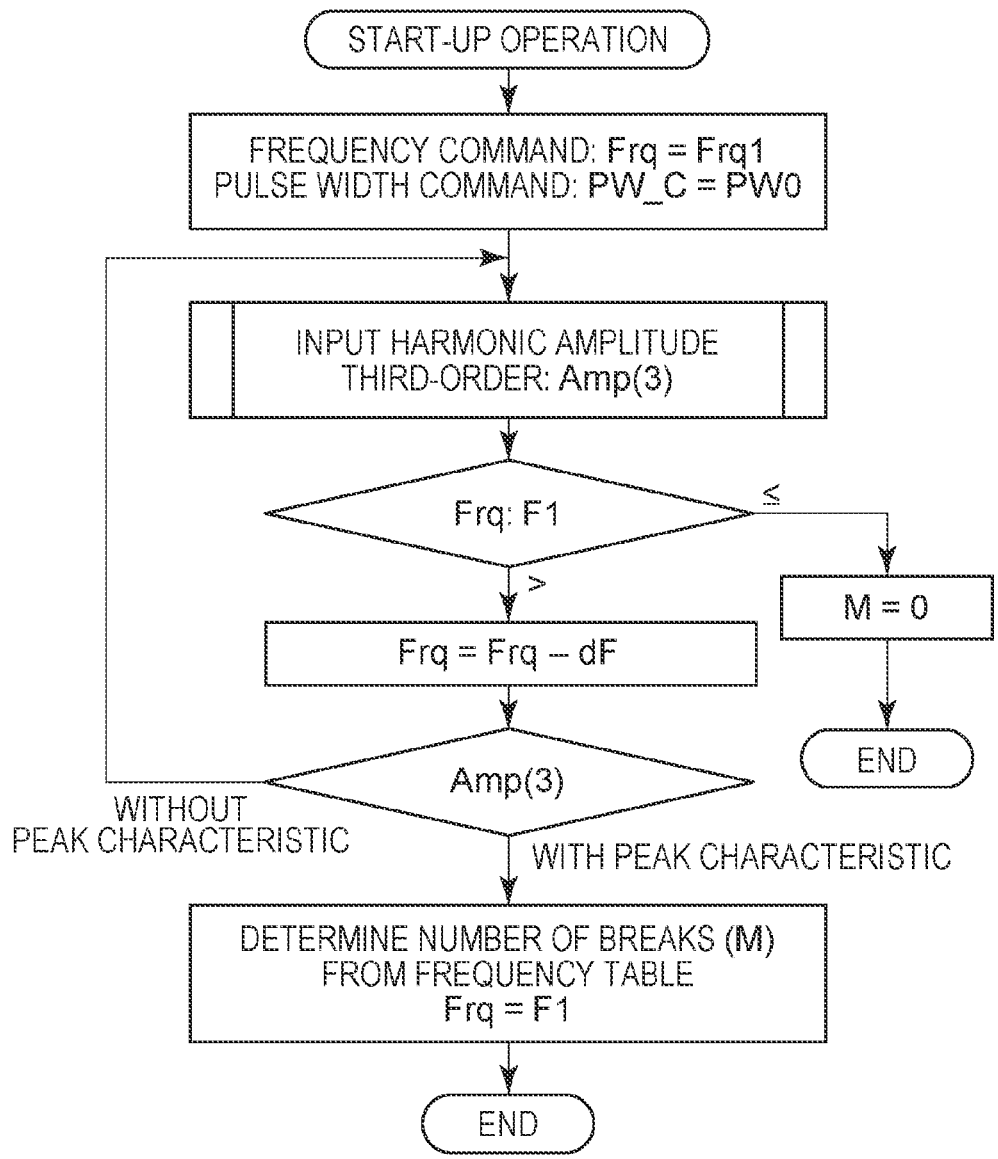
FIG. 48B is a flowchart that shows the first and second examples of start-up operation of the CPU 15 according to the seventh embodiment.

FIGS. 48A and 48B respectively show first and second examples of a flowchart of the start-up operation of the CPU 15 according to the seventh embodiment. FIG. 48A shows a case where the number of breaks is detected by using the amplitude (vibration amplitude) Amp(1) of the fundamental of a pulse signal. FIG. 48B shows a case where the number of breaks is detected by using the amplitude Amp(3) of the third-order harmonic of the pulse signal. Hereinafter, the operations will be described while being compared with each other.

First, in any one of the operations of FIGS. 48A and 48B, the frequency command Frq is set to a frequency Frq1 higher than a frequency (around 98 kHz) around the frequency of the valley of the current amplitude and higher than a peak frequency (around 130 kHz) when there is no break. The pulse width command PW_C is set to PW0. PW0 is a value by which the rectangular voltage generating unit 40 outputs a pulse signal with a duty cycle of 50%. When a pulse width is set, the rectangular voltage generating unit 40 outputs a pulse signal.

Determination of the number of breaks is repeatedly performed until the frequency becomes $F_1$ by sweeping the frequency command Frq from a high-frequency side (Frq1) to a low-frequency side. During then, for sweeping to detect the amplitude of a third-order harmonic, the frequency is swept from a frequency Frq13 that is three times the frequency Frq1 toward the frequency $F_3$ of a third-order harmonic of the pulse signal.

First, current amplitudes each used to detect the number of breaks M are input. Then, the frequency is swept until a peak characteristic (the vertex of a peak of amplitude characteristics of FIG. 46) is detected from the intended current amplitude used to detect the number of breaks M while the frequency is being swept. When a peak characteristic is detected from the amplitude (vibration amplitude) Amp(1) of the fundamental in FIG. 48A or when a peak characteristic is detected from the amplitude (vibration amplitude) Amp(3) of the third-order harmonic in FIG. 48B, the number of breaks M is determined by using the table that shows the relationship between the frequency of a peak characteristic and the number of breaks M. When the number of breaks M is determined, determination of the number of breaks is ended, the frequency command Frq is set to the frequency $F_1$, and the routine ends. When the frequency command Frq reaches the frequency $F_1$ while the number of breaks M is not determined, it indicates in the case of FIG. 48A that the drive circuit or the vibration-type actuator 47 has a malfunction. In this case, the pulse width command PW_C is set to 0 to stop the output of the pulse signal of the rectangular voltage generating unit 40, and the error flag Err is set to 1, after which the routine is ended. In the case of FIG. 48B, when the frequency command Frq reaches the frequency $F_1$ while the number of breaks M is not determined, the number of breaks M is determined as zero, and the start-up operation is ended.

FIG. 49 is a graph that shows a second example of the frequency characteristics of a current flowing into the vibration-type actuator 47 in the event of a break in the vibrators of the vibration-type actuator 47. The amplitude of an inflow current is measured by sweeping frequency on the assumption that the rectangular voltage generating unit 40 outputs a sinusoidal wave. The solid line represents that there is no break, the dashed line represents that one of the vibrators has a break, the alternate long and short dashed line represents that two of the vibrators each have a break, and the dotted line represents that all the vibrators each have a break. $F_1$ is a frequency around the frequency of the valley of a current amplitude, and, when a pulse signal is generated with the frequency $F_1$, the frequency of a second-order harmonic is $F_2$ and the frequency of a third-order harmonic is $F_3$. In the characteristics of FIG. 46, the frequency of the bottom of the valley of the resonant characteristic that occurs in the event of a break is set to around the frequency $F_3$ of the third-order harmonic of the pulse signal; whereas, in the characteristics of FIG. 49, which differ from the characteristics of FIG. 46, the frequency is set to around the frequency $F_2$ of a second-order harmonic.

In the present example, to set the frequency of the bottom of the valley of the resonant characteristic that occurs in the event of a break to around the frequency $F_2$ of the second-order harmonic of the pulse signal, the capacitance value $C_1$ of each of the matching adjustment capacitors is set to about one-third of the damping capacity value $C_0$.

When the frequency is swept to detect the number of breaks M in a state of a pulse signal with a duty cycle of 50%, a large current flows around the peak characteristic, with the result that there is an inconvenience that the current capacity of the drive circuit should be increased. For this reason, circuit cost increases, and drive efficiency decreases. Therefore, in the present embodiment, the inconvenience is avoided by reducing the duty cycle of the pulse signal only during the start-up operation to detect the number of breaks M. When the duty cycle of the pulse width is 50%, there is almost no second-order harmonic; however, the ratio of the second-order harmonic increases when the pulse width is reduced, and determination of a break is performed by using the second-order harmonic.

Figure 50:
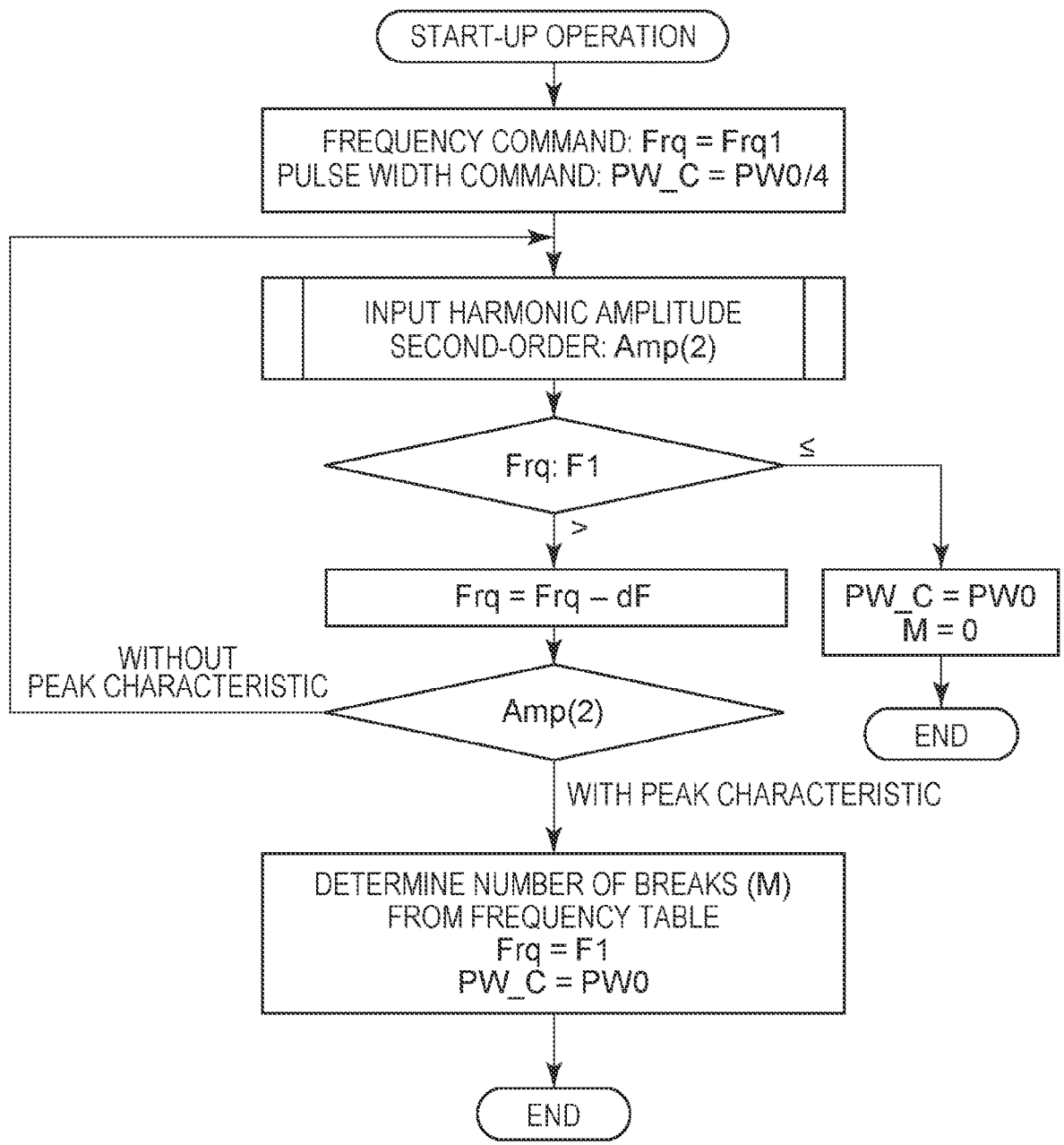
FIG. 50 is a flowchart that shows a third example of start-up operation of the CPU 15 according to the seventh embodiment.

FIG. 50 shows a third example of the flowchart of the start-up operation of the CPU 15 in the start-up operation according to the seventh embodiment.

FIG. 50 differs from FIG. 48B in that the amplitude Amp(2) of the second-order harmonic is used to determine the number of breaks and the pulse width command PW_C is set to one-fourth of PW0 during the start-up operation. Here, an example in which the amplitude Amp(2) of the second-order harmonic is used has been described. Alternatively, the number of breaks M may be determined by using the fundamental as in the case of FIG. 48A.

In the description of the fifth to seventh embodiments, the piezoelectric body is bonded to the vibrator. Alternatively, the vibrator itself may be made up of a piezoelectric body. Alternatively, the piezoelectric body may be a multilayer piezoelectric body.

A pulse signal to be output by the rectangular voltage generating unit is set to a predetermined pulse width, and a frequency is swept until an amplitude of a fundamental component of a signal of any one of phases or an electric signal obtained by adding signals of some of the phases of a one or more-phase current flowing through the vibrator unit reaches a predetermined amplitude.

Hereinafter, another embodiment will be described.

An example of an embodiment of the present invention includes a control unit that outputs a command signal, a drive unit that outputs a drive signal in accordance with the command signal, and a vibrator unit in which two or more vibrators that vibrate in accordance with the drive signal are connected. The vibration-type drive apparatus further includes a voltage detecting unit that detects an individual applied voltage of each of the vibrators, and the control unit determines a driving status of each of the vibrators in accordance with the applied voltage. A feature is that the vibration-type drive apparatus includes a voltage detecting unit that detects an individual applied voltage of each of the vibrators as the drive signal analyzing unit.

Hereinafter, the description will be made in detail with reference to the accompanying drawings.

Eighth Embodiment

Figure 51:
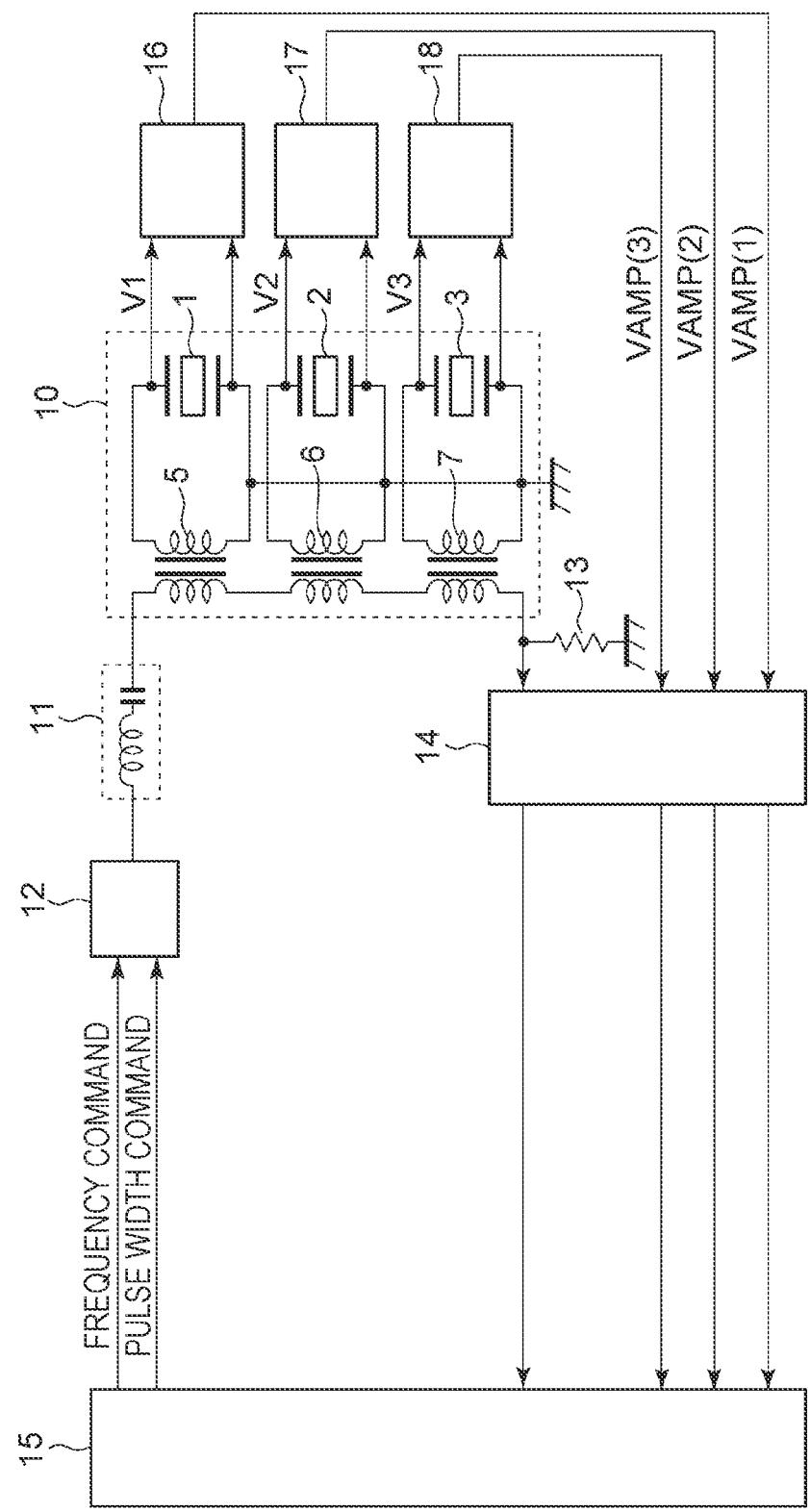
FIG. 51 is a diagram that shows a first example of a drive circuit of a vibration-type actuator according to an eighth embodiment.

FIG. 51 is a diagram that shows a first example of the drive circuit of the vibration-type actuator according to the eighth embodiment. Reference numerals 1, 2, and 3 indicate vibrators. Reference numerals 5, 6, and 7 indicate transformers of which primary sides are connected in series. Reference numeral 12 indicates a rectangular voltage generating unit that outputs a pulse signal according to a frequency command from the CPU 15 (described later). The rectangular voltage generating unit 12 applies a drive voltage to the series circuit of the transformers 5, 6, 7 via a waveform shaping unit 11 made up of a series circuit of an inductor and a capacitor. In other words, the vibrator unit in which a plurality of pairs of parallel circuits made up of a transformer and a vibrator that may be regarded as a pair of inductor and vibrator connected in parallel equivalently is connected in series is provided.

Reference numeral 13 indicates a resistor for measuring a current flowing through the primary sides of the transformers 5, 6, 7. The resistor 13 outputs a voltage substantially proportional to the vibration speed of each of the vibrators 1, 2, 3. Accurately, a vibration displacement of each vibrator is proportional to a value obtained by integrating the vibration speed with respect to time, and the amplitude of vibration speed is substantially proportional to a vibration amplitude. Therefore, in the following embodiments, the vibration amplitude of the vibration-type actuator 10 serving as the vibrator unit is controlled by controlling the amplitude of a vibration speed signal.

Figure 52:
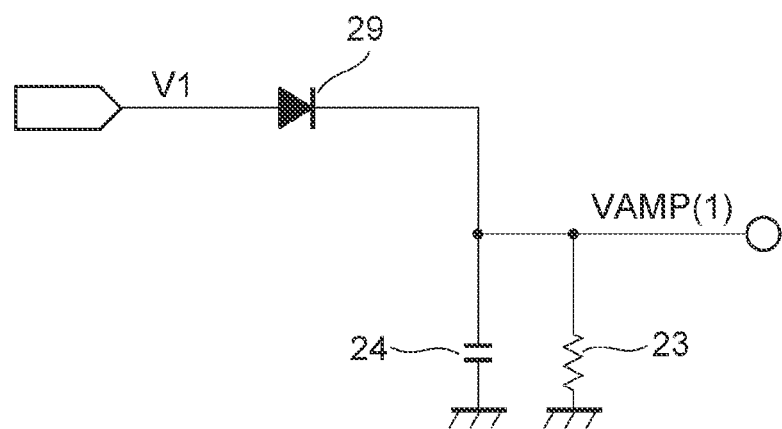
FIG. 52 is a diagram that shows a circuit example of a voltage amplitude detecting unit.

Reference numerals 16, 17, 18 indicate voltage amplitude detecting units for detecting the amplitudes of voltages respectively applied to the vibrators 1, 2, 3. Reference numeral 14 indicates an A/D converter. Reference numeral 15 indicates a known CPU. FIG. 52 shows a circuit example of each voltage amplitude detecting unit. An input voltage V1 is half-wave rectified by a diode 29 and smoothed by a resistor 23 and a capacitor 24 to obtain a voltage amplitude VAMP(1). The A/D converter 14 inputs output signals of the resistor 13 and voltage amplitude detecting units 16, 17, 18 to the CPU 15 that is a control unit. The CPU 15 detects the amplitude of the fundamental of a current signal and determines the driving status of the vibration-type actuator 10 in accordance with these pieces of input information. Then, a frequency command and a pulse width command that are command signals are output to the rectangular voltage generating unit 12 that is the drive unit to control the operation of the vibration-type actuator 10.

Here, a configuration using the above-described cylindrical shaft may be used as an example of the vibration-type actuator according to the present embodiment.

Figure 53:
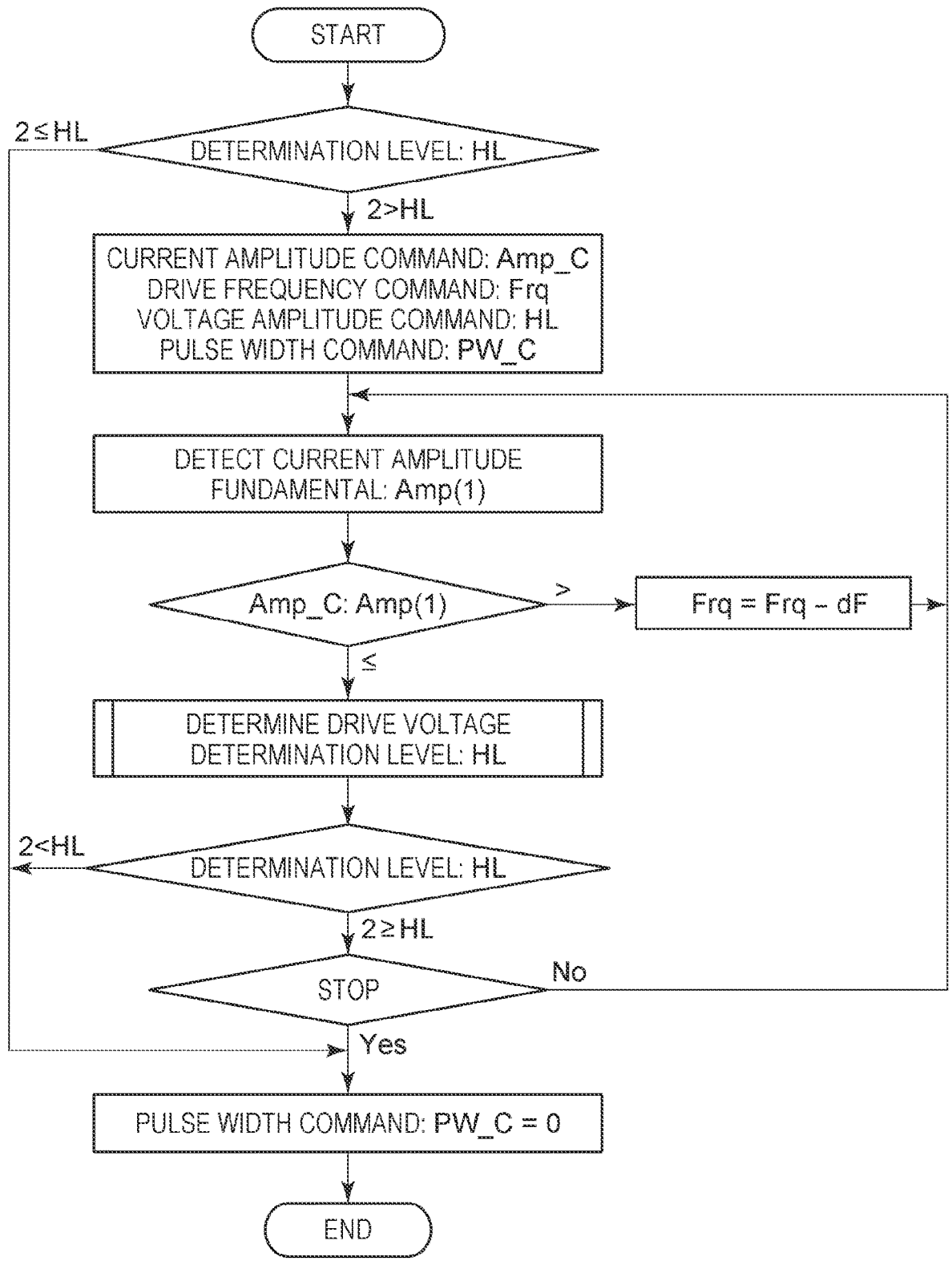
FIG. 53 is a flowchart that shows an operation example of the CPU 15 according to the eighth embodiment.
Figure 54:
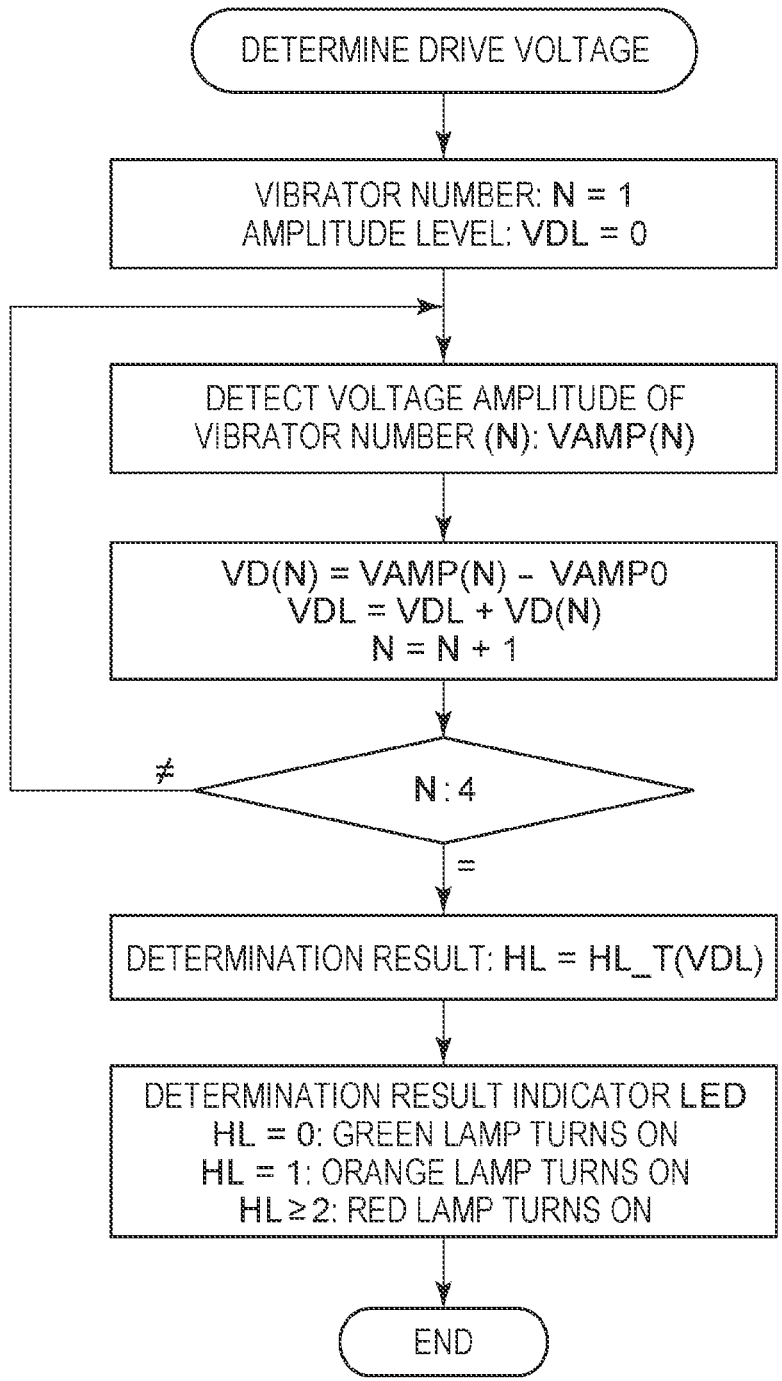
FIG. 54 is a flowchart that shows a drive voltage determining operation according to the eighth embodiment.

Next, the operation of the CPU 15 will be described with reference to the flowcharts of FIGS. 53 and 54. Initially, the operation of FIG. 53 will be described. First, the CPU 15 checks a determination level HL as a driving status determination value during last operation. When the last determination level HL is lower than 2, a current amplitude command Amp_C, a pulse width command PW_C, and a drive frequency command Frq determined in advance are set to initial values. When the determination level HL is higher than or equal to 2, the pulse width command PW_C is set to 0, and the routine ends.

The pulse width command PW_C and the frequency command Frq are transmitted to the rectangular voltage generating unit 12, a pulse signal that is a drive signal is output from the rectangular voltage generating unit 12, and a drive voltage is applied to the vibration-type actuator 10 that is the vibrator unit. In this way, the vibration-type actuator 10 serving as the vibrator unit is made up of two or more vibrators connected, and the vibrators are configured to be respectively driven by a common command signal that the CPU 15 serving as the control unit issues.

Subsequently, a current amplitude is detected, and the amplitude Amp(1) of the fundamental component of a current is detected by filtering. Then, the drive frequency command Frq is swept at a constant rate dF in a low-frequency direction until the amplitude Amp(1) of the fundamental exceeds the current amplitude command Amp_C. When the amplitude Amp(1) of the fundamental exceeds the current amplitude command Amp_C, a drive voltage determination process is executed in a drive voltage determination routine, and a drive voltage determination level HL as a driving status determination value is obtained. The operation of the drive voltage determination process will be described later. When the drive voltage determination level HL is higher than 2, the pulse width command PW_C is set to 0, and the routine ends. When the drive voltage determination level HL is lower than or equal to 2, the operation is continued, and drive voltage determination is repeated while the drive frequency Frq is controlled until a stop command is input from the command unit (not shown). When the stop command is input from the command unit (not shown), the pulse width command PW_C is set to 0, and the operation is ended. Next, the drive voltage determination operation will be described with reference to FIG. 54. In the present embodiment, applied voltage amplitudes of the vibrators 1, 2, 3 are sequentially detected, voltage amplitude evaluation values VD(N), each of which is a difference between a voltage amplitude VAMP(N) (N is an integer of 1 to 3) and a predetermined value VAMP0, and drive voltage determination is performed by analyzing the values of VD(N). A method of analyzing the voltage amplitude evaluation values VD(N) includes, for example, a method in which an amplitude level VDL is obtained from summation of VD(N) with N=1 to 3 and then a determination level HL corresponding to VDL is determined in accordance with a predetermined conversion table HL T. As the magnitude of the summation increases, the determination level HL increases. As another example, there is a method in which the voltage amplitude evaluation values VD(N) with N=1 to 3 are individually compared with a predetermined value and the number of the voltage amplitude evaluation values VD(N) that are greater than the predetermined value is obtained as a determination level HL. In the above example, the applied voltage amplitude VAMP(N) is compared with the predetermined value VAMP0 and, alternatively, may be compared with VAMP0 (N) determined vibrator by vibrator. When, for example, a value obtained by multiplying an initial voltage amplitude by a certain magnification is set as VAMP(N), degradation can be determined in accordance with a temporal change in applied voltage. Alternatively, degradation (deterioration) can be determined in accordance with a degree of variations in the applied voltage amplitude VAMP(N). For example, a difference between a maximum value and a minimum value, a standard deviation, a variance, or the like of VAMP(N) is calculated, and a determination level HL as a driving status determination value can be determined according to an amount by which these values exceed a certain value.

When the determination level HL is determined, a drive voltage determination result indicator LED is turned on in different color according to the determination level. When the determination level HL is 0, the drive voltage determination result indicator LED turns on in green. When HL is 1, the drive voltage determination result indicator LED turns on in orange. When HL is 2 or higher, the drive voltage determination result indicator LED turns on in red.

Figure 55:
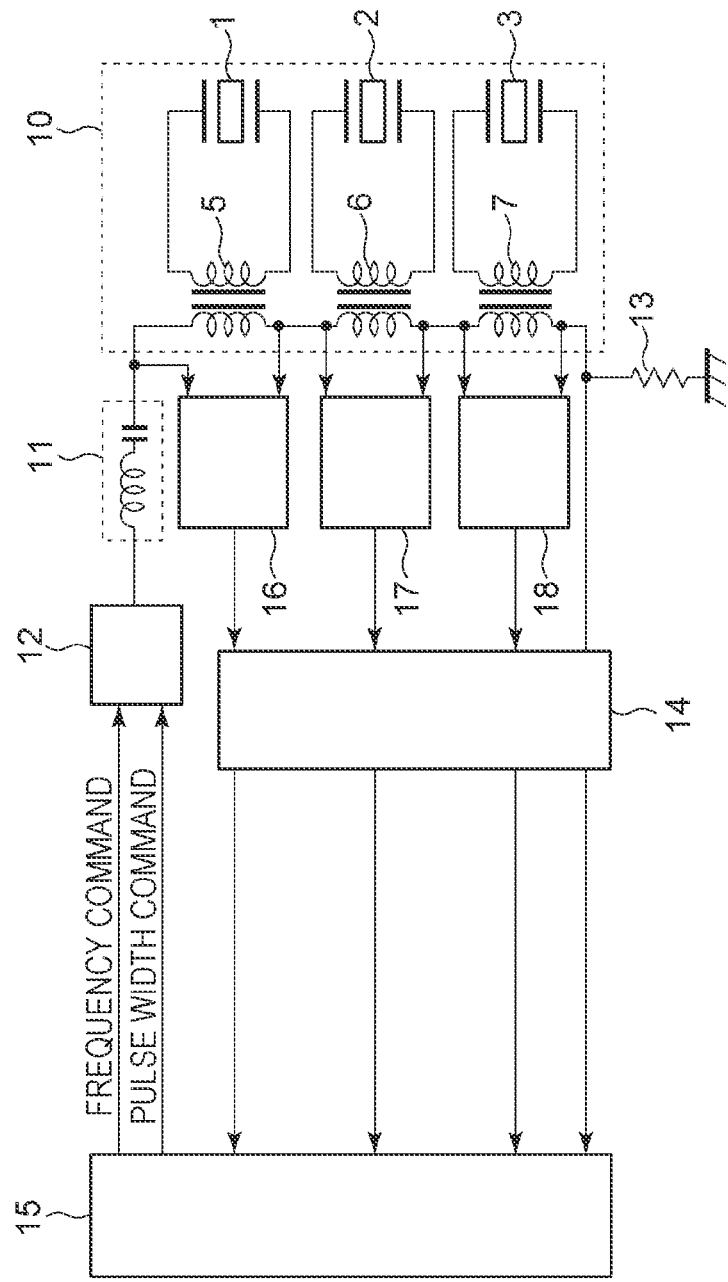
FIG. 55 is a diagram that shows a second example of the drive circuit of the vibration-type actuator according to the eighth embodiment.

FIG. 55 is a diagram that shows a second example of the drive circuit of the vibration-type actuator according to the present embodiment. In the circuit of FIG. 51, the voltage amplitude detecting units 16, 17, 18, respectively, detect the applied voltage amplitudes of the vibrators 1, 2, 3; whereas, in the circuit of FIG. 55, the voltage amplitude detecting units 16, 17, 18, respectively, detect the voltage amplitudes of the primary sides of the transformers 5, 6, 7. The amplitudes of the applied voltages to the vibrators 1, 2, 3 are estimated by multiplying the outputs of the voltage amplitude detecting units 16, 17, 18 by the turns ratios of the transformers 5, 6, 7. The operation of the CPU 15 is the same as the operation of the above description except that the estimated values are used for the amplitudes of the applied voltages, so the description is omitted.

Figure 56:
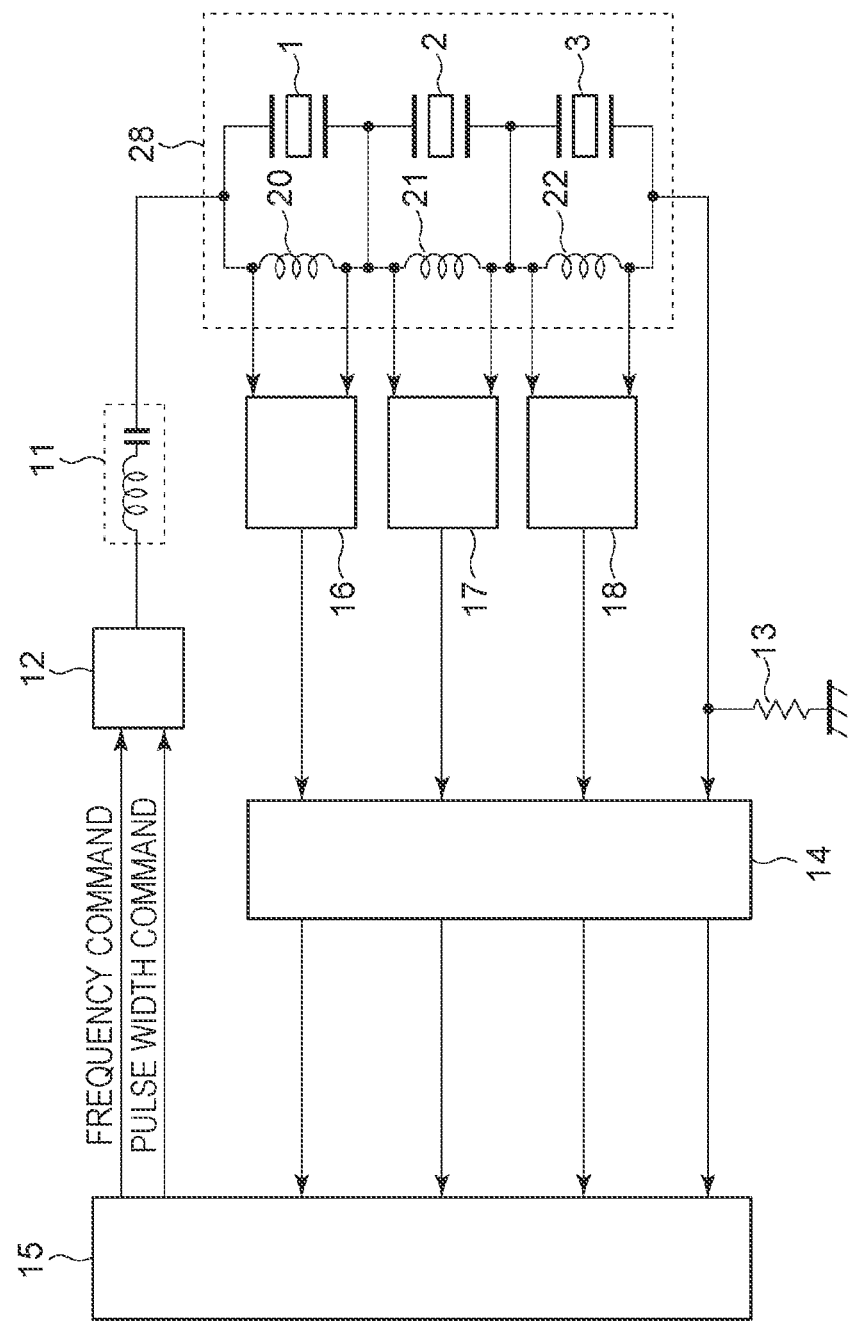
FIG. 56 is a diagram that shows a third example of the drive circuit of the vibration-type actuator according to the eighth embodiment.

FIG. 56 is a diagram that shows a third example of the drive circuit of the vibration-type actuator according to the present embodiment. In the circuit of FIG. 51, the vibrators 1, 2, 3, respectively, are connected to the secondary sides of the transformers. In the circuit of FIG. 56, the vibrators 1, 2, 3 are connected in series, inductors 20, 21, 22, respectively, are connected in parallel with the vibrators 1, 2, 3 to make up a vibration-type actuator 28. Then, an output signal of the rectangular voltage generating unit 12 is applied to the series circuit of the vibrators 1, 2, 3 via the waveform shaping unit 11. The voltage amplitude detecting units 16, 17, 18, respectively, are connected with the vibrators 1, 2, 3, and the amplitude of the applied voltage of each vibrator is input to the CPU 15 via the A/D converter 14 as in the case of the above-described first and second circuits. The operation of the CPU 15 and the configuration and operation of the other circuits are the same as those of the above description, so the description is omitted.

In the above-described examples, the number of the phases of the drive voltage of the vibration-type actuator is one. The same applies to a vibration-type actuator that is driven by multi-phase drive voltages. There are a method of obtaining a determination level HL for voltage amplitude phase by phase and a method of obtaining a determination level HL by collectively using the voltage amplitudes of all the phases.

In the present embodiment, three vibrators are connected in series. Even when the number of vibrators is two or three or more, a similar configuration to that of the above description is possible by providing a voltage amplitude detecting unit that detects the amplitude of an applied voltage to each individual vibrator.

Ninth Embodiment

Figure 57:
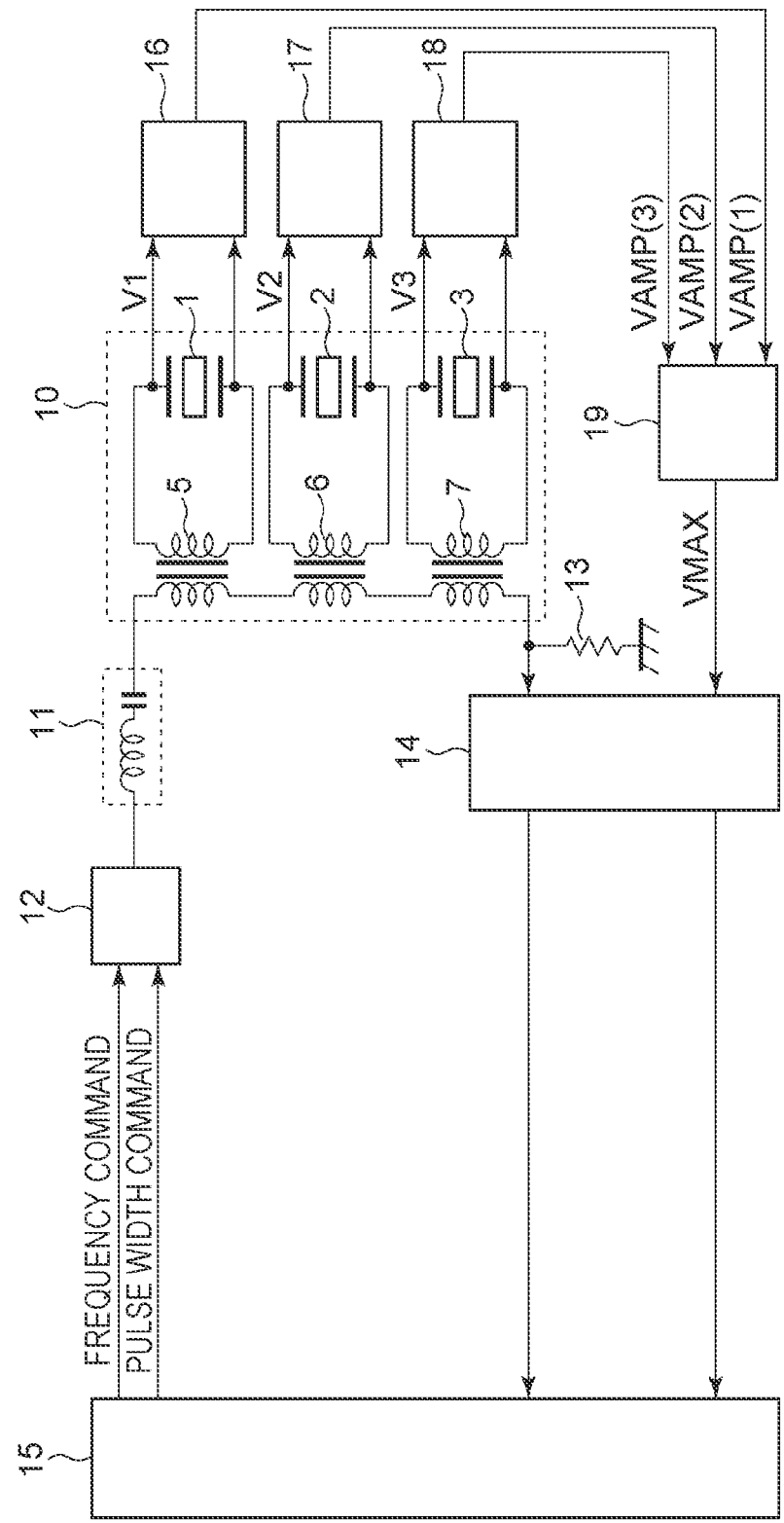
FIG. 57 is a diagram that shows a first example of a drive circuit of a vibration-type actuator according to a ninth embodiment.
Figure 58:
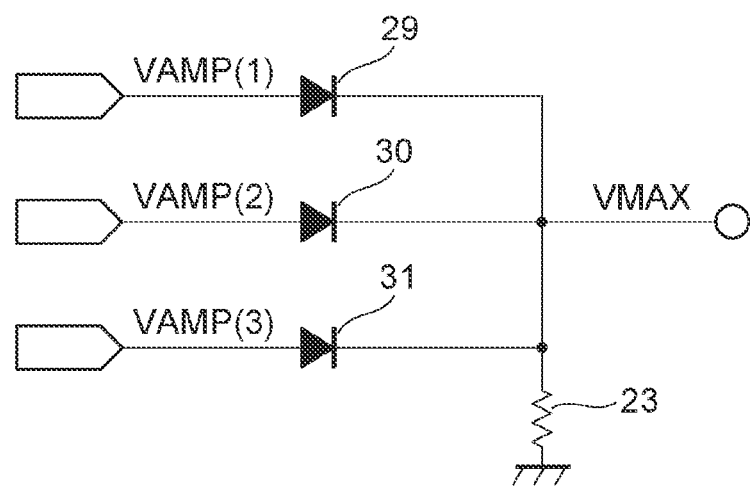
FIG. 58 is a diagram that shows a circuit example of a maximum value detecting unit.

FIG. 57 is a diagram that shows a first example of a drive circuit of a vibration-type actuator according to a ninth embodiment. In the eighth embodiment, the outputs of the voltage amplitude detecting units 16, 17, 18 each are input to the CPU 15 by the A/D converter 14; whereas, in the present embodiment, the maximum values of the outputs of the voltage amplitude detecting units 16, 17, 18 are detected and input to the A/D converter 14. Reference numeral 19 indicates a maximum value detecting unit and outputs the maximum values of the output voltages of the voltage amplitude detecting units 16, 17, 18. FIG. 58 is a diagram that shows a circuit example of the maximum value detecting unit. Reference numerals 29, 30, and 31 indicate diodes, and all the cathodes of the diodes 29, 30, 31 are connected and connected to a ground by the resistor 23, and a value according to a maximum value of the output voltages of the voltage amplitude detecting units 16, 17, 18 is output to a terminal voltage of the resistor 23.

Figure 59:
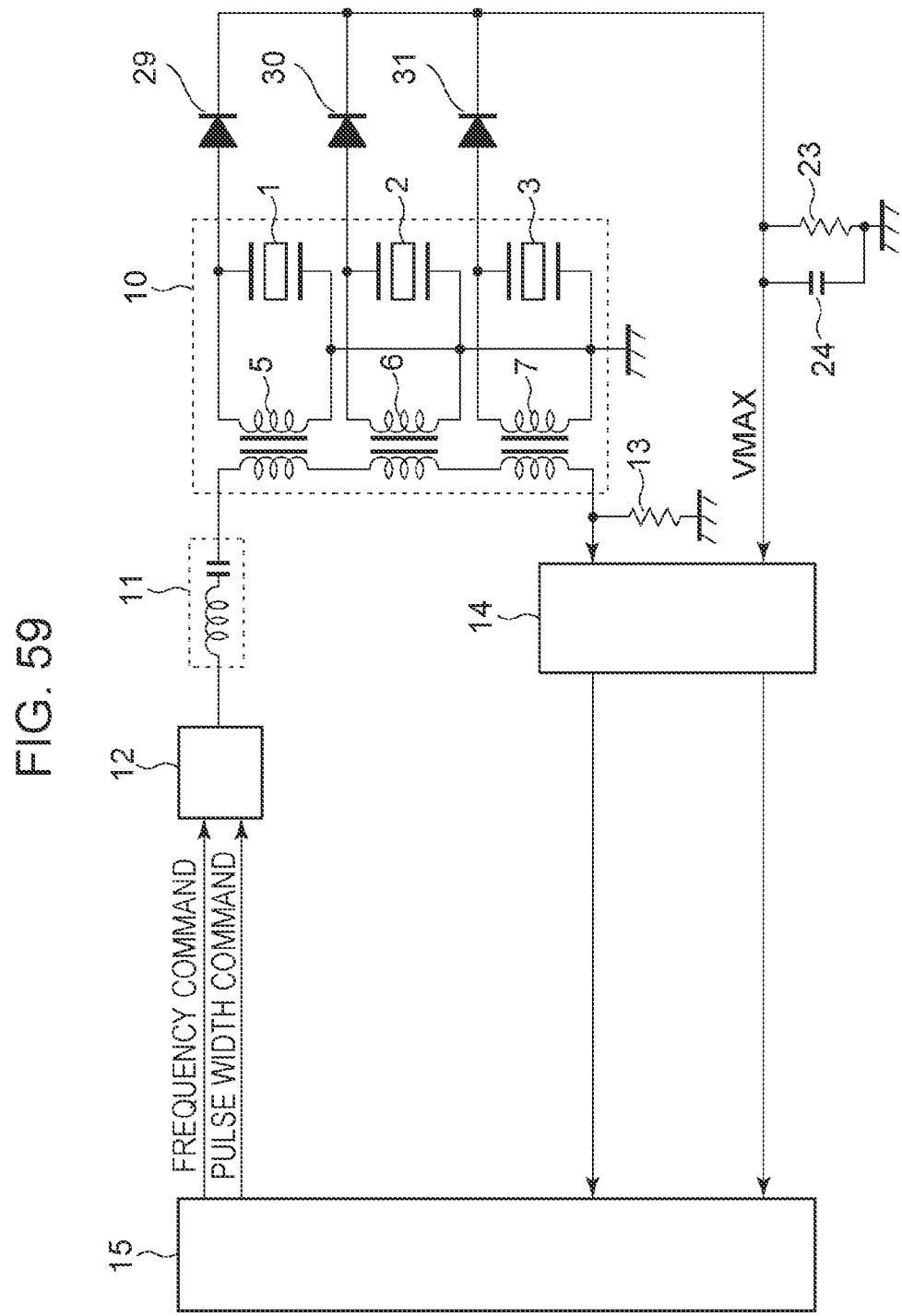
FIG. 59 is a diagram that shows a second example of the drive circuit of the vibration-type actuator according to the ninth embodiment.

FIG. 59 is a diagram that shows a second example of the drive circuit of the vibration-type actuator according to the ninth embodiment. In the example of FIG. 57, the diodes 29, 30, 31, respectively, connected subsequently to the voltage amplitude detecting units; whereas, in the example of FIG. 59, the diodes 29, 30, 31, respectively, are connected directly to the vibrators 1, 2, 3. One terminals of the vibrators 1, 2, 3 are connected to a ground, and all the cathodes of the diodes 29, 30, 31 are connected to a parallel circuit of the resistor 23 and the capacitor 24. With connection in this way, the maximum value VMAX of the applied voltages of the vibrators 1, 2, 3 is output to both ends of the resistor 23.

Figure 60:
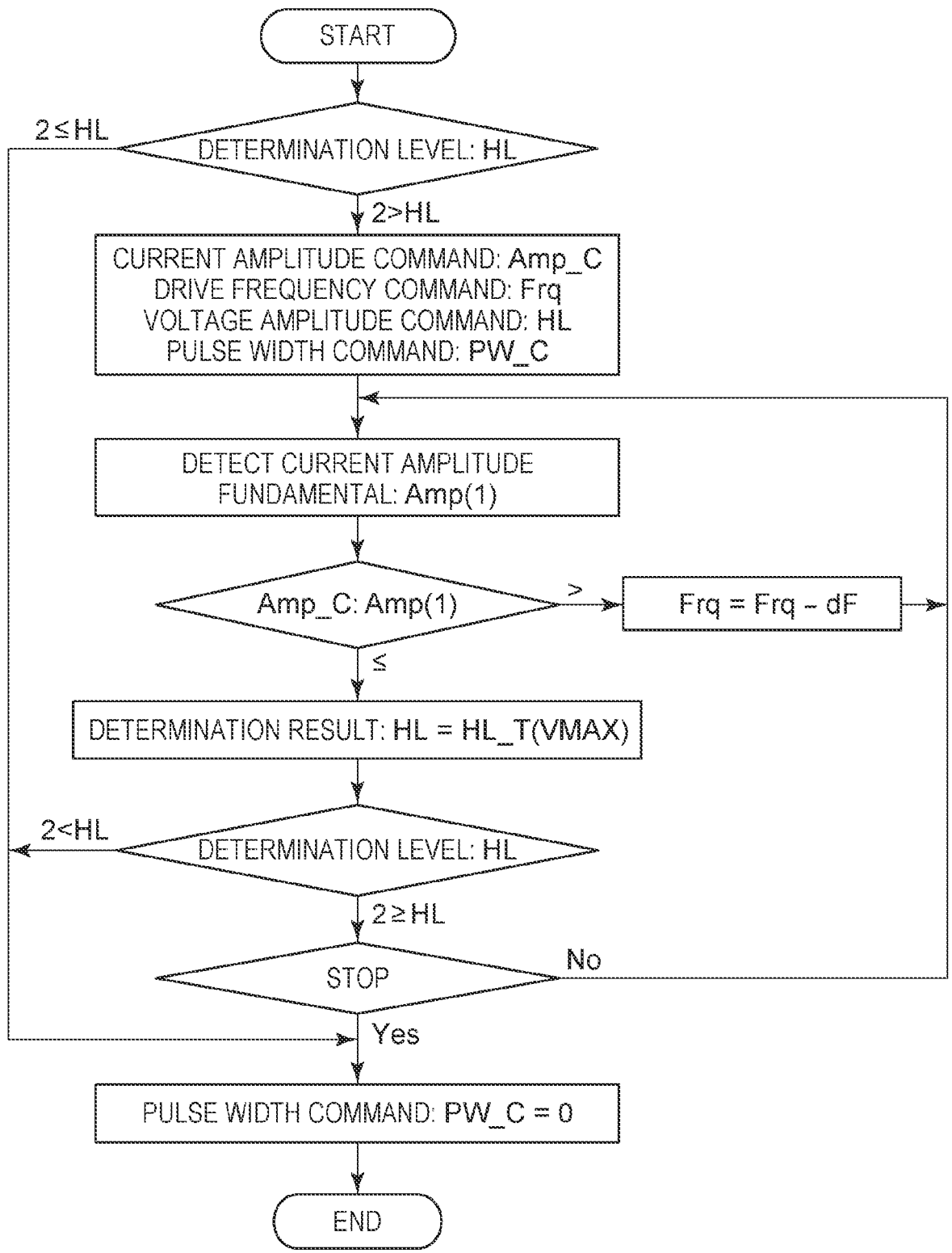
FIG. 60 is a flowchart that shows an operation example of the CPU 15 according to the ninth embodiment.

FIG. 60 is a flowchart that shows the operation of the CPU 15 according to the present embodiment. The present embodiment is basically the same as the eighth embodiment, but the drive voltage determination operation is different. In the eighth embodiment, the CPU 15 detects each of the voltage amplitudes of the vibrators 1, 2, 3 and then calculates a maximum value; whereas, in the present embodiment, a maximum value VMAX of the applied voltages of the vibrators 1, 2, 3 is directly input by the A/D converter 14. The conversion table HL T is used for a determination level HL, and a determination level HL is calculated for the maximum value VMAX of the applied voltages. Other examples of a method of obtaining a determination level HL include a method of subtracting a predetermined value from VMAX and then multiplying the obtained value by a predetermined value and a method of determining a determination level in advance for each range of VMAX. In the circuits of FIGS. 58 and 59, the cathodes of the diodes 29, 30, 31 are connected. Alternatively, the orientations of the diodes may be inverted, and the anodes of the diodes may be connected. In this case, a minimum value of the applied voltages of the vibrators 1, 2, 3 is output to the resistor 23. This value is substantially a value obtained by inverting the sign of the maximum value VMAX of the applied voltages, so determination as in the case of the above description can be performed when the sign of the value input through the A/D converter 14 is inverted.

Figure 61:
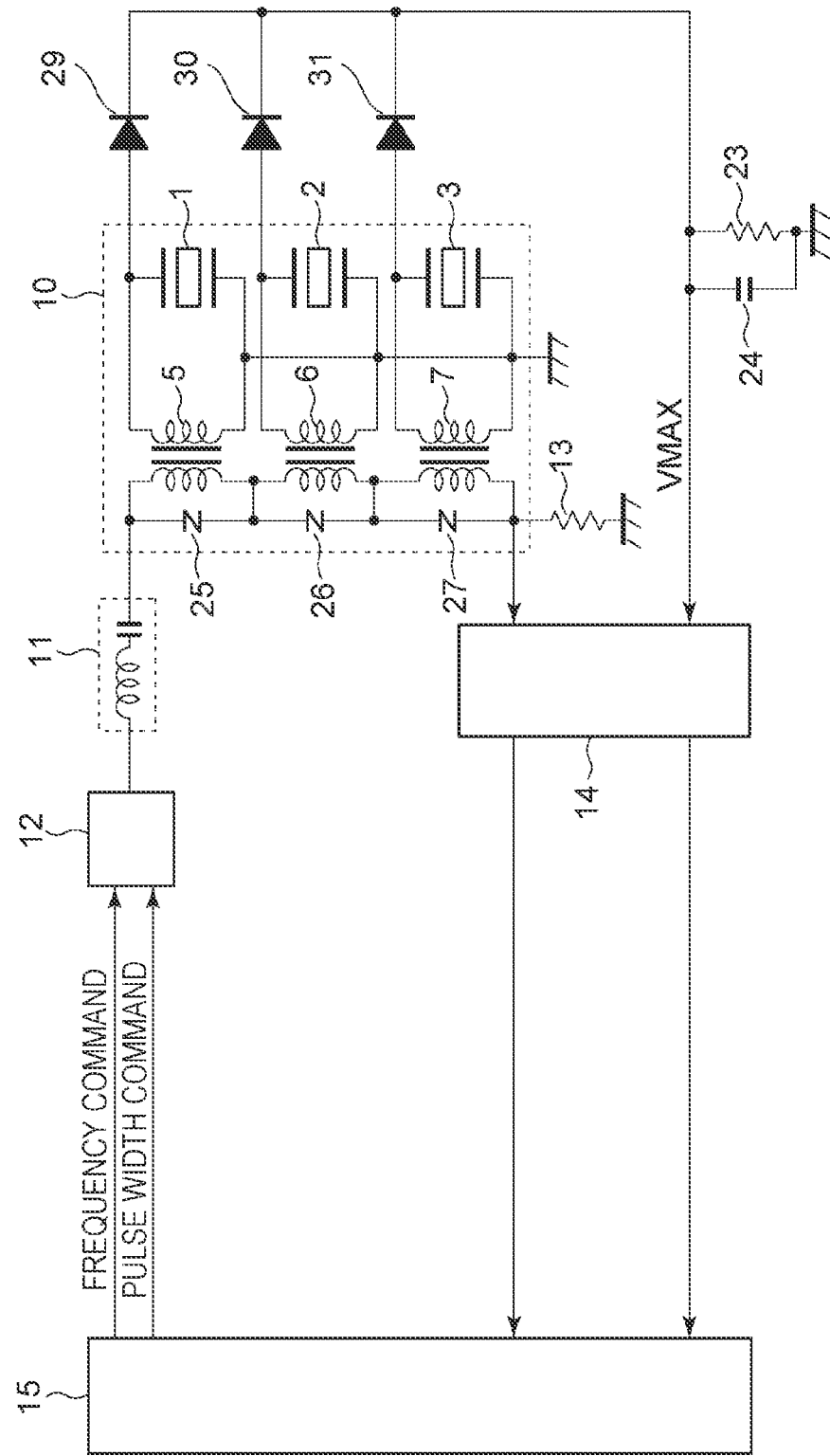
FIG. 61 is a diagram that shows a third example of the drive circuit of the vibration-type actuator according to the ninth embodiment.

FIG. 61 is a diagram that shows a third example of the drive circuit according to the ninth embodiment. A difference from the above-described examples is that voltage limiting elements, respectively, are connected to the primary sides of the transformers 5, 6, 7. Examples of the voltage limiting element include a Zener diode and a varistor. When Zener diodes are used, the orientations of the Zener diodes are inverted and connected in series since the applied voltages are alternating current voltages. Reference numerals 25, 26, 27 indicate varistors. Although the voltage limiting elements, respectively, are connected to the primary sides of the transformers 5, 6, 7. Alternatively, voltage limiting elements, such as varistors, respectively, may be connected in parallel with the secondary sides of the transformers 5, 6, 7.

The above-described vibration-type drive apparatus is applicable to various devices.

Embodiments of the present invention are not limited to the above-described embodiments. Various changes or modifications are applicable without departing from the spirit and scope of the present invention. Therefore, the following claims are attached to show the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present invention, it is possible to, in a vibration-type drive apparatus including a vibrator unit in which a plurality of vibrators is connected, detect a break in the vibrators in normal driving. Even when there occurs a break in normal driving, drive control according to a situation of the break can be immediately performed, so it is possible to reduce the influence of a break on peripheral mechanisms and users.

The invention claimed is:

1. A vibration-type drive apparatus comprising:
   a control unit that outputs a command signal;
   a drive unit that outputs a drive signal in accordance with the command signal;
   a vibrator unit made up of two or more vibrators that vibrate in accordance with the drive signal;
   a drive signal analyzing unit that analyzes the drive signal and outputs an analysis result; and
   a determining unit that determines whether there is a break in wiring lines respectively coupled to the vibrators in accordance with the analysis result.

2. The vibration-type drive apparatus according to claim 1, wherein
   the vibrator unit of which the vibrators are respectively connected in parallel with secondary sides of a plurality of transformers of which primary sides are connected in series is disposed, and the primary sides of the plurality of transformers are configured to be applied with the drive signal, and
   the drive unit includes a rectangular voltage generating unit that generates a pulse signal having a predetermined voltage and frequency, and a waveform shaping unit inserted between the rectangular voltage generating unit and the vibrator unit.

3. The vibration-type drive apparatus according to claim 1, wherein
   the vibrator unit is configured such that a plurality of pairs of parallel-connected inductor and vibrator is connected in series and the drive signal is applied to both ends of the plurality of pairs, and
   the drive unit includes a rectangular voltage generating unit that generates a pulse signal having a predetermined voltage and frequency, and a waveform shaping unit inserted between the rectangular voltage generating unit and the vibrator unit.

4. The vibration-type drive apparatus according to claim 2, wherein the drive signal analyzing unit analyzes a waveform of an output voltage or output current of the waveform shaping unit and detects a value according to any one of a form factor, a harmonic distortion factor, a difference between an effective value and an absolute value of a mean value, and a harmonic amplitude.

5. The vibration-type drive apparatus according to claim 2, wherein a frequency of a harmonic of the drive signal is configured to be near a lowest point of a valley of frequency characteristics of an output voltage or output current of the waveform shaping unit in a state where the vibrators have no break.

6. The vibration-type drive apparatus according to claim 2, wherein the waveform shaping unit is an inductor or a series circuit of an inductor and a capacitor.

7. The vibration-type drive apparatus according to claim 3, wherein a capacitor is further connected in parallel with the inductor.

8. The vibration-type drive apparatus according to claim 2, wherein a capacitor is connected in parallel with the secondary side of each of the transformers.

9. The vibration-type drive apparatus according to claim 1, wherein the determining unit determines whether there is a break by using a predetermined threshold.

10. The vibration-type drive apparatus according to claim 1, wherein the determining unit determines the number of breaks in accordance with a table of an analysis result obtained according to the number of breaks in advance.

11. The vibration-type drive apparatus according to claim 1, further comprising a common contact body that contacts with the vibrator unit.

12. The vibration-type drive apparatus according to claim 11, wherein the contact body is a cylindrical shaft, and the three vibrators are disposed substantially equally on a circumference of the cylindrical shaft.

13. The vibration-type drive apparatus according to claim 11, further comprising a hollow case that accommodates the contact body and the vibrators.

14. The vibration-type drive apparatus according to claim 1, wherein each of the vibrators includes a rectangular elastic body having two protrusions, and a piezoelectric body.

15. The vibration-type drive apparatus according to claim 1, wherein
   a current detecting unit that detects a current signal flowing through the vibrator unit is provided as the drive signal analyzing unit, and
   where a current signal flowing through the vibrator unit and corresponding to a range of a drive frequency of the vibrator unit is defined as a fundamental, the control unit determines whether there is a break in wiring lines respectively coupled to the vibrators in accordance with a current signal flowing through the vibrator unit and corresponding to a harmonic of the fundamental.

16. The vibration-type drive apparatus according to claim 15, wherein
   the vibrator unit in which a capacitor and the vibrator are connected in parallel with each of the secondary sides of the plurality of transformers of which the primary sides are connected in series is provided, and the primary sides of the plurality of transformers are configured to be applied with the drive signal,
   the drive unit includes a rectangular voltage generating unit that generates a pulse signal having a predetermined voltage and frequency, and a waveform shaping unit inserted between the rectangular voltage generating unit and the vibrator unit, and the vibration-type drive apparatus sweeps a frequency of the pulse signal in a start-up operation of the vibration-type drive apparatus and detects a current signal corresponding to a harmonic of the pulse signal.

17. The vibration-type drive apparatus according to claim 15, wherein the vibrator unit in which a plurality of sets of parallel-connected inductor, capacitor, and vibrator is connected in series is provided, wherein the drive unit includes a rectangular voltage generating unit that generates a pulse signal having a predetermined voltage and frequency, and a waveform shaping unit inserted between the rectangular voltage generating unit and the vibrator unit, and the vibration-type drive apparatus sweeps a frequency of the pulse signal in a start-up operation of the vibration-type drive apparatus and detects a current signal corresponding to a harmonic of the pulse signal.

18. The vibration-type drive apparatus according to claim 15, further comprising any one of a high-pass filter that cuts a component of the fundamental of the current signal and a band-pass filter that detects a specific-order harmonic for the fundamental.

19. The vibration-type drive apparatus according to claim 18, wherein a pass band of the band-pass filter includes at least any one of a second-order harmonic and a third-order harmonic of a pulse signal.

20. The vibration-type drive apparatus according to claim 16, wherein a capacitance value of the capacitor is configured to bring a frequency at a bottom of a valley of a resonant characteristic that appears in frequency characteristics of a current flowing through the vibrator unit in a state where there is a break and a frequency that is an integer multiple of a start-up frequency in a state where there is no break.

21. The vibration-type drive apparatus according to claim 20, wherein the integer multiple is twice or three times.

22. The vibration-type drive apparatus according to claim 16, wherein a pulse signal to be output by the rectangular voltage generating unit is set to a predetermined pulse width, and a frequency is swept from a predetermined frequency to a predetermined frequency.

23. The vibration-type drive apparatus according to claim 16, wherein a pulse signal to be output by the rectangular voltage generating unit is set to a predetermined pulse width, and a frequency is swept until an amplitude of a fundamental component of the electric signal that is a signal of any one of phases or obtained by adding signals of some of the phases of a one or more-phase current flowing through the vibrator unit reaches a predetermined amplitude.

24. The vibration-type drive apparatus according to claim 15, wherein the control outputs an amplitude of a harmonic of a signal of any one of phases or a signal obtained by adding some of the phases and determines that there is a break when the amplitude is smaller than a predetermined value.

25. The vibration-type drive apparatus according to claim 15, wherein the control outputs a rate of change in amplitude of a harmonic of a signal of any one of phases or a signal obtained by adding some of the phases, and determines that there is a break when the rate of change of the amplitude is greater than a predetermined value.

26. The vibration-type drive apparatus according to claim 15, wherein the control outputs a maximum value of an amplitude of a harmonic of a signal of any one of phases or a current signal obtained by adding some of the phases and a frequency at the maximum value, determines that there is a break when the maximum value is greater than a predetermined value and determines the number of breaks by using the frequency.

27. The vibration-type drive apparatus according to claim 16, wherein a pulse width of the pulse signal in a start-up operation of the vibration-type drive apparatus has a pulse width smaller than a pulse width when the vibration-type drive apparatus is normally driven.

28. The vibration-type drive apparatus according to claim 16, wherein the number of breaks of wiring lines respectively coupled to the vibrators is determined in accordance with a current amplitude of a fundamental of the pulse signal.

29. The vibration-type drive apparatus according to claim 28, wherein a frequency at a start to sweep the drive signal is a frequency higher than a resonant frequency of the vibrators and higher than a frequency of a peak of frequency characteristics of a current flowing through the vibrator unit in a state where there is no break in the vibrators.

30. The vibration-type drive apparatus according to claim 28, further comprising any one of a low-pass filter that cuts a harmonic component of the pulse signal and a band-pass filter that detects a fundamental of the pulse signal.

31. The vibration-type drive apparatus according to claim 28, wherein a maximum value of an amplitude of a fundamental of a signal of any one of phases or a signal obtained by adding some of the phases of the start-up operation, and a frequency at the maximum value are output, and the number of breaks is determined by using the frequency.

32. The vibration-type drive apparatus according to claim 28, wherein a pulse width of the pulse signal of the start-up operation is a pulse width smaller than a pulse width when the vibration-type drive apparatus is normally driven.

33. The vibration-type drive apparatus according to claim 15, further comprising a common contact body that contacts with the vibrator unit.

34. The vibration-type drive apparatus according to claim 33, wherein the contact body is a cylindrical shaft, and the three vibrators are disposed substantially equally on a circumference of the cylindrical shaft.

35. The vibration-type drive apparatus according to claim 33, further comprising a hollow case that accommodates the contact body and the vibrators.

36. The vibration-type drive apparatus according to claim 15, wherein each of the vibrators includes a rectangular elastic body having two protrusions, and a piezoelectric body.

37. The vibration-type drive apparatus according to claim 1, wherein a voltage detecting unit that detects an individual applied voltage of each of the vibrators is provided as the drive signal analyzing unit, and the control unit determines a driving status of each of the vibrators in accordance with the applied voltage.

38. The vibration-type drive apparatus according to claim 37, wherein the vibrator unit of which the vibrators, respectively, are connected in parallel with secondary sides of a plurality of transformers of which primary sides are connected in series is provided, and the primary sides of the plurality of transformers are configured to be applied with the drive signal.

39. The vibration-type drive apparatus according to claim 37, wherein the vibrator unit in which a plurality of pairs of parallel-connected inductor and vibrator is connected in series is provided.

40. The vibration-type drive apparatus according to claim 37, wherein at least one of a maximum value and a minimum value of each individual applied voltage is detected.

41. The vibration-type drive apparatus according to claim 37, wherein the vibration status is determined in accordance with any one of a maximum value and a minimum value of an amplitude of the applied voltage, or a temporal change in the applied voltage.

42. The vibration-type drive apparatus according to claim 37, wherein the vibration status is determined in accordance with a difference between a maximum value and a minimum value, a standard deviation, and a variance of an amplitude of the applied voltage.

43. The vibration-type drive apparatus according to claim 41, wherein an amplitude of the applied voltage is detected by a diode.

44. The vibration-type drive apparatus according to claim 39, wherein the applied voltage is detected by detecting a voltage amplitude of the primary side of the transformer and estimating an amplitude of the applied voltage according to a turns ratio of the transformer.

45. The vibration-type drive apparatus according to claim 37, wherein a value at which a maximum value or a minimum value of each individual applied voltage exceeds a predetermined value or a value corresponding to each individual applied voltage is defined as a driving status determination value, and it is determined that a drive status deteriorates as the driving status determination value increases.

46. The vibration-type drive apparatus according to claim 37, wherein a value of each individual applied voltage exceeding a predetermined value or a value corresponding to each individual applied voltage is defined as a driving status determination value, and it is determined that a drive status deteriorates as the driving status determination value increases.

47. The vibration-type drive apparatus according to claim 45, wherein an operation of a vibration-type actuator is controlled in accordance with a total of the driving status determination values for the individual applied voltages.

48. The vibration-type drive apparatus according to claim 45, wherein an operation of a vibration-type actuator is controlled in accordance with a number at which the driving status determination value exceeds a predetermined value.

49. The vibration-type drive apparatus according to claim 38, further comprising a limiting unit that is connected in parallel with each of the plurality of vibrators and that limits an amplitude of the applied voltage.

50. The vibration-type drive apparatus according to claim 38, further comprising a limiting unit that is connected in parallel with each of the primary sides of the transformers and that limits a voltage amplitude.

51. The vibration-type drive apparatus according to claim 37, further comprising a common contact body that contacts with the vibrator unit.

52. The vibration-type drive apparatus according to claim 47, wherein the contact body is a cylindrical shaft, and the three vibrators are disposed substantially equally on a circumference of the cylindrical shaft.

53. A control method for a vibration-type drive apparatus, the control method comprising outputting, by a control unit, a command signal to a drive unit to cause a vibrator unit made up of two or more vibrators to vibrate by using a drive signal output from the drive unit in accordance with the command signal, and analyzing the drive signal and outputting an analysis result to determine whether there is a break in wiring lines respectively coupled to the vibrators in accordance with the analysis result.

54. The control method for a vibration-type drive apparatus according to claim 53, wherein
the vibrator unit is configured such that the vibrators, respectively, are connected in parallel with secondary sides of a plurality of transformers of which primary sides are connected in series and the primary sides of the plurality of transformers are configured to be applied with the drive signal, and
the drive unit includes a rectangular voltage generating unit that generates a pulse signal having a predetermined voltage and frequency, and a waveform shaping unit inserted between the rectangular voltage generating unit and the vibrator unit.

55. The control method for a vibration-type drive apparatus according to claim 53, wherein
the vibrator unit is configured such that a plurality of pairs of parallel-connected inductor and vibrator is connected in series, and
the drive unit includes a rectangular voltage generating unit that generates a pulse signal having a predetermined voltage and frequency, and a waveform shaping unit inserted between the rectangular voltage generating unit and the vibrator unit.

56. The control method for a vibration-type drive apparatus according to claim 53, further comprising performing a different drive sequence according to the number of breaks in wiring lines respectively coupled to the vibrators, of the vibrators.

57. The control method for a vibration-type drive apparatus according to claim 56, further comprising turning on a break status indicator LED according to the number of breaks.

58. The control method for a vibration-type drive apparatus according to claim 53, wherein the analysis result is a result obtained by analyzing a waveform of a drive voltage or a waveform of a current flowing into the vibrator unit, as the drive signal.

59. The control method for a vibration-type drive apparatus according to claim 58, wherein the waveform is a waveform of a mean value of an absolute value of the drive voltage for a frequency of the drive voltage or a waveform of an effective value of the drive voltage for a frequency of the drive voltage.

60. The control method for a vibration-type drive apparatus according to claim 58, wherein the waveform is a waveform representing an amplitude of a third-order harmonic and an amplitude of a fundamental for a frequency of the drive voltage.

61. A control method for the vibration-type drive apparatus according to claim 53, the control method comprising:
outputting, by a control unit, a command signal to a drive unit to cause a vibrator unit made up of two or more vibrators to vibrate by using a drive signal output from the drive unit in accordance with the command signal; and
where a current signal flowing through the vibrator unit and corresponding to a range of a drive frequency of the vibrator unit is defined as a fundamental, determining, by the control unit, whether there is a break in wiring lines respectively coupled to the vibrators in accordance with a current signal flowing through the vibrator unit and corresponding to a harmonic of the fundamental as the analysis result.

62. The control method for a vibration-type drive apparatus according to claim 61, wherein the vibrator unit is configured such that the vibrators, respectively, are connected in parallel with secondary sides of a plurality of transformers of which primary sides are connected in series and the primary sides of the plurality of transformers are configured to be applied with the drive signal, and the drive unit includes a rectangular voltage generating unit that generates a pulse signal having a predetermined voltage and frequency, and a waveform shaping unit inserted between the rectangular voltage generating unit and the vibrator unit.

63. The control method for a vibration-type drive apparatus according to claim 61, wherein the vibrator unit is configured such that a plurality of sets of parallel-connected inductor, capacitor, and vibrator is connected in series, and the drive unit includes a rectangular voltage generating unit that generates a pulse signal having a predetermined voltage and frequency, and a waveform shaping unit inserted between the rectangular voltage generating unit and the vibrator unit.

\* \* \* \* \*